(12) United States Patent
Endo et al.

(10) Patent No.: US 9,969,827 B2
(45) Date of Patent: May 15, 2018

(54) PROCESS FOR PRODUCING ETHYLENE/α-OLEFIN COPOLYMER

(71) Applicant: MITSUI CHEMICALS, INC., Tokyo (JP)

(72) Inventors: Koji Endo, Chiba (JP); Mayumi Hiwara, Chiba (JP); Sadahiko Matsuura, Iwakuni (JP); Yoko Kosugi, Ichihara (JP); Yuichi Yamamura, Ichihara (JP); Yusuke Mizobuchi, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days. days.

(21) Appl. No.: 15/117,015

(22) PCT Filed: Feb. 10, 2015

(86) PCT No.: PCT/JP2015/053696
§ 371 (c)(1),
(2) Date: Aug. 5, 2016

(87) PCT Pub. No.: WO2015/122414
PCT Pub. Date: Aug. 20, 2015

(65) Prior Publication Data
US 2017/0183432 A1    Jun. 29, 2017

(30) Foreign Application Priority Data

Feb. 13, 2014  (JP) .................................. 2014-025158

(51) Int. Cl.
| | | |
|---|---|---|
| C07F 17/00 | (2006.01) |
| C08F 4/6592 | (2006.01) |
| C08F 210/02 | (2006.01) |
| C08F 210/06 | (2006.01) |
| C08F 210/16 | (2006.01) |
| C08F 4/659 | (2006.01) |

(52) U.S. Cl.
CPC ........ C08F 210/16 (2013.01); C08F 4/65927 (2013.01); C08F 4/65908 (2013.01); C08F 4/65912 (2013.01); C08F 210/06 (2013.01)

(58) Field of Classification Search
CPC .............. C08F 4/65927; C08F 4/65908; C08F 4/65912; C08F 210/02; C08F 210/06
See application file for complete search history.

(56) References Cited

U.S. PATENT DOCUMENTS

| | | |
|---|---|---|
| 4,892,851 A | 1/1990 | Ewen et al. |
| 4,960,878 A | 10/1990 | Crapo et al. |
| 4,990,640 A | 2/1991 | Tsutsui et al. |

(Continued)

FOREIGN PATENT DOCUMENTS

| | | |
|---|---|---|
| JP | H01-501950 A | 7/1989 |
| JP | H01-502036 A | 7/1989 |

(Continued)

OTHER PUBLICATIONS

US 5,168,111, 12/1992, Canich (withdrawn)
Ewen et al., "Syndiospecific Propylene Polymerizations with Group 4 Metallocenes," J. Am. Chem. Soc. 110(18):6255-6256 (1988).
Hansch et al., "A Survey of Hammett Substituent Constants and Resonance and Field Parameters," Chem. Rev. 91:165-195 (1991).
Kaminsky et al., "$C_S$-symmetric hafnocene complexes for synthesis of syndiotactic polypropene," J. Organomet. Chem. 684(1-2):200-205 (2003).
Kaminsky et al., "Polymerization of Propene and Butene with a Chiral Zirconocene and Methylalumoxane as Cocatalyst," Angew. Chem. Int. Ed. Engl. 24(6):507-508 (1985).

(Continued)

*Primary Examiner* — Caixia Lu
(74) *Attorney, Agent, or Firm* — Foley & Lardner LLP

(57) ABSTRACT

A process capable of producing an ethylene/α-olefin copolymer having a high molecular weight even under the conditions of a high polymerization temperature is provided. The process for producing an ethylene/α-olefin copolymer includes copolymerizing ethylene and an α-olefin having 3 or more carbon atoms in the presence of an olefin polymerization catalyst including a crosslinked metallocene compound (A) represented by the following general formula [I] and a cocatalyst component (B). In the general formula [I], Y is selected from a carbon atom, etc., M is a hafnium atom or the like, $R^1$ to $R^{12}$ are each selected from a hydrogen atom, a hydrocarbon group, etc., $R^{13}$ and $R^{14}$ are each a substituted aryl group or the like, at least one of $R^{13}$ and $R^{14}$ is a substituted aryl group having one or more electron-donating substituents having a Hammett substituent constant σ of not more than −0.2, Q is selected from a halogen atom, etc., and j is an integer of 1 to 4.

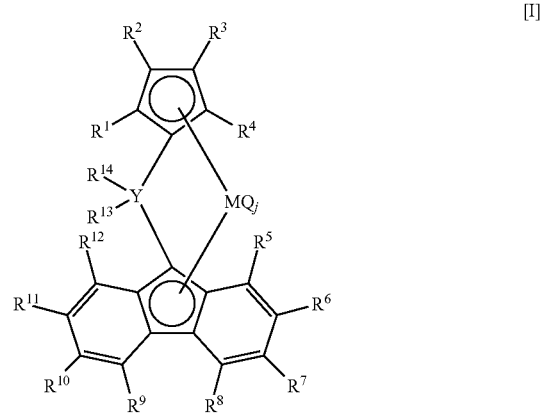

[I]

19 Claims, No Drawings

(56) References Cited

U.S. PATENT DOCUMENTS

| | | | |
|---|---|---|---|
| 5,026,798 A | 6/1991 | Canich | |
| 5,041,584 A | 8/1991 | Crapo et al. | |
| 5,055,438 A | 10/1991 | Canich | |
| 5,057,475 A | 10/1991 | Canich et al. | |
| 5,096,867 A | 3/1992 | Canich | |
| 5,153,157 A | 10/1992 | Hlatky et al. | |
| 5,155,080 A | 10/1992 | Elder et al. | |
| 5,158,920 A | 10/1992 | Razavi | |
| 5,162,278 A | 11/1992 | Razavi | |
| 5,195,401 A | 3/1993 | Mouton | |
| 5,223,467 A | 6/1993 | Razavi | |
| 5,223,468 A | 6/1993 | Razavi | |
| 5,225,500 A | 7/1993 | Elder et al. | |
| 5,227,440 A | 7/1993 | Canich et al. | |
| 5,241,025 A | 8/1993 | Hlatky et al. | |
| 5,243,002 A | 9/1993 | Razavi | |
| 5,264,405 A | 11/1993 | Canich | |
| 5,278,119 A | 1/1994 | Turner et al. | |
| 5,278,265 A | 1/1994 | Razavi | |
| 5,292,838 A | 3/1994 | Razavi | |
| 5,304,523 A | 4/1994 | Razavi | |
| 5,321,106 A | 6/1994 | LaPointe | |
| 5,334,677 A | 8/1994 | Razavi et al. | |
| 5,384,299 A | 1/1995 | Turner et al. | |
| 5,387,568 A | 2/1995 | Ewen et al. | |
| 5,391,629 A | 2/1995 | Turner et al. | |
| 5,407,884 A | 4/1995 | Turner et al. | |
| 5,408,017 A | 4/1995 | Turner et al. | |
| 5,420,217 A | 5/1995 | Canich | |
| 5,470,927 A | 11/1995 | Turner et al. | |
| 5,483,014 A | 1/1996 | Turner et al. | |
| 5,504,169 A | 4/1996 | Canich | |
| 5,519,100 A | 5/1996 | Ewen et al. | |
| 5,547,675 A | 8/1996 | Canich | |
| 5,561,092 A | 10/1996 | Ewen et al. | |
| 5,589,556 A | 12/1996 | Razavi | |
| 5,599,761 A | 2/1997 | Turner | |
| 5,614,457 A | 3/1997 | Ewen et al. | |
| 5,621,126 A | 4/1997 | Canich et al. | |
| 5,631,391 A | 5/1997 | Canich | |
| 5,663,249 A | 9/1997 | Ewen et al. | |
| 5,723,560 A | 3/1998 | Canich | |
| 5,763,549 A | 6/1998 | Elder et al. | |
| 5,801,113 A | 9/1998 | Jejelowo et al. | |
| 5,807,939 A | 9/1998 | Elder et al. | |
| 5,883,202 A | 3/1999 | Ewen et al. | |
| 6,121,395 A | 9/2000 | Turner | |
| 6,232,420 B1 | 5/2001 | Turner | |
| 6,245,706 B1 | 6/2001 | Hlatky | |
| 6,265,338 B1 | 7/2001 | Canich | |
| 6,294,625 B1 | 9/2001 | Hlatky et al. | |
| 6,300,433 B1 † | 10/2001 | Rodriguez | |
| 6,313,240 B1 | 11/2001 | Hasegawa et al. | |
| 6,346,636 B1 | 2/2002 | Rodriguez | |
| 6,355,592 B1 | 3/2002 | Hlatky et al. | |
| 6,417,120 B1 | 7/2002 | Mitchler et al. | |
| 6,423,795 B1 | 7/2002 | Canich et al. | |
| 6,541,410 B1 | 4/2003 | Rodriguez | |
| 6,562,919 B2 † | 5/2003 | Crowther | |
| 6,617,466 B1 | 9/2003 | Canich | |
| 6,632,898 B1 | 10/2003 | Canich | |
| 7,041,841 B1 | 5/2006 | Canich | |
| 7,163,907 B1 | 1/2007 | Canich et al. | |
| 7,569,646 B1 | 8/2009 | Canich | |
| 2002/0155776 A1 | 10/2002 | Mitchler et al. | |
| 2006/0057321 A1* | 3/2006 | Mori | A61L 29/041 428/36.92 |
| 2006/0161013 A1 | 7/2006 | Tohi et al. | |
| 2006/0178491 A1 | 8/2006 | Canich | |
| 2006/0270812 A1 | 11/2006 | Tohi et al. | |
| 2008/0059895 A1 | 3/2008 | Hosoya | |
| 2008/0220193 A1 | 9/2008 | Tohi et al. | |
| 2009/0018299 A1 | 1/2009 | Tasaki et al. | |
| 2009/0270580 A1 | 10/2009 | Satoh et al. | |
| 2011/0003095 A1* | 1/2011 | Becker | C09J 151/06 428/17 |

FOREIGN PATENT DOCUMENTS

| | | |
|---|---|---|
| JP | H02-024701 A | 1/1990 |
| JP | H02-078687 A | 3/1990 |
| JP | H02-167305 A | 6/1990 |
| JP | H03-103407 A | 4/1991 |
| JP | H03-179005 A | 8/1991 |
| JP | H03-179006 A | 8/1991 |
| JP | H03-207703 A | 9/1991 |
| JP | H03-207704 A | 9/1991 |
| JP | H06-000811 B2 | 1/1994 |
| JP | 2882257 B2 | 4/1999 |
| JP | 2004-501926 A | 1/2004 |
| JP | 2004-051676 A | 2/2004 |
| JP | 2004-182715 A | 7/2004 |
| JP | 2005-314680 A | 11/2005 |
| JP | 2007-302854 A | 11/2007 |
| JP | 2008-231265 A | 10/2008 |
| WO | WO-2004/029062 A1 | 4/2004 |
| WO | WO-2005/100410 A1 | 10/2005 |
| WO | WO-2006/123759 A1 | 11/2006 |
| WO | WO-2007/034920 A1 | 3/2007 |
| WO | WO-2007/094378 A1 | 8/2007 |

OTHER PUBLICATIONS

Kaminsky et al., "Standardized polymerizations of ethylene and propene with bridged and unbridged metallocene derivatives: a comparison," Makromol. Chem. 193(7):1643-1651 (1992).

Laine et al., "Elemental Reactions in Copolymerization of α-Olefins by Bis(cyclopentadienyl) Zirconocene and Hafnocene: Effects of the Metal as a Function of the Monomer and the Chain End," Organometallics 30:1350-1358 (2011).

Prakash et al., "N-Carboethoxypiperdine, a Convenient Reagent for the Preparation of Symmetrical Ketones from Organolithiums," Heterocycles 40(1):79-83 (Jan. 1995).

Sinn et al., "'Living Polymers' on Polymerization with Extremely Productive Ziegler Catalysts," Angew. Chem. Int. Ed. Engl. 19(5):390-392 (1980).

International Search Report issued in International Patent Application No. PCT/JP2015/053696 dated May 12, 2015.

Tanja Seraidaris et al., "Propene-Ethene Copolymers Synthesised with Cs-Symmetric Metallocenes and Different Cocatalysts", Macromolecular Chemistry and Physics, v. 206, No. 13, Jul. 5, 2005, pp. 1319-1325.

Xiaoxia Yang et al., "Ethylene and propylene polymerization by the new substituted bridged (cyclopentadienyl)(fluorenyl) zirconocenes", Applied Organometallic Chemistry, v. 20, No. 2, Feb. 1, 2006, pp. 130-137.

Extended European Search Report issued in EP application No. 15748881.8 dated Aug. 18, 2017.

\* cited by examiner
† cited by third party

PROCESS FOR PRODUCING ETHYLENE/α-OLEFIN COPOLYMER

CROSS-REFERENCE TO RELATED APPLICATIONS

The present application is a U.S. national stage application claiming the benefit of International Patent Application No. PCT/JP2015/053696, filed Feb. 10, 2015, which claims the benefit of priority to Japanese Patent Application No. 2014-025158, filed Feb. 13, 2014, the entireties of which are hereby incorporated by reference.

TECHNICAL FIELD

The present invention relates to a process for producing an ethylene/α-olefin copolymer, and more particularly to a process for producing an ethylene/α-olefin copolymer by copolymerizing ethylene and an α-olefin in the presence of an olefin polymerization catalyst comprising a crosslinked metallocene compound having a specific crosslinked structure.

BACKGROUND ART

A process using, as an olefin polymerization catalyst, a transition metal compound having a cyclopentadienyl ligand or a substituted cyclopentadienyl ligand, namely, a so-called metallocene compound, is widely known. Since it was reported by W. Kaminsky, et al. that a catalyst using a combination of zirconocenedimethyl and methylalumioxane (MAO) exhibits high activityinpolymerizationof ethylene [Angew. Chem. Int. Ed. Engl., 19, 390 (1980)], various improvements have been attempted for the purpose of enhancing performance of a catalyst, producing a specific polymer, etc. With regard to a process for stereoregularly polymerizing an α-olefin among them, there have been reported isotactic polymerization by W. Kaminsky, et al. [Angew. Chem. Int. Ed. Engl., 24, 507 (1985)] and syndiotactic polymerization by J. A. Ewen, et al. [J. Am. Chem. Soc., 110, 6255 (1988)] one after another in 1980s, and both of them have been accomplished by utilizing a specific stereostructure of a crosslinked metallocene compound. Particularly with regard to the latter, production of syndiotactic polypropylene that was difficult to produce with a conventional Ziegler-Matta catalyst has been succeeded by the use of a metallocene compound having a ligand in which a cyclopentadienyl group and a fluorenyl group have been crosslinked.

Thereafter, development of this crosslinked cyclopentadienyl-fluorenyl metallocene compound also as a catalyst for ethylene homopolymerization or ethylene/α-olefin copolymerization has been advanced. W. Kaminsky, et al. have reported ethylene polymerization using [isopropylidene($\eta^5$-cyclopentadienyl)($\eta^5$-fluorenyl)]zirconium dichloride that was used for the production of syndiotactic polypropylene by J. A. Ewen, et al. previously mentioned, but its polymerization activity was extremely low [Makromol. Chem., 193, 1643 (1992)].

On the other hand, the present applicant has earnestly studied ligand structures and has reached an invention of a crosslinked metallocene compound having extremely high polymerization activity in ethylene homopolymerization and ethylene/α-olefin copolymerization [patent literature 1 (WO2004/029062), patent literature 2 (WO2005/100410)]. However, the molecular weight of the resulting ethylene-based polymer is still insufficient, and further improvement in the catalyst has been desired.

In solution polymerization, it is generally regarded as preferable to carryout polymerization at a high temperature because this leads to enhancement in productivity. That is to say, since the viscosity of a polymer solution containing the resulting olefin polymer is decreased at a high temperature, it becomes possible to raise a concentration of the olefin polymer in a polymerizer as compared with polymerization at a low temperature, and as a result, productivity per polymerizer is enhanced. Further, the olefin polymerization is an exothermic reaction, and therefore, in order to maintain the polymerization temperature at a desired value, heat of polymerization usually needs to be removed. In the high-temperature polymerization, the quantity of heat to be removed is smaller than that in the low-temperature polymerization, and therefore, an advantage of reduction in cost of heat removal is also obtained. On the other hand, it is well known to a person skilled in the art that the molecular weight of the resulting olefin polymer decreases with a rise in polymerization temperature. Accordingly, a disadvantage that the upper limit of the polymerization temperature is restricted to produce an olefin polymer having a desired molecular weight occurs frequently. As a means to eliminate this disadvantage, a polymerization catalyst for producing an olefin polymer having a high molecular weight is desired. By the use of such an olefin polymerization catalyst, it becomes possible to maintain the molecular weight of the resulting olefin polymer at a desired high value in the high-temperature polymerization, and advantages of enhancement in productivity and reduction in production cost are obtained.

Catalysts for producing such an olefin polymer having a high molecular weight and improvements regarding metallocene compounds that constitute the catalysts have been studied so far. It is widely known that in various metallocene compounds of transition metals of Group 4 of the periodic table, a hafnium compound produces an olefin polymer having a higher molecular weight as compared with a zirconium compound having the same structure as the hafnium compound. In Japanese Patent Publication No. 1994-811 and the like, it is disclosed that by the use of hafnocene dichloride as a metallocene compound, a molecular weight of the resulting polyethylene is increased as compared with zirconocene dichloride. Similarly to the above, it is disclosed in Japanese Patent No. 2882257 that by the use of [isopropylidene($\eta^5$-cyclopentadienyl)($\eta^5$-fluorenyl)]hafnium dichloride, a molecular weight of the resulting ethylene/1-hexene copolymer is increased as compared with [isopropylidene($\eta^5$-cyclopentadienyl)($\eta^5$-fluorenyl)]zirconium dichloride. In either case, however, the molecular weight of the resulting olefin polymer is not sufficient, and it is difficult to produce an olefin polymer having a desired molecular weight at such a high temperature as is industrially useful.

W. Kaminsky, et al. have further made improvements, and by introducing substituents into a crosslinked part and a fluorenyl group part of a crosslinked cyclopentadienyl-fluorenyl metallocene compound, enhancement in molecular weight of the resulting polypropylene has been attempted [J. Organomet. Chem., 684, 200 (2003)]. Although a certain result has been achieved by this attempt, a tendency to decrease in molecular weight of the resulting polypropylene with a rise in polymerization temperature is marked, and in the aimed high-temperature polymerization, polypropylene having a desired molecular weight has not been obtained yet.

The present applicant has proposed a process for producing an α-olefin polymer using a catalyst comprising a specific crosslinked cyclopentadienyl-fluorenyl metallocene compound in a patent literature 3 (WO2006/123759). According to this process, when α-olefins at least partially containing ethylene are polymerized under a high-temperature condition, an ethylene-based polymer having a high molecular weight can be produced with a good activity. In the patent literature 3, further, the present applicant has proposed a process for producing a propylene-based copolymer using a catalyst comprising a different specific crosslinked cyclopentadienyl-fluorenyl metallocene compound. According to this process, a propylene-based copolymer having a high molecular weight can be efficiently produced, and a propylene-based copolymer having a desired molecular weight can be produced at a higher temperature than that in the case using a conventional olefin polymerization catalyst.

On the other hand, a method of introducing hydrogen into a polymerization reactor and thereby lowering a molecular weight of the olefin polymer in order to produce an olefin polymer having a desired molecular weight is popular to a person skilled in the art. For example, the present applicant has disclosed that by introducing hydrogen into a polymerization reactor in the copolymerization of ethylene and 1-octene using a polymerization catalyst comprising a crosslinked cyclopentadienyl-fluorenyl metallocene compound, a molecular weight of the resulting ethylene/1-octene copolymer is lowered [patent literature 1 (WO2005/100410). Thus, introduction of hydrogen into a polymerization reactor is an extremely effective method for the control of a molecular weight of the resulting olefin polymer. However, it is apparent that unlimited introduction of hydrogen for the purpose of controlling a molecular weight of an olefin polymer is not permitted. That is to say, in the case where polymerization is carried out under the conditions of a certain total pressure in a polymerizer and a certain temperature, rise of hydrogen partial pressure due to introduction of hydrogen causes lowering of a partial pressure of an olefin that is a polymerization monomer, and there occurs a problem of reduction in polymerization velocity particularly in the region of high hydrogen partial pressure. A polymerization reactor is restricted in its permissible internal total pressure because of design, and therefore, if excessive introduction of hydrogen is needed in, particularly, the production of an olefin polymer having a low molecular weight, the olefin partial pressure is extremely lowered, so that polymerization activity is sometimes lowered. On that account, desired is a polymerization catalyst capable of sufficiently lowering a molecular weight of the resulting olefin polymer by introducing a small amount of hydrogen and capable of controlling the molecular weight to a desired value, that is, a polymerization catalyst exhibiting a high responsiveness to hydrogen.

As described above, a molecular weight of the resulting olefin polymer decreases with a rise in polymerization temperature, and therefore, it is theoretically possible to control the molecular weight of the olefin polymer to a desired value by changing the polymerization temperature. However, for the reasons described below, control of a molecular weight of an olefin polymer by the polymerization temperature involves difficulties. First of all, in the control of a molecular weight of an olefin polymer to a desired value, the polymerization temperature cannot be raised up to a sufficiently high temperature in some cases because of withstand heat limit and withstand pressure limit based on design of a polymerizer itself or restriction due to heat stability of the resulting olefin polymer. On the other hand, the polymerization temperature is not decreased down to a sufficiently low temperature in some cases because the polymerization activity is lowered, or because in solution polymerization or the like, concentration of an olefin polymer cannot be raised due to increase in viscosity of a polymerization solution, and the productivity is lowered. Moreover, in the case where olefin polymers of many kinds different in molecular weight are continuously produced by one polymerization equipment, said case being popular to a person skilled in the art, a long time is frequently needed in order to stabilize the temperature of the polymerization solution to a desired value after changing the temperature. During this long time, lowering of productivity is brought about. Such an influence becomes conspicuous as the size of the polymerization equipment is increased. Accordingly, when a molecular weight of the resulting olefin polymer is controlled to a desired value in the industrial production of the olefin polymer, changing the amount of hydrogen added while maintaining the polymerization temperature at a certain value is preferably used by a person skilled in the art rather than changing the polymerization temperature.

Therefore, there has been eagerly desired a catalyst simultaneously achieving production of an olefin polymer having a high molecular weight in order to keep the polymerization temperature high and such a high responsiveness to hydrogen that an olefin polymer having a desired molecular weight is obtained by adding a small amount of hydrogen without lowering activity.

CITATION LIST

Patent Literature

Patent literature 1: WO2004/029062
Patent literature 2: WO2005/100410
Patent literature 3: WO2006/123759

SUMMARY OF INVENTION

Technical Problem

In conventional processes for producing ethylene-based polymers such as the processes disclosed in the patent literatures 1 to 3, however, there is room for further improvement in points of molecular weight of the ethylene-based polymer produced in the high-temperature polymerization and responsiveness to hydrogen.

A problem (1) to be solved by the present invention in view of such problems as associated with the prior art is to provide a process for producing an ethylene/α-olefin copolymer having a high molecular weight. As previously described, the high-temperature solution polymerization has advantages such as enhancement in productivity and reduction in production cost but simultaneously induces lowering of a molecular weight of the resulting olefin polymer, and in a process using a conventional polymerization catalyst, it was difficult to produce an ethylene/α-olefin copolymer having a high molecular weight under the conditions of a sufficiently high polymerization temperature. In order to solve this disadvantage and to acquire the advantages of the high-temperature solution polymerization, development of a process capable of producing an ethylene/α-olefin copolymer having a high molecular weight even under the conditions of a sufficiently high polymerization temperature is desired.

A problem (2) to be solved by the present invention is to provide a process in which ethylene and an α-olefin are copolymerized with a high responsiveness to hydrogen to produce an ethylene/α-olefin copolymer. The method of introducing hydrogen into a polymerization reactor in order to control the molecular weight of the resulting ethylene/α-olefin copolymer to a desired value is a method that is useful and popular to a person skilled in the art as previously described. Accordingly, a process for producing an ethylene/α-olefin copolymer, which is capable of sufficiently lowering a molecular weight of the resulting ethylene/α-olefin copolymer by introducing a small amount of hydrogen, that is, which exhibits a high responsiveness to hydrogen, is desired.

A problem (3) to be solved by the present invention is to provide a process in which ethylene and an α-olefin are copolymerized with such a sufficiently high polymerization activity as is industrially useful to produce an ethylene/α-olefin copolymer. Such a process has effects of not only reduction in production time but also reduction in cost due to decrease of catalytic amount used, and therefore, this process has an industrially great advantage.

A problem to be finally solved by the present invention is to provide a process for producing an ethylene/α-olefin copolymer, which can achieve solving of the above problems (1), (2) and (3) at the same time. Owing to such a process, it becomes possible to offer, with industrially significant production efficiency and production cost, an ethylene/α-olefin copolymer having excellent performance as a processing material.

Solution to Problem

The present invention to solve the above problems is a process for producing an ethylene/α-olefin copolymer, comprising copolymerizing ethylene and an α-olefin in the presence of an olefin polymerization catalyst comprising a crosslinked metallocene compound having a specific crosslinked structure. The summary of the present invention is as follows.

[1]
A process for producing an ethylene/α-olefin copolymer, comprising copolymerizing ethylene and an α-olefin having 3 or more carbon atoms in the presence of an olefin polymerization catalyst comprising:

(A) a crosslinked metallocene compound represented by the following general formula [I], and (B) at least one compound selected from (B-1) an organometallic compound, (B-2) an organoaluminum oxy-compound and (B-3) a compound which reacts with the crosslinked metallocene compound (A) to form an ion pair,

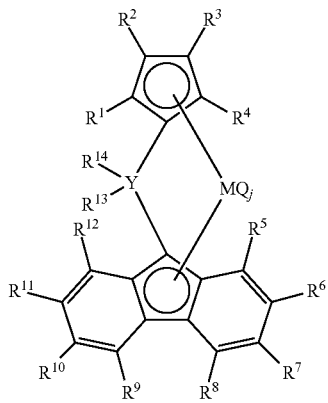

[I]

wherein Y is selected from a carbon atom, a silicon atom, a germanium atom and a tin atom, M is a titanium atom, a zirconium atom or a hafnium atom, $R^1$, $R^2$, $R^3$, $R^4$, $R^5$, $R^6$, $R^7$, $R^8$, $R^9$, $R^{10}$, $R^{11}$ and $R^{12}$ are each an atom or a substituent selected from a hydrogen atom, a hydrocarbon group having 1 to 20 carbon atoms, a silicon-containing group, a nitrogen-containing group, an oxygen-containing group, a halogen atom and a halogen-containing group, and may be the same as or different from each other, adjacent substituents of $R^1$ to $R^{12}$ may be bonded to each other to form a ring, $R^{13}$ and $R^{14}$ are each an aryl group or a substituted aryl group, and may be the same as or different from each other when being both substituted aryl groups, at least one of $R^{13}$ and $R^{14}$ is a substituted aryl group, said substituted aryl group being a substituted aryl group in which one or more hydrogen atoms of an aryl group are each substituted with an electron-donating substituent having a Hammett substituent constant σ of not more than −0.2, wherein when the substituted aryl group has a plurality of the electron-donating substituents, these electron-donating substituents may be the same as or different from each other, said substituted aryl group optionally having a substituent which is a substituent other than the electron-donating substituent and is selected from a hydrocarbon group having 1 to 20 carbon atoms, a silicon-containing group, a nitrogen-containing group, an oxygen-containing group, a halogen atom and a halogen-containing group, wherein when the substituted aryl group has a plurality of the substituents, these substituents may be the same as or different from each other, Q is selected from a halogen atom, a hydrocarbon group having 1 to 20 carbon atoms, an anionic ligand and a neutral ligand capable of coordination with a lone pair of electrons, in a combination of the same or different kinds, and j is an integer of 1 to 4.

[2]
The process for producing an ethylene/α-olefin copolymer as stated in the above [1], wherein $R^1$, $R^2$, $R^3$ and $R^4$ in the general formula [I] are all hydrogen atoms.

[3]
The process for producing an ethylene/α-olefin copolymer as stated in the above [1] or [2], wherein Y in the general formula [I] is a carbon atom.

[4]
The process for producing an ethylene/α-olefin copolymer as stated in any one of the above [1] to [3], wherein the electron-donating substituent is a group selected from a nitrogen-containing group and an oxygen-containing group.

[5]
The process for producing an ethylene/α-olefin copolymer as stated in the above [4], wherein $R^{13}$ and $R^{14}$ in the general formula [I] are the same substituted aryl group.

[6]
The process for producing an ethylene/α-olefin copolymer as stated in the above [4] or [5], wherein $R^{13}$ and $R^{14}$ in the general formula [I] are each a substituted phenyl group containing, as the electron-donating substituent, a group selected from a nitrogen-containing group and an oxygen-containing group at the meta position and/or the para position with respect to bonding to Y.

[7a]
The process for producing an ethylene/α-olefin copolymer as stated in the above [5], wherein $R^{13}$ and $R^{14}$ in the general formula [I] are each a substituted aryl group containing a nitrogen-containing group as the electron-donating substituent.

[7b]
The process for producing an ethylene/α-olefin copolymer as stated in the above [7a], wherein $R^{13}$ and $R^{14}$ in the general formula [I] are each a substituted phenyl group containing a nitrogen-containing group as the electron-donating substituent.

[7c] The process for producing an ethylene/α-olefin copolymer as stated in the above [7b], wherein $R^{13}$ and $R^{14}$ in the general formula [I] are each a substituted phenyl group containing, as the electron-donating substituent, a nitrogen-containing group at the meta position and/or the para position with respect to bonding to Y.

[7]
The process for producing an ethylene/α-olefin copolymer as stated in any one of the above [4] to [6], wherein $R^{13}$ and $R^{14}$ in the general formula [I] are each a substituted phenyl group containing, as the electron-donating substituent, a nitrogen-containing group represented by the following general formula [II]:

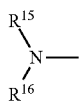
[II]

wherein $R^{15}$ and $R^{16}$ are each an atom or a substituent selected from a hydrogen atom, a hydrocarbon group having 1 to 20 carbon atoms, a silicon-containing group, an oxygen-containing group and a halogen-containing group, may be the same as or different from each other, and may be bonded to each other to form a ring, and a line drawn on the right-hand side of N represents bonding to the phenyl group.

[8a]
The process for producing an ethylene/α-olefin copolymer as stated in the above [5], wherein $R^{13}$ and $R^{14}$ in the general formula [I] are each a substituted aryl group containing an oxygen-containing group as the electron-donating substituent.

[8b]
The process for producing an ethylene/α-olefin copolymer as stated in the above [8a], wherein $R^{13}$ and $R^{14}$ in the general formula [I] are each a substituted phenyl group containing an oxygen-containing group as the electron-donating substituent.

[8c]
The process for producing an ethylene/α-olefin copolymer as stated in the above [8b], wherein $R^{13}$ and $R^{14}$ in the general formula [I] are each a substituted phenyl group containing, as the electron-donating substituent, an oxygen-containing group at the meta position and/or the para position with respect to bonding to Y.

[8]
The process for producing an ethylene/α-olefin copolymer as stated in any one of the above [4] to [6], wherein $R^{13}$ and $R^{14}$ in the general formula [I] are each a substituted phenyl group containing, as the electron-donating substituent, an oxygen-containing group represented by the following general formula [III]:

 [III]

wherein $R^{17}$ is an atom or a substituent selected from a hydrogen atom, a hydrocarbon group having 1 to 20 carbon atoms, a silicon-containing group, a nitrogen-containing group and a halogen-containing group, and a line drawn on the right-hand side of O represents bonding to the phenyl group.

[9]
The process for producing an ethylene/α-olefin copolymer as stated in any one of the above [1] to [8], wherein $R^5$, $R^8$, $R^9$ and $R^{12}$ in the general formula [I] are all hydrogen atoms.

[10]
The process for producing an ethylene/α-olefin copolymer as stated in any one of the above [1] to [9], wherein at least two of $R^6$, $R^7$, $R^{10}$ and $R^{11}$ in the general formula [I] are each a substituent selected from a hydrocarbon group, a silicon-containing group, a nitrogen-containing group, an oxygen-containing group, a halogen atom and a halogen-containing group.

[11]
The process for producing an ethylene/α-olefin copolymer as stated in the above [10], wherein $R^6$ and $R^7$, and/or $R^{10}$ and $R^{11}$ in the general formula [I] are bonded to each other to form a ring.

[12]
The process for producing an ethylene/α-olefin copolymer as stated in the above [11], wherein $R^6$ and $R^7$, and $R^{10}$ and $R^{11}$ in the general formula [I] are both bonded to each other to form a ring.

[13]
The process for producing an ethylene/α-olefin copolymer as stated in the above [12], wherein the rings formed by bonding of $R^6$ and $R^7$, and $R^{10}$ and $R^{11}$ in the general formula [I] to each other are each a five-membered to seven-membered ring.

[14]
The process for producing an ethylene/α-olefin copolymer as stated in the above [13], wherein the rings formed by bonding of $R^6$ and $R^7$, and $R^{10}$ and $R^{11}$ in the general formula [I] to each other are each a six-membered ring.

[15]
The process for producing an ethylene/α-olefin copolymer as stated in the above [14], wherein ethylene and an α-olefin are copolymerized in the presence of an olefin polymerization catalyst comprising a crosslinked metallocene compound represented by the following general formula [IV]:

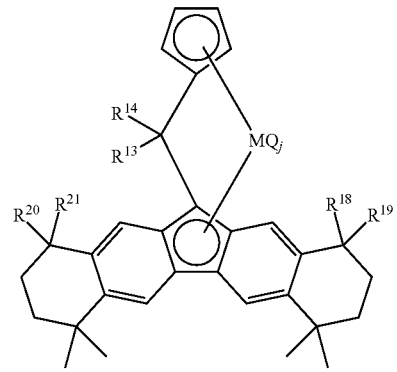
[IV]

wherein M is a titanium atom, a zirconium atom or a hafnium atom, $R^{13}$ and $R^{14}$ are each a substituted phenyl group containing, as the electron-donating substituent, a nitrogen-containing group represented by the general formula [II], or are each a substituted phenyl group containing, as the electron-donating substituent, an oxygen-containing group represented by the general formula [III], $R^{18}$, $R^{19}$, $R^{20}$ and $R^{21}$ are each a hydrogen atom or a methyl group, Q is selected from a halogen atom, a hydrocarbon group having 1 to 20 carbon atoms, an anionic ligand and a neutral ligand capable of coordination with a lone pair of electrons, in a combination of the same or different kinds, and j is an integer of 1 to 4.

[16]

The process for producing an ethylene/α-olefin copolymer as stated in any one of the above [1] to [15], wherein M in the general formula [I] is hafnium.

[17]

The process for producing an ethylene/α-olefin copolymer as stated in any one of the above [1] to [16], wherein polymerization is carried out in such a manner as to obtain an ethylene-based polymer in which the proportion of constituent units derived from ethylene is not less than 50% by mol when the total of constituent units derived from monomers in the polymer is 100% by mol.

[18]

The process for producing an ethylene/α-olefin copolymer as stated in any one of the above [1] to [17], wherein the polymerization temperature is 100 to 300° C.

Advantageous Effects of Invention

By the process comprising copolymerizing ethylene and an α-olefin in the presence of an olefin polymerization catalyst comprising a crosslinked metallocene compound having a specific crosslinked structure, it becomes possible to produce an ethylene/α-olefin copolymer having a high molecular weight. By virtue of this, the molecular weight of the resulting ethylene/α-olefin copolymer can be kept at a desired high value also in high-temperature polymerization, and therefore, it becomes possible to carry out high-temperature polymerization. Especially in solution polymerization at a high temperature, the viscosity of a polymer solution containing the resulting ethylene/α-olefin copolymer is decreased, and therefore, it becomes possible to raise a concentration of the ethylene/α-olefin copolymer in a polymerizer as compared with that in low-temperature polymerization, and as a result, productivity per polymerizer is greatly enhanced. Moreover, by carrying out high-temperature polymerization, the cost of heat removal in a polymerizer is drastically reduced.

Since the responsiveness of the olefin polymerization catalyst to hydrogen is high, the molecular weight of the resulting ethylene/α-olefin copolymer can be greatly lowered by introducing a small amount of hydrogen, and it becomes possible to produce an ethylene/α-olefin copolymer having a desired molecular weight. By virtue of this, a partial pressure of a monomer in the polymerization reactor can be kept high, and high polymerization activity can be achieved.

Thus, it becomes possible to produce an ethylene/α-olefin copolymer having excellent performance as a processing material with high productivity and at a low cost, and therefore, a contribution of the present invention to the industry is remarkably great and excellent.

These effects are particularly conspicuous when the present invention is compared with copolymerization of ethylene and an α-olefin in the presence of an olefin polymerization catalyst comprising a metallocene compound having the same structure as the above-mentioned crosslinked metallocene compound except for the crosslinked part.

DESCRIPTION OF EMBODIMENTS

The present invention is described in more detail.

The process for producing an ethylene/α-olefin copolymer according to the present invention is characterized by copolymerizing ethylene and an α-olefin having 3 or more carbon atoms in the presence of an olefin polymerization catalyst comprising the crosslinked metallocene compound (A) represented by the general formula [I] and the compound (B).

<Crosslinked Metallocene Compound (A)>

The crosslinked metallocene compound (A) is represented by the aforesaid formula [I]. Y, M, $R^1$ to $R^{14}$, Q and j in the formula [I] are described below.

(Y, M, $R^1$ to $R^{12}$, Q and j)

Y is selected from a carbon atom, a silicon atom, a germanium atom and a tin atom, and is preferably a carbon atom.

M is a titanium atom, a zirconium atom or a hafnium atom, and is preferably a hafnium atom.

$R^1$, $R^2$, $R^3$, $R^4$, $R^5$, $R^6$, $R^7$, $R^8$, $R^9$, $R^{10}$, $R^{11}$ and $R^{12}$ are each an atom or a substituent selected from a hydrogen atom, a hydrocarbon group having 1 to 20 carbon atoms, a silicon-containing group, a nitrogen-containing group, an oxygen-containing group, a halogen atom and a halogen-containing group, and they may be the same as or different from each other. Adjacent substituents of $R^1$ to $R^{12}$ may be bonded to each other to form a ring, or may not be bonded to each other.

Examples of the hydrocarbon groups having 1 to 20 carbon atoms include an alkyl group having 1 to 20 carbon atoms, a cyclic saturated hydrocarbon group having 3 to 20 carbon atoms, a chain unsaturated hydrocarbon group having 2 to 20 carbon atoms and a cyclic unsaturated hydrocarbon group having 3 to 20 carbon atoms. If adjacent substituents of $R^1$ to $R^{12}$ are bonded to each other to form a ring, an alkylene group having 1 to 20 carbon atoms, an arylene group having 6 to 20 carbon atoms, etc. can be given as the examples.

Examples of the alkyl groups having 1 to 20 carbon atoms include methyl group, ethyl group, n-propyl group, allyl group, n-butyl group, n-pentyl group, n-hexyl group, n-heptyl group, n-octyl group, n-nonyl group and n-decanyl group that are straight-chain saturated hydrocarbon groups, and isopropyl group, isobutyl group, s-butyl group, t-butyl group, t-amyl group, neopentyl group, 3-methylpentyl group, 1,1-diethylpropyl group, 1,1-dimethylbutyl group, 1-methyl-1-propylbutyl group, 1,1-dipropylbutyl group, 1,1-dimethyl-2-methylpropyl group, 1-methyl-1-isopropyl-2-methylpropyl group and cyclopropylmethyl group that are branched saturated hydrocarbon groups. The number of carbon atoms of the alkyl group is preferably 1 to 6.

Examples of the cyclic saturated hydrocarbon groups having 3 to 20 carbon atoms include cyclopropyl group, cyclobutyl group, cyclopentyl group, cyclohexyl group, cycloheptyl group, cyclooctyl group, norbornenyl group, 1-adamantyl group and 2-adamantyl group that are cyclic saturated hydrocarbon groups, and 3-methylcyclopentyl group, 3-methylcycohexyl group, 4-methylcyclohexyl group, 4-cyclohexylcyclohexyl group and 4-phenylcyclohexyl group that are groups wherein a hydrogen atom of a cyclic saturated hydrocarbon group is substituted with a hydrocarbon group having 1 to 17 carbon atoms. The number of carbon atoms of the cyclic saturated hydrocarbon group is preferably 5 to 11.

Examples of the chain unsaturated hydrocarbon groups having 2 to 20 carbon atoms include ethenyl group (vinyl group), 1-propenyl group, 2-propenyl group (allyl group) and 1-methylethenyl group (isopropenyl group) that are alkenyl groups, and ethynyl group, 1-propynyl group and 2-propynyl group (propargyl group) that are alkynyl groups. The number of carbon atoms of the chain unsaturated hydrocarbon group is preferably 2 to 4.

Examples of the cyclic unsaturated hydrocarbon groups having 3 to 20 carbon atoms include cyclopentadienyl group, norbornyl group, phenyl group, naphthyl group, indenyl group, azulenyl group, phenanthryl group and anthracenyl group that are cyclic unsaturated hydrocarbon groups, 3-methylphenyl group (m-tolyl group), 4-methylphenyl group (p-tolyl group), 4-ethylphenyl group, 4-t-butylphenyl group, 4-cyclohexylphenyl group, biphenylyl group, 3,4-dimethylphenyl group, 3,5-dimethylphenyl group and 2,4,6-trimethylphenyl group (mesityl group) that are groups wherein a hydrogen atom of a cyclic unsaturated hydrocarbon group is substituted with a hydrocarbon group having 1 to 15 carbon atoms, and benzyl group and cumyl group that are groups wherein a hydrogen atom of a straight-chain hydrocarbon group or a branched saturated hydrocarbon group is substituted with a cyclic saturated hydrocarbon group or a cyclic unsaturated hydrocarbon group having 3 to 19 carbon atoms. The number of carbon atoms of the cyclic unsaturated hydrocarbon group is preferably 6 to 10.

Examples of the alkylene groups having 1 to 20 carbon atoms include methylene group, ethylene group, dimethylmethylene group (isopropylidene group), ethylmethylene group, 1-methylethylene group, 2-methylethylene group, 1,1-dimethylethylene group, 1, 2-dimethylethylene group and n-propylene group. The number of carbon atoms of the alkylene group is preferably 1 to 6.

Examples of the arylene groups having 6 to 20 carbon atoms include o-phenylene group, m-phenylene group, p-phenylene group and 4,4'-biphenylylene group. The number of carbon atoms of the arylene group is preferably 6 to 12.

Examples of the silicon-containing groups include alkylsilyl groups, such as trimethylsilyl group, triethylsilyl group, t-butyldimethylsilyl group and triisopropyl group, arylsilyl groups, such as dimethylphenylsilyl group, methyldiphenylsilyl group and t-butyldiphenylsilyl group, pentamethyldisilanyl group and trimethylsilylmethyl group, all of which are groups wherein a carbon atom in a hydrocarbon group having 1 to 20 carbon atoms is substituted with a silicon atom. The number of carbon atoms of the alkylsilyl group is preferably 1 to 10, and the number of carbon atoms of the arylsilyl group is preferably 6 to 18.

Examples of the nitrogen-containing groups include amino group, nitro group and N-morpholinyl group, and include dimethylamino group, diethylamino group, dimethylaminomethyl group, cyano group, pyrrolidinyl group, piperidinyl group and pyridinyl group that are groups wherein in the aforesaid hydrocarbon groups having 1 to 20 carbon atoms or silicon-containing groups, a =CH— structure unit is substituted with a nitrogen atom, a —CH$_2$— structure unit is substituted with a nitrogen atom to which a hydrocarbon group having 1 to 20 carbon atoms has been bonded, or a —CH$_3$ structure unit is substituted with a nitrogen atom or a nitrile group to which a hydrocarbon group having 1 to 20 carbon atoms has been bonded. As the nitrogen-containing group, dimethylamino group and N-morpholinyl group are preferable.

Examples of the oxygen-containing groups include hydroxyl group, and include methoxy group, ethoxy group, t-butoxy group, phenoxy group, trimethylsiloxy group, methoxyethoxy group, hydroxymethyl group, methoxymethyl group, ethoxymethyl group, t-butoxymethyl group, 1-hydroxyethyl group, 1-methoxyethyl group, 1-ethoxyethyl group, 2-hydroxyethyl group, 2-methoxyethyl group, 2-ethoxyethyl group, n-2-oxabutylene group, n-2-oxapentylene group, n-3-oxapentylene group, aldehyde group, acetyl group, propionyl group, benzoyl group, trimethylsilylcarbonyl group, carbamoyl group, methylaminocarbonyl group, carboxyl group, methoxycarbonyl group, carboxymethyl group, ethocarboxymethyl group, carbamoylmethyl group, furanyl group and pyranyl group that are groups wherein in the aforesaid hydrocarbon groups having 1 to 20 carbon atoms, silicon-containing groups or nitrogen-containing groups, a —CH$_2$— structure unit is substituted with an oxygen atom or a carbonyl group, or a —CH$_3$ structure unit is substituted with an oxygen atom to which a hydrocarbon group having 1 to 20 carbon atoms has been bonded. As the oxygen-containing group, a methoxy group is preferable.

Examples of the halogen atoms include fluorine, chlorine, bromine and iodine that are Group 17 elements.

Examples of the halogen-containing groups include trifluoromethyl group, tribromomethyl group, pentafluoroethyl group and pentafluorophenyl group that are groups wherein in the aforesaid hydrocarbon groups having 1 to 20 carbon atoms, silicon-containing groups, nitrogen-containing groups or oxygen-containing groups, a hydrogen atom is substituted with a halogen atom.

Q is selected from a halogen atom, a hydrocarbon group having 1 to 20 carbon atoms, an anionic ligand and a neutral ligand capable of coordination with a lone pair of electrons, in a combination of the same or different kinds.

Details of the halogen atom and the hydrocarbon group having 1 to 20 carbon atoms are as previously described. When Q is a halogen atom, it is preferably a chlorine atom. When Q is a hydrocarbon group having 1 to 20 carbon atoms, the number of carbon atoms of the hydrocarbon group is preferably 1 to 7.

Examples of the anionic ligands include alkoxy groups, such as methoxy group, t-butoxy group and phenoxy group, carboxylate groups, such as acetate and benzoate, and sulfonate groups, such as mesylate and tosylate.

Examples of the neutral ligands capable of coordination with a lone pair of electrons include organophosphorus compounds, such as trimethylphosphine, triethylphosphine, triphenylphosphine and diphenylmethylphosphine, and ether compounds, such as tetrahydrofuran, diethyl ether, dioxane and 1,2-dimethoxyethane.

j is an integer of 1 to 4, and is preferably 2.

($R^{13}$ and $R^{14}$)

$R^{13}$ and $R^{14}$ are each an aryl group or a substituted aryl group, and when they are both substituted aryl groups, they may be the same as or different from each other.

Examples of the aryl groups include phenyl group, 1-naphthyl group, 2-naphthyl group, anthracenyl group, phenanthrenyl group, tetracenyl group, chrysenyl group, pyrenyl group, indenyl group, azulenyl group, pyrrolyl group, pyridyl group, furanyl group and thiophenyl group that are substituents derived from aromatic compounds. As the aryl group, phenyl group and 2-naphthyl group are preferable.

Examples of the aromatic compounds include benzene, naphthalene, anthracene, phenanthrene, tetracene, chrysene, pyrene, pyrene, indene, azulene, pyrrole, pyridine, furan and thiophene that are aromatic hydrocarbons and heterocyclic aromatic compounds.

Examples of the substituted aryl groups include groups wherein one or more hydrogen atoms possessed by the above aryl groups are each substituted with a substituent selected from a hydrocarbon group having 1 to 20 carbon atoms, a silicon-containing group, a nitrogen-containing group, an oxygen-containing group, a halogen atom and a halogen-containing group, and specific examples thereof include 3-methylphenyl group (m-tolyl group), 4-methylphenyl group (p-tolyl group), 3-ethylphenyl group, 4-ethylphenyl group, 3,4-dimethylphenyl group, 3,5-dimethylphenyl group, biphenylyl group, 4-(trimethylsilyl)phenyl group, 4-aminophenyl group, 4-(dimethylamino)phenyl group, 4-(diethylamino)phenyl group, 4-morpholinylphenyl group, 4-methoxyphenyl group, 4-ethoxyphenyl group, 4-phenoxyphenyl group, 3,4-dimethoxyphenyl group, 3,5-dimethoxyphenyl group, 3-methyl-4-methoxyphenyl group, 3,5-dimethyl-4-methoxyphenyl group, 3-(trifluoromethyl)phenyl group, 4-(trifluoromethyl)phenyl group, 3-chlorophenyl group, 4-chlorophenyl group, 3-fluorophenyl group, 4-fluorophenyl group, 5-methylnaphthyl group and 2-(6-methyl) pyridyl group.

Electron-Donating Group-Containing Substituted Aryl Group

At least one of $R^{13}$ and $R^{14}$ is a substituted aryl group, said substituted aryl group being a substituted aryl group in which one or more hydrogen atoms of an aryl group are each substituted with an electron-donating substituent having a Hammett substituent constant σ of not more than −0.2, wherein when the substituted aryl group has a plurality of the electron-donating substituents, these electron-donating substituents may be the same as or different from each other, said substituted aryl group optionally having a substituent which is a substituent other than the electron-donating substituent and is selected from a hydrocarbon group having 1 to 20 carbon atoms, a silicon-containing group, a nitrogen-containing group, an oxygen-containing group, a halogen atom and a halogen-containing group, wherein when the substituted aryl group has a plurality of the substituents, these substituents may be the same as or different from each other (said substituted aryl group being also referred to as an "electron-donating group-containing substituted aryl group" hereinafter).

The electron-donating group possessed by the electron-donating group-containing substituted aryl group and having a Hammett substituent constant σ of not more than −0.2 is defined and illustrated as follows. The Hammett equation is a rule of thumb proposed by L. P. Hammett in 1935 in order to quantitatively discuss an influence of a substituent on a reaction or an equilibrium of a benzene derivative. Validity of this rule is widely accepted today. As the substituent constant determined by the Hammett equation, there are σp in the case of substitution at the para position of a benzene ring and σm in the case of substitution at the meta position of a benzene ring, and these values can be found in a large number of common literatures. For example, in a literature [Chem. Rev., 91, 165 (1991)] by Hansch and Taft, detailed description of an extremely wide range of substituents has been made. However, values of σp and mσ described in these literatures sometimes slightly vary depending upon the literature even in the case of the same substituents.

In order to avoid such confusion caused by circumstances in the present invention, values described in Table 1 (pp. 168-175) of the literature [Chem. Rev., 91, 165 (1991)] by Hansch and Taft are defined as the substituent constants σp and σm of the Hammett equation, regarding the substituents as long as described. In the present invention, the electron-donating group having a Hammett substituent constant σ of not more than −0.2 is an electron-donating group having a σp of not more than −0.2 in the case where the para position (4-position) of a phenyl group is substituted with the electron-donating group, is an electron-donating group having a σm of not more than −0.2 in the case where the meta position (3-position) of a phenyl group is substituted with the electron-donating group, and is an electron-donating group having a σp of not more than −0.2 in the case where the ortho position (2-position) of a phenyl group is substituted with the electron-donating group or in the case where an arbitrary position of an aryl group other than a phenyl group is substituted with the electron-donating group.

Examples of the electron-donating groups having a Hammett substituent constant σp or σm of not more than −0.2 include nitrogen-containing groups, such asp-amino group (4-amino group), p-dimethylamino group (4-dimethylamino group), p-diethylamino group (4-diethylamino group) and m-diethylamino group (3-diethylamino group), oxygen-containing groups, such as p-methoxy group (4-methoxy group) and p-ethoxy group (4-ethoxy group), tertiary hydrocarbon groups, such as p-t-butyl group (4-t-butyl group), and silicon-containing groups, such as p-trimethylsiloxy group (4-trimethylsiloxy group). The electron-donating groups whose Hammett substituent constant σp or σm defined in the present invention is not more than −0.2 are not limited to the substituents described in Table 1 (pp. 168-175) of the literature [Chem. Rev., 91, 165 (1991)] by Hansch and Taft. Substituents whose substituent constant σp or σm measured based on the Hammett equation will be within the above range are included in the electron-donating groups whose Hammett substituent constant σp or σm defined in the present invention is not more than −0.2, even if the substituents are not described in the above literature. Examples of such substituents include p-N-morpholinyl group (4-N-morpholinyl group) and m-N-morpholinyl group (3-N-morpholinyl group).

When the electron-donating group-containing substituted aryl group has a plurality of electron-donating substituents, these electron-donating substituents may be the same as or different from each other. The electron-donating group-containing substituted aryl group may have not only the electron-donating substituent but also a substituent selected from a hydrocarbon group having 1 to 20 carbon atoms, a silicon-containing group, a nitrogen-containing group, an oxygen-containing group, a halogen atom and a halogen-containing group. When the electron-donating group-containing substituted aryl group has a plurality of the substituents, these substituents may be the same as or different from each other. The total of the Hammett substituent constants σ of the electron-donating substituent and the substituent contained in one electron-donating group-containing substituted aryl group is preferably not more than −0.15. Examples of such substituted aryl groups include m,p-dimethoxyphenyl group (3,4-dimethoxyphenyl group), p-(dimethylamino)-m-methoxyphenyl group (4-(dimethylamino)-3-methoxyphenyl group), p-(dimethylamino)-m-methylphenyl group (4-(dimethylamino)-3-methylphenyl group), p-methoxy-m-methylphenyl group (4-methoxy-3-methylphenyl group) and p-methoxy-m,m-dimethylphenyl group (4-methoxy-3,5-dimethylphenyl group).

Examples of the hydrocarbon groups having 1 to 20 carbon atoms, the silicon-containing groups, the nitrogen-containing groups, the oxygen-containing groups, the halogen atoms and the halogen-containing groups, which may be possessed by the electron-donating group-containing substituted aryl group, include the aforesaid specific examples of these atoms and substituents.

The above examples regarding the formula [I] apply similarly also in the following description of the present specification.

The present applicant has earnestly studied a variety of crosslinked metallocene compounds. As a result, the present applicant has found for the first time that when at least one of $R^{13}$ and $R^{14}$ in the cross linked metallocene compound (A) represented by the general formula [I] is particularly an electron-donating group-containing substituted aryl group having one or more electron-donating substituents having a Hammett substituent constant σ of not more than −0.2, the molecular weight of the resulting ethylene/α-olefin copolymer is increased in copolymerization of ethylene and one or more monomers selected from α-olefins having 3 or more carbon atoms in the presence of an olefin polymerization catalyst comprising the crosslinked metallocene compound (A).

It is known that in the coordination polymerization of an olefin using an organometallic complex catalyst such as the crosslinked metallocene compound (A) of the present invention, a molecular chain of the resulting olefin polymer grows (growth reaction) and the molecular weight of the olefin polymer increases by virtue of repeated polymerization of the olefin on a central metal of the catalyst. On the other hand, it is also known that by virtue of dissociation of a molecular chain of an olefin polymer from a central metal of a catalyst in a reaction called chain transfer, growth reaction of the molecular chain is terminated, and hence, increase of a molecular weight of the olefin polymer is also terminated. From the above, the molecular weight of an olefin polymer is characterized by a ratio between the frequency of growth reactions and the frequency of chain transfer reactions inherent in an organometallic complex catalyst for producing the olefin polymer. That is to say, there is a relation that as the ratio between the frequency of the growth reactions and the frequency of the chain transfer reactions is increased, the molecular weight of the resulting olefin polymer is increased, while as the ratio is decreased, the molecular weight is decreased.

Here, the frequency of reactions can be estimated from activation energy of the reaction, and it is thought that the frequency of reactions having low activation energy can be regarded as high, and on the other hand, the frequency of reactions having high activation energy can be regarded as low. It is generally known that the frequency of the growth reactions in the olefin polymerization is sufficiently high as compared with the frequency of the chain transfer reactions, that is, the activation energy of the growth reaction is sufficiently low as compared with the activation energy of the chain transfer reaction. Accordingly, it is presumed that a value (referred to as "$\Delta E_c$" hereinafter) obtained by subtracting activation energy of the growth reaction from activation energy of the chain transfer reaction becomes positive, and as this value is increased, the frequency of the growth reactions is increased as compared with the frequency of the chain transfer reactions, and as a result, the molecular weight of the resulting olefin polymer is increased. The validity of the presumption of the molecular weight of the olefin polymer thus carried out has been backed up with the results of calculations by, for example, Laine, et al. [Organometallics, 30, 1350 (2011)].

It is assumed that when at least one of $R^{13}$ and $R^{14}$ in the crosslinked metallocene compound (A) represented by the general formula [I] is particularly an electron-donating group-containing substituted aryl group having one or more electron-donating substituents having a Hammett substituent constant σ of not more than −0.2, the above $LE_c$ is increased, and in the copolymerization of ethylene and one or more monomers selected from α-olefins having 3 or more carbon atoms in the presence of an olefin polymerization catalyst comprising the cross linked metallocene compound (A), the molecular weight of the resulting ethylene/α-olefin copolymer is increased.

The olefin polymerization catalyst comprising the crosslinked metallocene compound (A) is characterized also in that its responsiveness to hydrogen is high in the case where ethylene and an α-olefin having 3 or more carbon atoms are copolymerized in the presence of the catalyst. That is to say, the catalyst exhibits performance to greatly decrease a molecular weight of the resulting ethylene/α-olefin copolymer by introducing a small amount of hydrogen into the polymerization reactor. Such performance is defined by a ratio between a molecular weight of an ethylene/α-olefin copolymer produced in the polymerization with addition of hydrogen and a molecular weight thereof in the polymerization without addition of hydrogen. A smaller value of the molecular weight ratio means a larger decrease in the molecular weight in the polymerization with addition of hydrogen, and with this, it becomes possible to regard the olefin polymerization catalyst as a polymerization catalyst having a high responsiveness to hydrogen. The molecular weight ratio can be replaced with an intrinsic viscosity ([η]) ratio or a melt flow rate (MFR) ratio that becomes a substitute index.

The present applicant has earnestly studied a variety of crosslinked metallocene compounds, and as a result, the present applicant has found for the first time that when at least one of $R^{13}$ and $R^{14}$ in the cross linked metallocene compound (A) represented by the general formula [I] is particularly an electron-donating group-containing substituted aryl group having one or more electron-donating substituents having a Hammett substituent constant σ of not more than −0.2, the molecular weight of the resulting ethylene/α-olefin copolymer is greatly decreased by introducing a small amount of hydrogen in the copolymerization of ethylene and one or more monomers selected from α-olefins having 3 or more carbon atoms in the presence of an olefin polymerization catalyst comprising the crosslinked metallocene compound (A).

It is known that in the coordination polymerization of an olefin using an organometallic complex catalyst such as the crosslinked metallocene compound (A), a polymer molecular chain on a central metal of the catalyst dissociates by the reaction with hydrogen, and a growth reaction of the molecular chain is terminated. In the case where the frequency of the reaction with hydrogen and the frequency of the growth reaction are compared with each other, a larger value of the frequency ratio can be regarded as a higher responsiveness to hydrogen. If the frequency of reactions is estimated from activation energy of the reaction in accordance with the aforesaid estimation, it is presumed that a value (referred to as "$\Delta E_H$" hereinafter) obtained by subtracting activation energy of the growth reaction from activation energy of the reaction with hydrogen becomes positive, and as this value is decreased, the frequency of the reactions with hydrogen is higher as compared with the frequency of the growth reactions, that is, a higher responsiveness to hydrogen is exhibited.

It is assumed that when at least one of $R^{13}$ and $R^{14}$ in the crosslinked metallocene compound (A) represented by the general formula [I] is particularly an electron-donating group-containing substituted aryl group containing an electron-donating substituent having a Hammett substituent constant σ of not more than −0.2, the above $\Delta E_H$ is decreased, and in the copolymerization of ethylene and one or more monomers selected from α-olefins having 3 or more carbon atoms in the presence of an olefin polymerization catalyst comprising the cross linked metallocene compound (A), the molecular weight of the resulting ethylene/α-olefin copolymer is greatly decreased by introducing a small amount of hydrogen.

In the crosslinked metallocene compound (A) represented by the general formula [I], $R^1$, $R^2$, $R^3$ and $R^4$ are all preferably hydrogen atoms. Such a crosslinked metallocene compound (A-1) is represented by the following general formula [V].

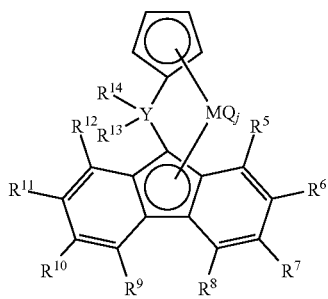

[V]

In the formula [V], definitions, etc. of Y, M, $R^5$, $R^6$, $R^7$, $R^8$, $R^9$, $R^{10}$, $R^{11}$, $R^{12}$, $R^{13}$, $R^{14}$, Q and j are as previously described.

The crosslinked metallocene compound (A-1) has advantages that the production process is simplified, that the production cost is reduced, and that production cost of the ethylene/α-olefin copolymer is eventually reduced by the use of this crosslinked metallocene compound, as compared with a compound of the general formula [I] in which one or more of $R^1$, $R^2$, $R^3$ and $R^4$ are substituted by substituents other than a hydrogen atom. Moreover, when ethylene and one or more monomers selected from α-olefins having 3 or more carbon atoms are copolymerized in the presence of an olefin polymerization catalyst comprising the crosslinked metallocene compound (A-1), advantages of enhancement in polymerization activity and enhancement in molecular weight of the resulting ethylene/α-olefin copolymer are also obtained. Furthermore, an advantage of enhancement in α-olefin copolymerizability (reactivity of α-olefin to ethylene) is also obtained.

In the crosslinked metallocene compound (A-1) represented by the general formula [V], Y is more preferably a carbon atom. Such a crosslinked metallocene compound (A-2) is represented by the following general formula [VI].

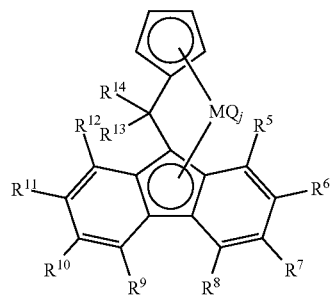

[VI]

In the formula [VI], definitions, etc. of M, $R^5$, $R^6$, $R^7$, $R^8$, $R^9$, $R^{10}$, $R^{11}$, $R^{12}$, $R^{13}$, $R^{14}$, Q and J are as previously described.

The crosslinked metallocene compound (A-2) can be synthesized by, for example, such a simple process as represented by the following formula [VII].

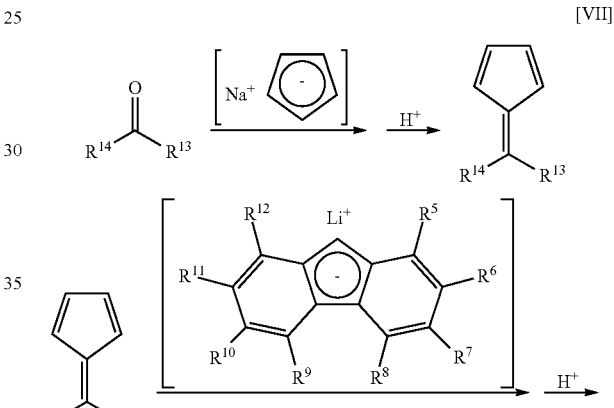

[VII]

-continued

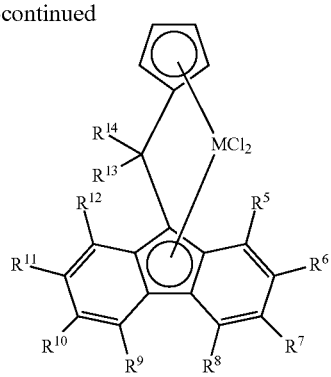

In the formula [VII], definitions, etc. of M, $R^5$, $R^6$, $R^7$, $R^8$, $R^9$, $R^{10}$, $R^{11}$, $R^{12}$, $R^{13}$ and $R^{14}$ are as previously described.

In the formula [VII], at least one of $R^{13}$ and $R^{14}$ is the electron-donating group-containing substituted aryl group, namely, a substituted aryl group that has one or more electron-donating substituents having a Hammett substituent constant σ of not more than −0.2, wherein when the substituted aryl group has a plurality of the electron-donating substituents, these electron-donating substituents may be the same as or different from each other, and that may have not only the electron-donating substituent but also a substituent selected from a hydrocarbon group having 1 to 20 carbon atoms, a silicon-containing group, a nitrogen-containing group, an oxygen-containing group, a halogen atom and a halogen-containing group, wherein when the substituted aryl group has a plurality of the substituents, these substituents may be the same as or different from each other. A variety of ketones represented by the general formula $R^{13}$—C(═O)—$R^{14}$ and satisfying such conditions are commercially available from common reagent manufacturers, and therefore, it is easy to obtain raw materials of the crosslinked metallocene compound (A-2). Even if such ketones are not on the market, the ketones can be easily synthesized by, for example, a process [Heterocycles, 40, 79 (1995)] by Olah, et al. Thus, the crosslinked metallocene compound (A-2) has advantages that the production process is simple and easy, that the production cost is reduced, and that production cost of the ethylene/α-olefin copolymer is eventually reduced by the use of this crosslinked metallocene compound, as compared with a compound of the general formula [V] in which Y is selected from a silicon atom, a germanium atom and a tin atom. Moreover, when ethylene and one or more monomers selected from α-olefins having 3 or more carbon atoms are copolymerized in the presence of an olefin polymerization catalyst comprising the crosslinked metallocene compound (A-2), advantages of further enhancement in polymerization activity and further enhancement in molecular weight of the resulting ethylene/α-olefin copolymer are also obtained. Furthermore, an advantage of further enhancement in α-olefin copolymerizability (reactivity of α-olefin to ethylene) is also obtained.

In the crosslinked metallocene compound (A-2) represented by the general formula [VI], the electron-donating substituents contained in $R^{13}$ and $R^{14}$ are each more preferably a group selected from a nitrogen-containing group and an oxygen-containing group. These substituents have a particularly low σ of the Hammett equation, and exert great effects particularly on solving of the problems (1) and (2) among the problems to be solved by the present invention.

In the crosslinked metallocene compound (A-2) represented by the general formula [VI], $R^{13}$ and $R^{14}$ are more preferably the same substituted aryl groups containing, as the electron-donating substituent, a group selected from a nitrogen-containing group and an oxygen-containing group. By virtue of this, advantages obtained are that the synthesis process is simplified, that the production cost is reduced, and that production cost of the ethylene/α-olefin copolymer is eventually reduced by the use of this crosslinked metallocene compound.

In the crosslinked metallocene compound (A-2) represented by the general formula [VI], $R^{13}$ and $R^{14}$ are still more preferably the same substituted phenyl groups containing, as the electron-donating substituent, a group selected from a nitrogen-containing group and an oxygen-containing group. For example, when synthesis is carried out in accordance with such a process as shown by the aforesaid formula [VII], advantages obtained are that obtaining of raw materials becomes easy because various benzophenones, which are raw materials, are commercially available from common reagent manufacturers, that the production process is simplified, that the production cost is reduced, and that production cost of the ethylene/α-olefin copolymer is eventually reduced by the use of this crosslinked metallocene compound.

Examples of the substituted phenyl groups containing, as the electron-donating substituent, a group selected from a nitrogen-containing group and an oxygen-containing group include o-aminophenyl group (2-aminophenyl group), p-aminophenyl group (4-aminophenyl group), o-(dimethylamino)phenyl group (2-(dimethylamino)phenyl group), p-(dimethylamino)phenyl group (4-(dimethylamino)phenyl group), o-(diethylamino)phenyl group (2-(diethylamino)phenyl group), p-(diethylamino)phenyl group (4-(diethylamino)phenyl group), m-(diethylamino)phenyl group (3-(diethylamino)phenyl group), o-methoxyphenyl group (2-methoxyphenyl group), p-methoxyphenyl group (4-methoxyphenyl group), o-ethoxyphenyl group (2-ethoxyphenyl group), p-ethoxyphenyl group (4-ethoxyphenyl group), o-N-morpholinylphenyl group (2-N-morpholinylphenyl group), p-N-morpholinylphenyl group (4-N-morpholinylphenyl group), m-N-morpholinylphenyl group (3-N-morpholinylphenyl group), o,p-dimethoxyphenyl group (2,4-dimethoxyphenyl group), m,p-dimethoxyphenyl group (3,4-dimethoxyphenyl group), p-(dimethylamino)-m-methoxyphenyl group (4-(dimethylamino)-3-methoxyphenyl group), p-(dimethylamino)-m-methylphenyl group (4-(dimethylamino)-3-methylphenyl group), p-methoxy-m-methylphenyl group (4-methoxy-3-methylphenyl group) and p-methoxy-m,m-dimethylphenyl group (4-methoxy-3,5-dimethylphenyl group).

In the crosslinked metallocene compound (A-2) represented by the general formula [VI], $R^{13}$ and $R^{14}$ are much more preferably the same substituted phenyl groups containing, as the electron-donating substituent, a group selected from a nitrogen-containing group and an oxygen-containing group at the meta position and/or the para position with respect to bonding to a carbon atom as the Y. For example, when synthesis is carried out in accordance with such a process as shown by the aforesaid formula [VII], advantages obtained are that the synthesis is facilitated, that the production process is simplified, and that the production cost is reduced, and production cost of the ethylene/α-olefin copolymer is eventually reduced by the use of this crosslinked metallocene compound, as compared with the case where the ortho position is substituted with the substituent.

When $R^{13}$ and $R^{14}$ in the crosslinked metallocene compound (A-2) represented by the general formula [VI] are the same substituted phenyl groups containing, as the electron-donating substituent, the nitrogen-containing group at the meta position and/or the para position with respect to bonding to a carbon atom as the Y, the nitrogen-containing group is more preferably a group represented by the following general formula [II].

In the formula [II], $R^{15}$ and $R^{16}$ are each an atom or a substituent selected from a hydrogen atom, a hydrocarbon group having 1 to 20 carbon atoms, a silicon-containing group, an oxygen-containing group and a halogen-containing group, may be the same as or different from each other, and may be bonded to each other to form a ring, and a line drawn on the right-hand side of N represents bonding to the phenyl group.

Examples of the hydrocarbon groups having 1 to 20 carbon atoms, the silicon-containing groups, the oxygen-containing groups and the halogen-containing groups as $R^{15}$ and $R^{16}$ include the aforesaid specific examples of these substituents.

Such a crosslinked metallocene compound (A-3) is represented by the following general formula [VIII].

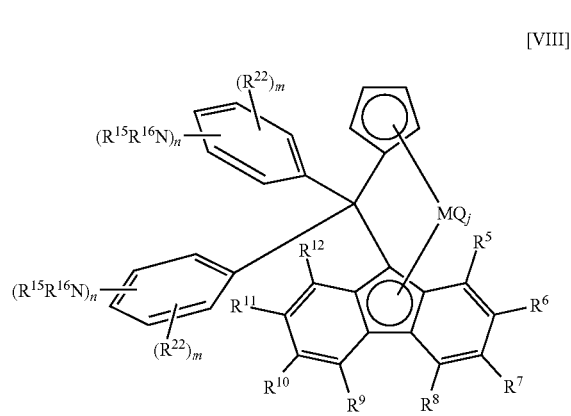

In the formula [VIII], definitions, etc. of M, $R^5$, $R^6$, $R^7$, $R^8$, $R^9$, $R^{10}$, $R^{11}$, $R^{12}$, Q and j are as previously described. $R^{15}$, $R^{16}$ and $R^{22}$ are each an atom or a substituent selected from a hydrogen atom, a hydrocarbon group having 1 to 20 carbon atoms, a silicon-containing group, a nitrogen-containing group, an oxygen-containing group, a halogen atom and a halogen-containing group, and may be the same as or different from each other, adjacent substituents of $R^5$ to $R^{22}$ may be bonded to each other to form a ring, $NR^{15}R^{15}$ is a nitrogen-containing group having a Hammett substituent constant σ of not more than −0.2, wherein when a plurality of the nitrogen-containing groups are present, these nitrogen-containing groups may be the same as or different from each other, n is an integer of 1 to 3, and m is an integer of 0 to 4.

In the crosslinked metallocene compound (A-3), $NR^{15}R^{16}$ represented by the aforesaid general formula [II] has a particularly low σ of the Hammett equation, and therefore, this compound exerts great effects particularly on solving of the problems (1) and (2) among the problems to be solved by the present invention.

When $R^{13}$ and $R^{14}$ in the crosslinked metallocene compound (A-2) represented by the general formula [VI] are the same substituted phenyl groups containing, as the electron-donating substituent, the oxygen-containing group at the meta position and/or the para position with respect to bonding to a carbon atom as the Y, the oxygen-containing group is more preferably a group represented by the following general formula [III].

In the formula [III], $R^{17}$ is an atom or a substituent selected from a hydrogen atom, a hydrocarbon group having 1 to 20 carbon atoms, a silicon-containing group, a nitrogen-containing group and a halogen-containing group, and a line drawn on the right-hand side of O represents bonding to the phenyl group.

Examples of the hydrocarbon groups having 1 to 20 carbon atoms, the silicon-containing groups, the nitrogen-containing groups and the halogen-containing groups as $R^{17}$ include the aforesaid specific examples of these substituents.

Such a crosslinked metallocene compound (A-4) is represented by the following general formula [IX].

In the formula [IX], definitions, etc. of M, $R^5$, $R^6$, $R^7$, $R^8$, $R^9$, $R^{10}$, $R^{11}$, $R^{12}$, Q and j are as previously described. $R^{17}$ and $R^{22}$ are each an atom or a substituent selected from a hydrogen atom, a hydrocarbon group having 1 to 20 carbon atoms, a silicon-containing group, a nitrogen-containing group, an oxygen-containing group, a halogen atom and a halogen-containing group, and may be the same as or different from each other, adjacent substituents of $R^5$ to $R^{22}$ may be bonded to each other to form a ring, $OR^{17}$ is an oxygen-containing group having a Hammett substituent constant σ of not more than −0.2, wherein when a plurality of the oxygen-containing groups are present, these oxygen-containing groups may be the same as or different from each other, n is an integer of 1 to 3, and m is an integer of 0 to 4.

In the crosslinked metallocene compound (A-4), $OR^{17}$ represented by the aforesaid general formula [III] has a lower σ of the Hammett equation, and therefore, this compound exerts greater effects particularly on solving of the problems (1) and (2) among the problems to be solved by the present invention.

In the crosslinked metallocene compound (A-3) represented by the general formula [VIII] or the crosslinked metallocene compound (A-4) represented by the general formula [IX], $R^5$, $R^8$, $R^9$ and $R^{12}$ are all more preferably hydrogen atoms. Such crosslinked metallocene compound (A-5) or (A-6) is represented by the following general formula [X] or [XI], respectively.

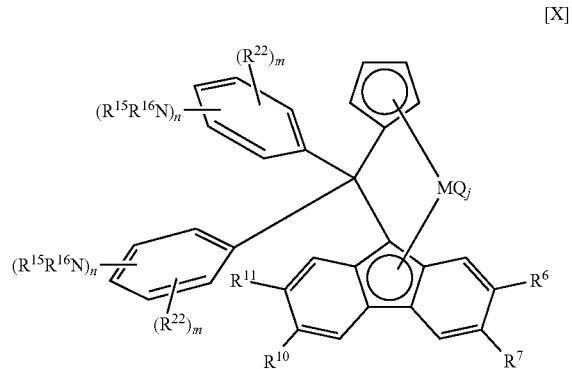

[X]

In the formula [X], definitions, etc. of M, $R^6$, $R^7$, $R^{10}$, $R^{11}$, Q and j are as previously described. $R^{15}$, $R^{16}$ and $R^{22}$ are each an atom or a substituent selected from a hydrogen atom, a hydrocarbon group having 1 to 20 carbon atoms, a silicon-containing group, a nitrogen-containing group, an oxygen-containing group, a halogen atom and a halogen-containing group, and may be the same as or different from each other, adjacent substituents of $R^6$ to $R^{22}$ may be bonded to each other to form a ring, $NR^{15}R^{16}$ is a nitrogen-containing group having a Hammett substituent constant σ of not more than −0.2, wherein when a plurality of the nitrogen-containing groups are present, these nitrogen-containing groups may be the same as or different from each other, n is an integer of 1 to 3, and m is an integer of 0 to 4.

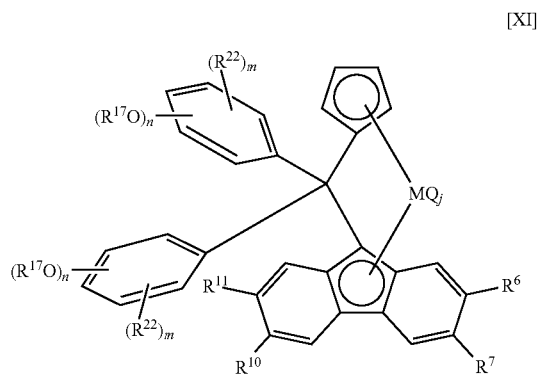

[XI]

In the formula [XI], definitions, etc. of M, $R^6$, $R^7$, $R^{10}$, $R^{11}$, Q and j are as previously described. $R^{17}$ and $R^{22}$ are each an atom or a substituent selected from a hydrogen atom, a hydrocarbon group having 1 to 20 carbon atoms, a silicon-containing group, a nitrogen-containing group, an oxygen-containing group, a halogen atom and a halogen-containing group, and may be the same as or different from each other, adjacent substituents of $R^6$ to $R^{22}$ may be bonded to each other to forma ring, $OR^{17}$ is an oxygen-containing group having a Hammett substituent constant σ of not more than −0.2, wherein when a plurality of the oxygen-containing groups are present, these oxygen-containing groups may be the same as or different from each other, n is an integer of 1 to 3, and m is an integer of 0 to 4.

When synthesized in accordance with, for example, such a process as shown by the aforesaid formula [VII], the crosslinked metallocene compound (A-5) or (A-6) has advantages that the synthesis is facilitated, that the production process is simplified, that the production cost is reduced, and that production cost of the ethylene/α-olefin copolymer is eventually reduced by the use of this crosslinked metallocene compound, as compared with a compound of the general formula [VIII] or [IX] in which one or more of $R^5$, $R^8$, $R^9$ and $R^{12}$ are substituents other than a hydrogen atom or halogen atoms.

In the crosslinked metallocene compound (A-5) represented by the general formula [X] or the cross linked metallocene compound (A-6) represented by the general formula [XI], at least two of $R^6$, $R^7$, $R^{10}$ and $R^{11}$ are each more preferably an atom or a substituent selected from a hydrocarbon group having 1 to 20 carbon atoms, a silicon-containing group, a nitrogen-containing group, an oxygen-containing group, a halogen atom and a halogen-containing group. When ethylene and one or more monomers selected from α-olefins having 3 or more carbon atoms are copolymerized in the presence of an olefin polymerization catalyst comprising the crosslinked metallocene compound, advantages of further enhancement in polymerization activity and further enhancement in molecular weight of the resulting ethylene/α-olefin copolymer are obtained.

In the crosslinked metallocene compound (A-5) represented by the general formula [X] or the crosslinked metallocene compound (A-6) represented by the general formula [XI], $R^6$ and $R^7$ are, and/or $R^{10}$ and $R^{11}$ are more preferably bonded to each other to form a ring. When ethylene and one or more monomers selected from α-olefins having 3 or more carbon atoms are copolymerized in the presence of an olefin polymerization catalyst comprising the crosslinked metallocene compound, advantages of further enhancement in polymerization activity and further enhancement in molecular weight of the resulting ethylene/α-olefin copolymer are obtained. Moreover, an advantage of further enhancement in α-olefin copolymerizability (reactivity of α-olefin to ethylene) is also obtained.

In the crosslinked metallocene compound (A-5) represented by the general formula [X] or the crosslinked metallocene compound (A-6) represented by the general formula [XI], $R^6$ and $R^7$ are, and $R^{10}$ and $R^{11}$ are both more preferably bonded to each other to form a ring. The crosslinked metallocene compound has advantages that the synthesis is facilitated, that the production process is simplified, that the production cost is reduced, and that production cost of the ethylene/α-olefin copolymer is eventually reduced by the use of this crosslinked metallocene compound, as compared with the case where only one of a combination of $R^6$ and $R^7$ and a combination of $R^{10}$ and $R^{11}$ in the crosslinked metallocene compound (A-5) represented by the general formula [X] or the crosslinked metallocene compound (A-6) represented by the general formula [XI] is bonded to form a ring.

In the crosslinked metallocene compound (A-5) represented by the general formula [X] or the crosslinked metallocene compound (A-6) represented by the general formula [XI], the rings formed by bonding of $R^6$ and $R^7$ to each other and $R^{10}$ and $R^{11}$ to each other are each more preferably a five-membered to seven-membered ring, particularly a six-membered ring. The crosslinked metallocene compound has advantages that the synthesis is facilitated, that the production process is simplified, that the production cost is reduced, and that the production cost of the ethylene/α-olefin copolymer is eventually reduced by the use of this crosslinked metallocene compound, as compared with the case where the rings formed by bonding of $R^6$ and $R^7$ to each other and $R^{10}$ and $R^{11}$ to each other in the crosslinked metallocene compound (A-5) represented by the general formula [X] or the crosslinked metallocene compound (A-6) represented by the general formula [XI] are rings other than five-membered to seven-membered rings.

The crosslinked metallocene compound (A-5) represented by the general formula [X] or the crosslinked metallocene compound (A-6) represented by the general formula [XI] is more preferably a crosslinked metallocene compound (A-7) represented by the following general formula [IV].

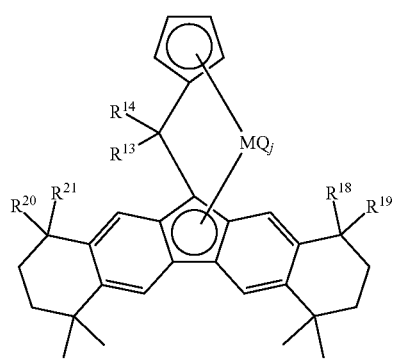

[IV]

In the formula [IV], M is a titanium atom, a zirconium atom or a hafnium atom, $R^{13}$ and $R^{14}$ are each selected from the substituted phenyl group containing a nitrogen-containing group at the meta position and/or the para position with respect to bonding to Y among the substituted phenyl groups described in the general formula [X] and the substituted phenyl group containing an oxygen-containing group at the meta position and/or the para position with respect to bonding to Y among the substituted phenyl groups described in the general formula [XI], $R^{18}$, $R^{19}$, $R^{20}$ and $R^{21}$ are each a hydrogen atom or a methyl group, Q is selected from a halogen atom, a hydrocarbon group having 1 to 20 carbon atoms, an anionic ligand and a neutral ligand capable of coordination with a lone pair of electrons, in a combination of the same or different kinds, and j is an integer of 1 to 4.

When ethylene and one or more monomers selected from α-olefins having 3 or more carbon atoms are copolymerized in the presence of an olefin polymerization catalyst comprising the crosslinked metallocene compound (A-7), advantages of further enhancement in polymerization activity and further enhancement in molecular weight of the resulting ethylene/α-olefin copolymer are obtained. Moreover, an advantage of further enhancement in α-olefin copolymerizability (reactivity of α-olefin to ethylene) is also obtained.

In the crosslinked metallocene compound (A) represented by the general formula [I], the crosslinked metallocene compound (A-1) represented by the general formula [V], the crosslinked metallocene compound (A-2) represented by the general formula [VI], the crosslinked metallocene compound (A-3) represented by the general formula [VIII], the crosslinked metallocene compound (A-4) represented by the general formula [IX], the crosslinked metallocene compound (A-5) represented by the general formula [X], the crosslinked metallocene compound (A-6) represented by the general formula [XI] or the crosslinked metallocene compound (A-7) represented by the general formula [IV], M is more preferably a hafnium atom. When ethylene and one or more monomers selected from α-olefins having 3 or more carbon atoms are copolymerized in the presence of an olefin polymerization catalyst comprising the above crosslinked metallocene compound in which M is a hafnium atom, an advantage of dramatic enhancement in increase in molecular weight of the resulting ethylene/α-olefin copolymer and in copolymerizability of α-olefin (reactivity of α-olefin to ethylene) is particularly obtained.

(Examples and the Like of the Crosslinked Metallocene Compounds (A))

Examples of such crosslinked metallocene compounds (A) include:

[bis[4-(dimethylamino)phenyl]methylene($\eta^5$-cyclopentadienyl)($\eta^5$-fluorenyl)]hafnium dichloride, [bis[4-(dimethylamino)phenyl]methylene($\eta^5$-cyclopentadienyl)($\eta^5$-2,7-dimethylfluorenyl)]hafnium dichloride, [bis[4-(dimethylamino)phenyl]methylene($\eta^5$-cyclopentadienyl)($\eta^5$-3,6-dimethylfluorenyl)]hafnium dichloride, [bis[4-(dimethylamino)phenyl]methylene($\eta^5$-cyclopentadienyl)($\eta^5$-2,7-di-t-butylfluorenyl)]hafnium dichloride, [bis[4-(dimethylamino)phenyl]methylene($\eta^5$-cyclopentadienyl)($\eta^5$-3,6-di-t-butylfluorenyl)]hafnium dichloride, [bis[4-(dimethylamino)phenyl]methylene($\eta^5$-cyclopentadienyl)($\eta^5$-2,3,6,7-tetramethylfluorenyl)]hafnium dichloride, [bis[4-(dimethylamino)phenyl]methylene($\eta^5$-cyclopentadienyl)($\eta^5$-2,7-dimethyl-3,6-di-t-butylfluorenyl)]hafnium dichloride, [bis[4-(dimethylamino)phenyl]methylene($\eta^5$-cyclopentadienyl)($\eta^5$-tetramethyloctahydrodibenzofluorenyl)]hafnium dichloride, [bis[4-(dimethylamino)phenyl]methylene($\eta^5$-cyclopentadienyl)($\eta^5$-octamethyloctahydrodibenzofluorenyl)]hafnium dichloride,

[bis(4-methoxyphenyl)methylene($\eta^5$-cyclopentadienyl)($\eta^5$-fluorenyl)]hafnium dichloride, [bis(4-methoxyphenyl)methylene($\eta^5$-cyclopentadienyl)($\eta^5$-2,7-dimethylfluorenyl)]hafnium dichloride, [bis(4-methoxyphenyl)methylene($\eta^5$-cyclopentadienyl)($\eta^5$-3,6-dimethylfluorenyl)]hafnium dichloride, [bis(4-methoxyphenyl)methylene($\eta^5$-cyclopentadienyl)($\eta^5$-2,7-di-t-butylfluorenyl)]hafnium dichloride, [bis(4-methoxyphenyl)methylene($\eta^5$-cyclopentadienyl)($\eta^5$-3,6-di-t-butylfluorenyl)]hafnium dichloride, [bis(4-methoxyphenyl)methylene($\eta^5$-cyclopentadienyl)($\eta^5$-2,3,6,7-tetramethylfluorenyl)]hafnium dichloride, [bis(4-methoxyphenyl)methylene($\eta^5$-cyclopentadienyl)($\eta^5$-2,7-dimethyl-3,6-di-t-butylfluorenyl)]hafnium dichloride, [bis(4-methoxyphenyl)methylene($\eta^5$-cyclopentadienyl)($\eta^5$-tetramethyloctahydrodibenzofluorenyl)]hafnium dichloride, [bis(4-methoxyphenyl)methylene($\eta^5$-cyclopentadienyl)($\eta^5$-octamethyloctahydrodibenzofluorenyl)]hafnium dichloride,

[bis(4-t-butylphenyl)methylene($\eta^5$-cyclopentadienyl)($\eta^5$-fluorenyl)]hafnium dichloride, [bis(4-t-butylphenyl)methylene($\eta^5$-cyclopentadienyl)($\eta^5$-2,7-dimethylfluorenyl)]hafnium dichloride, [bis(4-t-butylphenyl)methylene($\eta^5$-cyclopentadienyl)($\eta^5$-3,6-dimethylfluorenyl)]hafnium dichloride, [bis(4-t-butylphenyl)methylene($\eta^5$-cyclopentadienyl)($\eta^5$-2,7-di-t-butylfluorenyl)]hafnium dichloride, [bis(4-t-butylphenyl)methylene($\eta^5$-cyclopentadienyl)($\eta^5$-3,6-di-t-butylfluorenyl)]hafnium dichloride, [bis(4-t-butylphenyl)methylene($\eta^5$-cyclopentadienyl)($\eta^5$-2,3,6,7-tetramethylfluorenyl)]hafnium dichloride, [bis(4-t-butylphenyl)methylene($\eta^5$-cyclopentadienyl)($\eta^5$-2,7-dimethyl-3,6-di-t-butylfluorenyl)]hafnium dichloride, [bis(4-t-butylphenyl)methylene($\eta^5$-cyclopentadienyl)($\eta^5$-tetramethyloctahydrodibenzofluorenyl)]hafnium dichloride, [bis(4-t-butylphenyl)methylene($\eta^5$-cyclopentadienyl)($\eta^5$-octamethyloctahydrodibenzofluorenyl)]hafnium dichloride,

[bis(3-N-morpholinylphenyl)methylene($\eta^5$-cyclopentadienyl)($\eta^5$-fluorenyl)]hafnium dichloride, [bis(3-N-morpholinylphenyl)methylene($\eta^5$-cyclopentadienyl)($\eta^5$-2,7-dimethylfluorenyl)]hafnium dichloride, [bis(3-N- morpholinylphenyl)methylene($\eta^5$-cyclopentadienyl)($\eta^5$-3,6-dimethylfluorenyl)]hafnium dichloride, [bis(3-N-morpholinylphenyl)methylene($\eta^5$-cyclopentadienyl)($\eta^5$-2,7-di-t-butylfluorenyl)]hafnium dichloride, [bis(3-N-morpholinylphenyl)methylene($\eta^5$-cyclopentadienyl)($\eta^5$-3,6-di-t-butylfluorenyl)]hafnium dichloride, [bis(3-N-morpholinylphenyl)methylene($\eta^5$-cyclopentadienyl)($\eta^5$-2,3,6,7-tetramethylfluorenyl)]hafnium dichloride, [bis(3-N-morpholinylphenyl)methylene($\eta^5$-cyclopentadienyl)($\eta^5$-2,7-dimethyl-3,6-di-t-butylfluorenyl)]hafnium dichloride, [bis(3-N-morpholinylphenyl)methylene($\eta^5$-cyclopentadienyl)($\eta^5$-tetramethyloctahydrodibenzofluorenyl)]hafnium dichloride, [bis(3-N-morpholinylphenyl)methylene($\eta^5$-cyclopentadienyl)($\eta^5$-octamethyloctahydrodibenzofluorenyl)]hafnium dichloride,

[bis(4-N-morpholinylphenyl)methylene($\eta^5$-cyclopentadienyl)($\eta^5$-fluorenyl)]hafnium dichloride, [bis(4-N-morpholinylphenyl)methylene($\eta^5$-cyclopentadienyl)($\eta^5$-2,7-dimethylfluorenyl)]hafnium dichloride, [bis(4-N-morpholinylphenyl)methylene($\eta^5$-cyclopentadienyl)($\eta^5$-3,6-dimethylfluorenyl)]hafnium dichloride, [bis(4-N-morpholinylphenyl)methylene($\eta^5$-cyclopentadienyl)($\eta^5$-2,7-di-t-butylfluorenyl)]hafnium dichloride, [bis(4-N-morpholinylphenyl)methylene($\eta^5$-cyclopentadienyl)($\eta^5$-3,6-di-t-butylfluorenyl)]hafnium dichloride, [bis(4-N-morpholinylphenyl)methylene($\eta^5$-cyclopentadienyl)($\eta^5$-2,3,6,7-tetramethylfluorenyl)]hafnium dichloride, [bis(4-N-morpholinylphenyl)methylene($\eta^5$-cyclopentadienyl)($\eta^5$-2,7-dimethyl-3,6-di-t-butylfluorenyl)]hafnium dichloride, [bis(4-N-morpholinylphenyl)methylene($\eta^5$-cyclopentadienyl)($\eta^5$-tetramethyloctahydrodibenzofluorenyl)]hafnium dichloride, [bis(4-N-morpholinylphenyl)methylene($\eta^5$-cyclopentadienyl)($\eta^5$-octamethyloctahydrodibenzofluorenyl)]hafnium dichloride,

[bis(4-methoxy-3-methylphenyl)methylene($\eta^5$-cyclopentadienyl)($\eta^5$-fluorenyl)]hafnium dichloride, [bis(4-methoxy-3-methylphenyl)methylene($\eta^5$-cyclopentadienyl)($\eta^5$-2,7-dimethylfluorenyl)]hafnium dichloride, [bis(4-methoxy-3-methylphenyl)methylene($\eta^5$-cyclopentadienyl)($\eta^5$-3,6-dimethylfluorenyl)]hafnium dichloride, [bis(4-methoxy-3-methylphenyl)methylene($\eta^5$-cyclopentadienyl)($\eta^5$-2,7-di-t-butylfluorenyl)]hafnium dichloride, [bis(4-methoxy-3-methylphenyl)methylene($\eta^5$-cyclopentadienyl)($\eta^5$-3,6-di-t-butylfluorenyl)]hafnium dichloride, [bis(4-methoxy-3-methylphenyl)methylene($\eta^5$-cyclopentadienyl)($\eta^5$-2,3,6,7-tetramethylfluorenyl)]hafnium dichloride, [bis(4-methoxy-3-methylphenyl)methylene($\eta^5$-cyclopentadienyl)($\eta^5$-2,7-dimethyl-3,6-di-t-butylfluorenyl)]hafnium dichloride, [bis(4-methoxy-3-methylphenyl)methylene($\eta^5$-cyclopentadienyl)($\eta^5$-tetramethyloctahydrodibenzofluorenyl)]hafnium dichloride, [bis(4-methoxy-3-methylphenyl)methylene($\eta^5$-cyclopentadienyl)($\eta^5$-octamethyloctahydrodibenzofluorenyl)]hafnium dichloride,

[bis(3,4-dimethoxyphenyl)methylene($\eta^5$-cyclopentadienyl) ($\eta^5$-fluorenyl)]hafnium dichloride, [bis(3,4-dimethoxyphenyl)methylene($\eta^5$-cyclopentadienyl)($\eta^5$-2,7-dimethylfluorenyl)]hafnium dichloride, [bis(3,4-dimethoxyphenyl)methylene($\eta^5$-cyclopentadienyl)($\eta^5$-3,6-dimethylfluorenyl)]hafnium dichloride, [bis(3,4-dimethoxyphenyl)methylene($\eta^5$-cyclopentadienyl)($\eta^5$-2,7-di-t-butylfluorenyl)]hafnium dichloride, [bis(3,4-dimethoxyphenyl)methylene($\eta^5$-cyclopentadienyl)($\eta^5$-3,6-di-t-butylfluorenyl)]hafnium dichloride, [bis(3,4-dimethoxyphenyl)methylene($\eta^5$-cyclopentadienyl)($\eta^5$-2,3,6,7-tetramethylfluorenyl)]hafnium dichloride, [bis(3,4-dimethoxyphenyl)methylene($\eta^5$-cyclopentadienyl)($\eta^5$-2,7-dimethyl-3,6-di-t-butylfluorenyl)]hafnium dichloride, [bis(3,4-dimethoxyphenyl)methylene($\eta^5$-cyclopentadienyl)($\eta^5$-tetramethyloctahydrodibenzofluorenyl)]hafnium dichloride, [bis(3,4-dimethoxyphenyl)methylene($\eta^5$-cyclopentadienyl) ($\eta^5$-octamethyloctahydrodibenzofluorenyl)]hafnium dichloride,

[bis(4-methoxy-3,5-dimethylphenyl)methylene($\eta^5$-cyclopentadienyl)($\eta^5$-fluorenyl)]hafnium dichloride, [bis(4-methoxy-3,5-dimethylphenyl)methylene($\eta^5$-cyclopentadienyl)($\eta^5$-2,7-dimethylfluorenyl)]hafnium dichloride, [bis(4-methoxy-3,5-dimethylphenyl)methylene($\eta^5$-cyclopentadienyl)($\eta^5$-3,6-dimethylfluorenyl)]hafnium dichloride, [bis(4-methoxy-3,5-dimethylphenyl)methylene($\eta^5$-cyclopentadienyl)($\eta^5$-2,7-di-t-butylfluorenyl)]hafnium dichloride, [bis(4-methoxy-3,5-dimethylphenyl)methylene($\eta^5$-cyclopentadienyl)($\eta^5$-3,6-di-t-butylfluorenyl)]hafnium dichloride, [bis(4-methoxy-3,5-dimethylphenyl)methylene($\eta^5$-cyclopentadienyl)($\eta^5$-2,3,6,7-tetramethylfluorenyl)]hafnium dichloride, [bis(4-methoxy-3,5-dimethylphenyl)methylene($\eta^5$-cyclopentadienyl)($\eta^5$-2,7-dimethyl-3,6-di-t-butylfluorenyl)]hafnium dichloride, [bis(4-methoxy-3,5-dimethylphenyl)methylene($\eta^5$-cyclopentadienyl)($\eta^5$-tetramethyloctahydrodibenzofluorenyl)]hafnium dichloride, [bis(4-methoxy-3,5-dimethylphenyl)methylene($\eta^5$-cyclopentadienyl)($\eta^5$-octamethyloctahydrodibenzofluorenyl)] hafnium dichloride, and compounds wherein a hafnium atom in the above compounds is replaced with a zirconium atom or compounds wherein chloro ligands in the above compounds are replaced with methyl groups.

However, the crosslinked metallocene compound (A) is not limited to these examples. If preferred compounds have to be selected, there can be mentioned [bis(4-N-morpholinylphenyl)methylene($\eta^5$-cyclopentadienyl)($\eta^5$-octamethyloctahydrodibenzofluorenyl)]hafnium dichloride, [bis(4-dimethylamino)phenyl]methylene($\eta^5$-cyclopentadienyl) ($\eta^5$-octamethyloctahydrodibenzofluorenyl)]hafnium dichloride, [bis(3-N-morpholinylphenyl)methylene($\eta^5$-cyclopentadienyl)($\eta^5$-octamethyloctahydrodibenzofluorenyl)]hafnium dichloride, [bis(4-methoxy-3-methylphenyl)methylene($\eta^5$-cyclopentadienyl)($\eta^5$-octamethyloctahydrodibenzofluorenyl)]hafnium dichloride, [bis(4-methoxy-3,5-dimethylphenyl)methylene($\eta^5$-cyclopentadienyl)($\eta^5$-octamethyloctahydrodibenzofluorenyl)]hafnium dichloride, [bis(4-methoxyphenyl)methylene($\eta^5$-cyclopentadienyl)($\eta^5$-octamethyloctahydrodibenzofluorenyl)]hafnium dichloride, [bis[4-(dimethylamino)phenyl]methylene($\eta^5$-cyclopentadienyl)($\eta^5$-tetramethyloctahydrodibenzofluorenyl)]hafnium dichloride, [bis(4-methoxyphenyl)methylene($\eta^5$-cyclopentadienyl)($\eta^5$-tetramethyloctahydrodibenzofluorenyl)]hafnium dichloride, [bis(3,4-dimethoxyphenyl)methylene($\eta^5$-cyclopentadienyl)($\eta^5$-2,7-dimethyl-3,6-di-t-butylfluorenyl)] hafnium dichloride, [bis(4-methoxyphenyl)methylene($\eta^5$-cyclopentadienyl)($\eta^5$-2,7-dimethyl-3,6-di-t-butylfluorenyl)] hafnium dichloride, [bis(4-methoxyphenyl)methylene($\eta^5$-cyclopentadienyl)($\eta^5$-2,3,6,7-tetramethylfluorenyl)] hafnium dichloride, [bis(4-N-morpholinylphenyl)methylene ($\eta^5$-cyclopentadienyl)($\eta^5$-2,7-di-t-butylfluorenyl)]hafnium dichloride, [bis(3,4-dimethoxyphenyl)methylene($\eta^5$-cyclopentadienyl)($\eta^5$-2,7-dimethylfluorenyl)]hafnium dichloride, [bis(4-methoxyphenyl)methylene($\eta^5$-cyclopentadienyl)($\eta^5$-2,7-dimethylfluorenyl)]hafnium dichloride, [bis[4-(dimethylamino)phenyl]methylene($\eta^5$-cyclopentadienyl)($\eta^5$-3,6-di-t-butylfluorenyl)]hafnium dichloride, and [bis[4-(dimethylamino)phenyl]methylene($\eta^5$-cyclopentadienyl) ($\eta^5$-octamethyloctahydrodibenzofluorenyl)]zirconium dichloride.

The η⁵-tetramethyloctahydrodibenzofluorenyl and the η⁵-octamethyloctahydrodibenzofluorenyl that are each a constituent part of the crosslinked metallocene compounds (A) given as examples represent 4,4,7,7-tetramethyl-(5a,5b,11a,12,12a-η⁵)-1,2,3,4,7,8,9,10-octahydrodibenzo[b,h]fluorenyl group and 1,1,4,4,7,7,10,10-octamethyl-(5a,5b,11a,12,12a-η⁵)-1,2,3,4,7,8,9,10-octahydrodibenzo[b,h]fluorenyl group, respectively.

Thus, for example, [bis[4-(dimethylamino)phenyl]methylene(η⁵-cyclopentadienyl)(η⁵-tetramethyloctahydrodibenzofluorenyl)]hafnium dichloride represents a structure of the following formula [XII], and [bis(4-methoxyphenyl)methylene(η⁵-cyclopentadienyl)(η⁵-octamethyloctahydrodibenzofluorenyl)]hafnium dichloride represents a structure of the following formula [XIII]. Similar definition to this will be given also in the following description of the present invention.

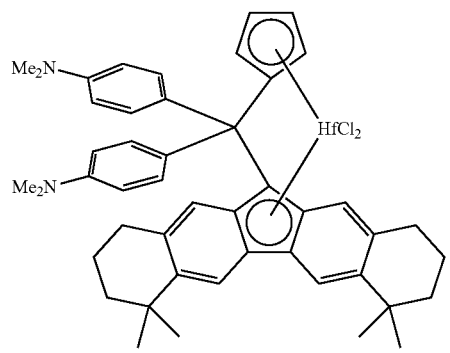

[XII]

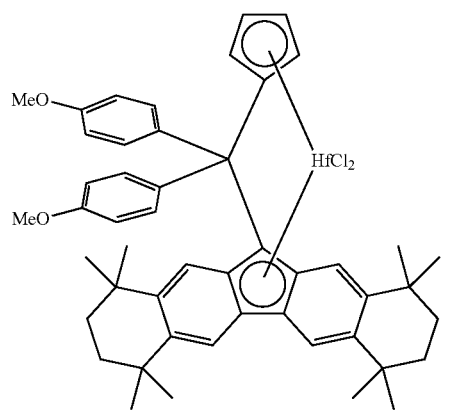

[XIII]

<Compound B>

The polymerization catalyst for use in the present invention is characterized by comprising the above-mentioned crosslinked metallocene compound (A), and further characterized by comprising the crosslinked metallocene compound (A) and at least one compound (B) selected from an organometallic compound (B-1), an organoaluminum oxy-compound (B-2) and a compound (B-3) which reacts with the crosslinked metallocene compound (A) to form an ion pair.

As the organometallic compound (B-1), such a compound of an organometal of Group 1, Group 2, Group 12 or Group 13 of the periodic table as described below is specifically used.

(B-1a) Organoaluminum compound represented by the general formula $R^a{}_m Al(OR^b)_n H_p X_q$ In the above formula, $R^a$ and $R^b$ may be the same as or different from each other and each represent a hydrocarbon group having 1 to 15 carbon atoms, preferably 1 to 4 carbon atoms, X represents a halogen atom, m is a number of $0 < m \leq 3$, n is a number of $0 \leq n < 3$, p is a number of $0 \leq p < 3$, q is a number of $\leq q < 3$, and m+n+p+q=3.

Examples of such compounds include:

tri-n-alkylaluminums, such as trimethylaluminum, triethylaluminum, tri-n-butylaluminum, tri-n-hexylaluminum and tri-n-octylaluminum, tri-branched alkylaluminums, such as triisopropylaluminum, triisobutylaluminum, tri-sec-butylaluminum, tri-t-butylaluminum, tri-2-methylbutylaluminum, tri-3-methylhexylaluminum and tri-2-ethylhexylaluminum, tricycloalkylaluminums, such as tricyclohexylaluminum and tricyclooctylaluminum, triarylaluminums, such as triphenylaluminum and tri(4-methylphenyl)aluminum, dialkylaluminum hydrides, such as diisopropylaluminum hydride and diisobutylaluminum hydride, alkenylaluminums represented by the general formula $(i\text{-}C_4H_9)_x Al_y(C_5H_{10})_z$, wherein x, y and z are positive numbers, and $z \leq 2x$, such as isoprenylaluminum, alkylaluminumalkoxides, such as isobutylaluminummethoxide and isobutylaluminum ethoxide, dialkylaluminum alkoxides, such as dimethylaluminum methoxide, diethylaluminum ethoxide and dibutylaluminum butoxide, alkylaluminum sesquialkoxides, such as ethylaluminum sesquiethoxide and butylaluminum sesquibutoxide, partially alkoxylated alkylaluminums having average composition represented by the general formula $R^a{}_{2.5}Al(OR^b)_{0.5}$ or the like, alkylaluminum aryloxides, such as diethylaluminum phenoxide and diethylaluminum(2,6-di-t-butyl-4-methylphenoxide), dialkylaluminum halides, such as dimethylaluminum chloride, diethylaluminum chloride, dibutylaluminum chloride, diethylaluminum bromide and diisobutylaluminum chloride, alkylaluminum sesquihalides, such as ethylaluminum sesquichloride, butylaluminum sesquichloride and ethylaluminum sesquibromide, partially halogenated alkylaluminums, e.g., alkylaluminum dihalides, such as ethylaluminum dichloride, dialkylaluminum hydrides, such as diethylaluminum hydride and dibutylaluminum hydride, alkylaluminum dihydrides and other partially hydrogenated alkylaluminums, such as ethylaluminum dihydride and propylaluminum dihydride, and partially alkoxylated and halogenated alkylaluminums, such as ethylaluminum ethoxychloride, butylaluminum butoxychloride and ethylalumium ethoxybromide.

Further, compounds analogous to the compounds represented by the general formula $R^a{}_m Al(OR^b)_n H_p X_q$ can be also used, and for example, organoaluminum compounds in which two or more aluminum compounds are bonded through a nitrogen atom can be mentioned. Specific examples of such compounds include $(C_2H_5)_2 AlN(C_2H_5)Al(C_2H_5)_2$.

(B-1b) Complex alkylated compound of Group 1 metal of the periodic table and aluminum, said compound being represented by the general formula $M^2 AlR^a{}_4$ In the above formula, $M^2$ represents Li, Na or K, and $R^a$ represents a hydrocarbon group having 1 to 15 carbon atoms, preferably 1 to 4 carbon atoms.

Examples of such compounds include LiAl(C$_2$H$_5$)$_4$ and LiAl(C$_7$H$_{15}$)$_4$.

(B-1c) Dialkyl compound of Group 2 or Group 12 metal of the periodic table, said compound being represented by the general formula R$^a$R$^b$M$^3$ In the above formula, R$^a$ and R$^b$ may be the same as or different from each other and each represent a hydrocarbon group having 1 to 15 carbon atoms, preferably 1 to 4 carbon atoms, and M$^3$ is Mg, Zn or Cd.

As the organoaluminum oxy-compound (B-2), hitherto publicly known aluminoxane can be used as it is. Specifically, there can be mentioned a compound represented by the following general formula [XIV] and/or a compound represented by the following general formula [XV]:

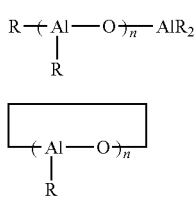

[XIV]

[XV]

wherein R represents a hydrocarbon group having 1 to 10 carbon atoms, and n represents an integer of 2 or greater.

In particular, methylaluminoxane wherein R is a methyl group and n is 3 or greater, preferably 10 or greater, is utilized. In these aluminoxanes, a small amount of an organoaluminum compound may be contained. When copolymerization of ethylene and an α-olefin having 3 or more carbon atoms is carried out at a high temperature in the present invention, such a benzene-insoluble organoaluminum oxy-compound as given as an example in Japanese Patent Laid-Open Publication No. 1990-78687 can be also applied. Further, an organoaluminum oxy-compound described in Japanese Patent Laid-Open Publication No. 1990-167305, an aluminoxane having two or more kinds of alkyl groups, which is described in Japanese Patent Laid-Open Publication No. 1990-24701 and Japanese Patent Laid-Open Publication No. 1991-103407, etc. can be also preferably utilized. The "benzene-insoluble organoaluminum oxy-compound", which can be used in the present invention, is a compound that contains an Al component soluble in benzene at 60° C. usually in an amount of not more than 10%, preferably not more than 5%, particularly preferably not more than 2%, in terms of Al atom, and that is insoluble or slightly soluble in benzene.

As the organoaluminum oxy-compound (B-2), such a modified methylaluminoxane as represented by the following general formula [XVI], or the like can be also mentioned.

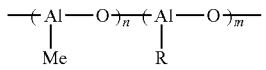

[XVI]

In this formula, R represents a hydrocarbon group having 1 to 10 carbon atoms, and m and n each independently represent an integer of 2 or greater.

This modified methylaluminoxane is prepared by the use of trimethylaluminum and an alkylaluminum other than trimethylaluminum. Such a compound is generally called MMAO. Such MMAO can be prepared by processes mentioned in U.S. Pat. No. 4,960,878 and U.S. Pat. No. 5,041,584. Moreover, a compound prepared by the use of trimethylaluminum and triisobutylaluminum and having an isobutyl group as R is also commercially available from Tosoh Finechem Corporation, etc. under the name of MMAO or TMAO. Such MMAO is an aluminoxane having been improved in solubility in various solvents and storage stability, and specifically, it is dissolved in aliphatic hydrocarbons and alicyclic hydrocarbons differently from a compound that is insoluble or slightly soluble in benzene among the compounds represented by the above formulas [XIV] and [XV].

As the organoaluminum oxy-compound (B-2), an organoaluminum oxy-compound containing boron and represented by the following general formula [XVII] can be also mentioned.

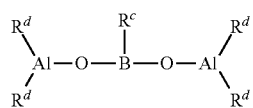

[XVII]

In this formula, R$^c$ represents a hydrocarbon group having 1 to 10 carbon atoms. Plural R$^d$ may be the same as or different from each other and each represent a hydrogen atom, a halogen atom or a hydrocarbon group having 1 to 10 carbon atoms.

As the compound (B-3) which reacts with the crosslinked metallocene compound (A) to form an ion pair (sometimes referred to as "ionizing ionic compound" or "ionic compound" simply hereinafter), Lewis acid, an ionic compound, a borane compound, a carborane compound, etc. described in Japanese Patent Laid-Open Publications Nos. 1989-501950, 1989-502036, 1991-179005, 1991-179006, 1991-207703, and 1991-207704, U.S. Pat. No. 5,321,106, etc. can be mentioned. Further, a heteropoly compound and an isopoly compound can be also mentioned. However, the organoaluminum oxy-compound (B-2) described above is not included.

An ionizing ionic compound preferably used in the present invention is a boron compound represented by the following general formula [XVIII].

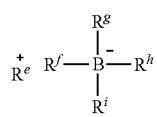

[XVIII]

In this formula, R$^{e+}$ is H$^+$, carbenium cation, oxonium cation, ammonium cation, phosphonium cation, cycloheptyltrienyl cation, ferrocenium cation containing a transition metal, or the like. R$^f$ to R$^i$ may be the same as or different from each other and are each a substituent selected from a hydrocarbon group having 1 to 20 carbon atoms, a silicon-containing group, a nitrogen-containing group, an oxygen-containing group, a halogen atom and a halogen-containing group, preferably a substituted aryl group.

Specific examples of the carbenium cations include tri-substituted carbenium cations, such as triphenylcarbenium cation, tris(4-methylphenyl)carbenium cation and tris(3,5-dimethylphenyl)carbenium cation.

Specific examples of the ammonium cations include trialkyl-substituted ammonium cations, such as trimethylammonium cation, triethylammonium cation, tri(n-propyl)ammonium cation, triisopropylammonium cation, tri(n-butyl) ammonium cation and triisobutylammonium cation, N,N-dialkylanilinium cations, such as N,N-dimethylanilinium cation, N,N-diethylanilinium cation and N,N-2,4,6-pentamethylanilinium cation, and dialkylammonium cations, such as diisopropylammonium cation and dicyclohexylammonium cation.

Specific examples of the phosphonium cations include triarylphosphonium cations, such as triphenylphosphonium cation, tris(4-methylphenyl)phosphonium cation and tris(3,5-dimethylphenyl)phosphonium cation.

As $R^{e+}$, carbenium cation, ammonium cation or the like is preferable and in, triphenylcarbenium cation, N,N-dimethylanilinium cation or N,N-diethylanilium cation is particularly preferable among the above specific examples.

Examples of compounds containing carbenium cation, among the ionizing ionic compounds preferably used in the present invention, include triphenylcarbenium tetraphenylborate, triphenylcarbenium tetrakis(pentafluorophenyl)borate, triphenylcarbenium tetrakis[3,5-di-(trifluoromethyl)phenyl]borate, tris(4-methylphenyl)carbenium tetrakis(pentafluorophenyl)borate and tris(3,5-dimethylphenyl)carbenium tetrakis(pentafluorophenyl)borate.

Examples of compounds containing trialkyl-substituted ammonium cation, among the ionizing ionic compounds preferably used in the present invention, include triethylammonium tetraphenylborate, tripropylammonium tetraphenylborate, tri(n-butyl)ammonium tetraphenylborate, trimethylammonium tetrakis(4-methylphenyl)borate, trimethylammonium tetrakis(2-methylphenyl)borate, tri(n-butyl)ammonium tetrakis(pentafluorophenyl)borate, triethylammonium tetrakis(pentafluorophenyl)borate, tripropylammonium tetrakis(pentafluorophenyl)borate, tripropylammonium tetrakis(2,4-dimethylphenyl)borate, tri(n-butyl)ammonium tetrakis(3,5-dimethylphenyl)borate, tri(n-butyl)ammonium tetrakis[4-(trifluoromethyl)phenyl]borate, tri(n-butyl)ammonium tetrakis[3,5-di(trifluoromethyl)phenyl]borate, tri(n-butyl)ammonium tetrakis(2-methylphenyl)borate, dioctadecylmethylammonium tetraphenylborate, dioctadecylmethylammonium tetrakis(4-methylphenyl)borate, dioctadecylmethylammonium tetrakis(4-methylphenyl)borate, dioctadecylmethylammonium tetrakis(pentafluorophenyl)borate, dioctadecylmethylammonium tetrakis(2,4-dimethylphenyl)borate, dioctadecylmethylammonium tetrakis(3,5-dimethylphenyl)borate, dioctadecylmethylammonium tetrakis[4-(trifluoromethyl)phenyl]borate, dioctadecylmethylammonium tetrakis[3,5-di(trifluoromethyl)phenyl]borate and dioctadecylmethylammonium.

Examples of compounds containing N,N-dialkylanilinium cation, among the ionizing ionic compounds preferably used in the present invention, include N,N-dimethylanilinium tetraphenylborate, N,N-dimethylanilinium tetrakis(pentafluorophenyl)borate, N,N-dimethylanilinium tetrakis[3,5-di(trifluoromethyl)phenyl]borate, N,N-diethylanilinium tetraphenylborate, N,N-diethylanilinium tetrakis(pentafluorophenyl)borate, N,N-diethylanilinium tetrakis[3,5-di(trifluoromethyl)phenyl]borate, N,N-2,4,6-pentamethylanilinium tetraphenylborate and N,N-2,4,6-pentamethylanilinium tetrakis(pentafluorophenyl)borate.

Examples of compounds containing dialkylammonium cation, among the ionizing ionic compounds preferably used in the present invention, include di-n-propylammonium tetrakis(pentafluorophenyl)borate and dicyclohexylammonium tetraphenylborate.

In addition, ionic compounds disclosed (Japanese Patent Laid-Open Publication No. 2004-51676) by the present applicant are also employable without any restriction.

The above ionic compound (B-3) may be used singly or as a mixture of two or more kinds.

As the organometallic compound (B-1), preferable are trimethylaluminum, triethylaluminum and triisobutylaluminum that are easily obtainable because of commercial products. Of these, triisobutylaluminum that is easy to handle is particularly preferable.

As the organoaluminum oxy-compound (B-2), preferable are methylaluminoxane and MMAO that are easily obtainable because of commercial products, said MMAO prepared by the use of trimethylaluminum and triisobutylaluminum. Of these, MMAO having been improved in solubility in various solvents and storage stability is particularly preferable.

As the compound (B-3) which reacts with the crosslinked metallocene compound (A) to form an ion pair, preferable are triphenylcarbenium tetrakis(pentafluorophenyl)borate and N,N-dimethylanilinium tetrakis(pentafluorophenyl)borate because they are easily obtainable as commercial products and greatly contribute to enhancement in polymerization activity.

As at least one compound (B) selected from the compounds (B-1) to (B-3), a combination of triisobutylaluminum and triphenylcarbenium tetrakis(pentafluorophenyl)borate and a combination of triisobutylaluminum and N,N-dimethylanilinium tetrakis(pentafluorophenyl)borate are particularly preferable because polymerization activity is greatly enhanced.

<Carrier (C)>

In the present invention, a carrier (C) may be used as a constituent of an olefin polymerization catalyst, when needed.

The carrier (C) that can be used in the present invention is an inorganic or organic compound and is a granular or fine particulate solid. As the inorganic compound, a porous oxide, an inorganic chloride, clay, a clay mineral or an ion-exchange layered compound is preferable.

As the porous oxide, $SiO_2$, $Al_2O_3$, $MgO$, $ZrO$, $TiO_2$, $B_2O_3$, $CaO$, $ZnO$, $BaO$, $ThO_2$ and the like, and composites or mixtures containing them, such as natural or synthetic zeolite, $SiO_2$—$MgO$, $SiO_2$—$Al_2O_3$, $SiO_2$—$TiO_2$, $SiO_2$—$V_2O_5$, $SiO_2$—$Cr_2O_3$ and $SiO_2$—$TiO_2$—$MgO$, can be specifically used. Of these, porous oxides containing $SiO_2$ and/or $Al_2O_3$ as a main component are preferable. Such porous oxides differ in their properties depending upon the type and the production process, but a carrier preferably used in the present invention has a particle diameter of 0.5 to 300 μm, preferably 1.0 to 200 μm, a specific surface area of 50 to 1000 $m^2/g$, preferably 100 to 700 $m^2/g$, and a pore volume of 0.3 to 3.0 $cm^3/g$. Such a carrier is used after it is calcined at 100 to 1000° C., preferably 150 to 700° C., when needed.

As the inorganic chloride, $MgCl_2$, $MgBr_2$, $MnCl_2$, $MnBr_2$ or the like is used.

The inorganic chloride may be used as it is, or may be used after pulverized with a ball mill or an oscillating mill. Further, fine particles obtained by dissolving an inorganic chloride in a solvent such as an alcohol and then precipitating it using a precipitant may be used.

The clay usually comprises a clay mineral as a main component. The ion-exchange layered compound is a compound having a crystal structure in which constituent planes lie one upon another in parallel by ionic bonding or the like with a weak bonding force, and the ions contained are exchangeable. Most of clay minerals are ion-exchange layered compounds. These clay, clay mineral and ion-exchange layered compound are not limited to natural ones, and artificial synthetic products can be also used. Examples of the clays, the clay minerals and the ion-exchange layered compounds include clays, clayminerals and ionic crystalline compounds having a layered crystal structure such as hexagonal closest packing type, antimony type, $CdCl_2$ type and $CdI_2$ type. Examples of such clays and clay minerals include kaolin, bentonite, Kibushi clay, Gairome clay, allophane, hisingerite, pyrophyllite, micas, montmorillonites, vermiculite, chlorites, palygorskite, kaolinite, nacrite, dickite and halloysite. Examples of the ion-exchange layered compounds include crystalline acidic salts of polyvalent metals, such as $\alpha$-$Zr(HAsO_4)_2 \cdot H_2O$, $\alpha$-$Zr(HPO_4)_2$, $\alpha$-$Zr(KPO_4)_2 \cdot 3H_2O$, $\alpha$-$Ti(HPO_4)_2$, $\alpha$-$Ti(HAsO_4)_2 \cdot H_2O$, $\alpha$-$Sn(HPO_4)_2 \cdot H_2O$, $\gamma$-$Zr(HPO_4)_2$, $\gamma$-$Ti(HPO_4)_2$ and $\gamma$-$Ti(NH_4PO_4)_2 \cdot H_2O$. It is preferable to subject the clay and the clay mineral for use in the present invention to chemical treatment. As the chemical treatment, any of surface treatments to remove impurities adhering to a surface and treatments having influence on the crystal structure of clay can be used. Specific examples of the chemical treatments include acid treatment, alkali treatment, salts treatment and organic substance treatment.

The ion-exchange layered compound may be a layered compound in which spacing between layers has been enlarged by exchanging exchangeable ions present between layers with other large bulky ions. Such a bulky ion plays a pillar-like role to support a layer structure and is usually called pillar. Insertion of another substance (guest compound) between layers of a layered compound as above is referred to as "intercalation". Examples of the guest compounds include cationic inorganic compounds, such as $TiCl_4$ and $ZrCl_4$, metal alkoxides, such as $Ti(OR)_4$, $Zr(OR)_4$, $PO(OR)_3$ and $B(OR)_3$, wherein R is a hydrocarbon group or the like, and metal hydroxide ions, such as $[Al_{13}O_4(OH)_{24}]^{7+}$, $[Zr_4(OH)_{14}]^{2+}$ and $[Fe_3O(OCOCH_3)_6]^+$. These compounds are used singly or in combination of two or more kinds. During intercalation of these compounds, a polymerization product obtained by subjecting a metallic alkoxide, such as $Si(OR)_4$, $Al(OR)_3$ and $Ge(OR)_4$, wherein R is a hydrocarbon group or the like, to hydrolysis polycondensation, a colloidal inorganic compound, such as $SiO_2$, etc. may coexist. As the pillar, an oxide formed by intercalating the above metal hydroxide ion between layers and then performing thermal dehydration or the like can be mentioned. Of the above carriers, preferable are clays and clay minerals, and particularly preferable are montmorillonite, vermiculite, pectolite, taeniolite and synthetic mica.

As the organic compound functioning as the carrier (C), a granular or fine particulate solid having a particle diameter of 0.5 to 300 µm can be mentioned. Specific examples thereof include a (co)polymer produced using, as a main component, an α-olefin having 2 to 14 carbon atoms, such as ethylene, propylene, 1-butene and 4-methyl-1-pentene, a (co)polymer produced using, as a main component, vinylcyclohexane or styrene, and a modified product thereof.

<Copolymerization of Ethylene and α-Olefin Using the Above Olefin Polymerization Catalyst>

The process for producing an ethylene/α-olefin copolymer according to the present invention is characterized by copolymerizing ethylene and an α-olefin having 3 or more carbon atoms in the presence of the above-mentioned olefin polymerization catalyst.

Examples of the α-olefins for use in the present invention include straight-chain or branched α-olefins having 3 to 20 carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecne, 1-eicosene and vinylcyclohexane. As the α-olefin, a straight-chain or branched α-olefin having 3 to 10 carbon atoms is preferable, and propylene, 1-butene, 1-hexene and 1-octene are more preferable. These α-olefins can be used singly or in combination of two or more kinds.

Further, polymerization may be advanced while at least one kind selected from a polar group-containing monomer, an aromatic vinyl compound and a cyclic olefin coexists in the reaction system. The other monomer can be used in amounts of, for example, not more than 20 parts by mass, preferably not more than 10 parts by mass, based on 100 parts by mass of the total of ethylene and the α-olefin having 3 or more carbon atoms.

Examples of the polar group-containing monomers include α,β-unsaturated carboxylic acids, such as acrylic acid, methacrylic acid, fumaric acid and maleic anhydride, metal salts thereof, such as sodium salts thereof, α,β-unsaturated carboxylic esters, such as methyl acrylate, ethyl acrylate, n-propylacrylate, methyl methacrylate and ethyl methacrylate, vinyl esters, such as vinyl acetate and vinyl propionate, and unsaturated glycidyls, such as glycidyl acrylate and glycidyl methacrylate.

Examples of the aromatic vinyl compounds include styrene, o-methylstyrene, m-methylstyrene, p-methylstyrene, o,p-dimethylstyrene, methoxystyrene, vinylbenzoic acid, methyl vinylbenzoate, vinylbenzyl acetate, hydroxystyrene, p-chlorostyrene, divinylbenzene, α-methylstyrene and allylbenzene.

Examples of the cyclic olefins include cyclic olefins having 3 to 30 carbon atoms, preferably 3 to 20 carbon atoms, such as cyclopentene, cycloheptene, norbornene, 5-methyl-2-norbornene and tetracyclododecene.

As the process for producing an ethylene/α-olefin copolymer according to the present invention, there can be mentioned a process comprising copolymerizing ethylene and an α-olefin having 3 or more carbon atoms in the presence of the aforesaid olefin polymerization catalyst, wherein polymerization is carried out in such a manner as to obtain an ethylene/α-olefin copolymer in which the proportion of constituent units derived from ethylene is not less than 50% by mol when the total of constituent units derived from all monomers in the polymer is 100% by mol.

When ethylene and one olefin selected from α-olefins having 3 to 20 carbon atoms are copolymerized, the charge molar ratio between ethylene and the α-olefin having 3 to 20 carbon atoms is usually ethylene:α-olefin=10:90 to 99.9:0.1, preferably ethylene:α-olefin=30:70 to 99.9:0.1, more preferably ethylene:α-olefin=50:50 to 99.9:0.1.

By virtue of the polymerization process using an olefin polymerization catalyst capable of producing an ethylene/α-olefin copolymer having a high molecular weight, which is the problem (1) of the present invention, high-temperature polymerization becomes possible. That is to say, by the use of the olefin polymerization catalyst, the molecular weight of an ethylene/α-olefin copolymer produced in the high-temperature polymerization can be kept at a desired high value. In solution polymerization, the viscosity of a polymer solution containing the resulting ethylene/α-olefin copolymer is decreased at a high temperature, and therefore, it becomes possible to raise a concentration of the ethylene/α-olefin copolymer in the polymerizer as compared with low-temperature polymerization, and as a result, productivity per polymerizer is enhanced. The copolymerization of ethylene and an α-olefin in the present invention can be carried out by any of a liquid phase polymerization process, such as solution polymerization or suspension polymerization (slurry polymerization), and a gas phase polymerization process. The solution polymerization is particularly preferable from the viewpoint that the maximum effect of the present invention can be enjoyed as described above.

Uses of the components of the olefin polymerization catalyst and the order of addition of the components are arbitrarily selected. Further, at least two of the components in the catalyst may have been brought into contact with each other in advance.

The crosslinked metallocene compound (A) (also referred to as a "component (A)" hereinafter) is used in such an amount that the amount of the component (A) becomes usually $10^{-9}$ to $10^{-1}$ mol, preferably $10^{-8}$ to $10^{-2}$ mol, per 1 liter of the reaction volume.

The organometallic compound (B-1) (also referred to as a "component (B-1)" hereinafter) is used in such an amount that the molar ratio [(B-1)/M] of the component (B-1) to a transition metal atom (M) in the component (A) becomes usually 0.01 to 50000, preferably 0.05 to 10000.

The organoaluminum oxy-compound (B-2) (also referred to as a "component (B-2)" hereinafter) is used in such an amount that the molar ratio [(B-2)/M] of an aluminum atom in the component (B-2) to a transition metal atom (M) in the component (A) becomes usually 10 to 5000, preferably 20 to 2000.

The compound (B-3) which reacts with the crosslinked metallocene compound (A) to form an ion pair (also referred to as a "component (B-3)" hereinafter) is used in such an amount that the molar ratio [(B-3)/M] of the component (B-3) to a transition metal atom (M) in the component (A) becomes usually 1 to 10000, preferably 1 to 5000.

The polymerization temperature is desired to be a high temperature at which the maximum effect of the present invention can be enjoyed, and is usually 100° C. to 300° C. The lower limit of the temperature is preferably 120° C., more preferably 130° C., and the upper limit of the temperature is preferably 250° C., more preferably 200° C. As the temperature increases in the polymerization temperature region of not lower than 100° C., the solution viscosity during polymerization decreases, removal of heat of polymerization is facilitated, and increase in molecular weight of the resulting ethylene/α-olefin copolymer can be achieved. However, if the polymerization temperature exceeds 300° C., deterioration of the resulting polymer sometimes takes place, so that such a temperature is undesirable. Moreover, from the viewpoint of properties of an ethylene/α-olefin copolymer that is preferably produced by the olefin polymerization of the present invention, an ethylene/α-olefin copolymer that is suitably employable in many industrial fields such as a field of films can be effectively produced in the polymerization temperature region of 100° C. to 200° C.

The polymerization pressure is usually normal pressure to 10 MPa gauge pressure (MPa-G), preferably normal pressure to 8 MPa-G.

The polymerization reaction can be carried out in any of a batch process, a semi-continuous process and a continuous process. Further, the polymerization can be continuously carried out in two or more polymerizers different in reaction conditions.

The molecular weight of the resulting ethylene/α-olefin copolymer can be controlled by changing hydrogen concentration or polymerization temperature in the polymerization system. The molecular weight can be also controlled by the amount of the component (B) used. When hydrogen is added, the amount thereof is suitably about 0.001 to 5000 NL per 1 kg of the resulting ethylene/α-olefin copolymer.

A polymerization solvent used in the liquid phase polymerization process is usually an inert hydrocarbon solvent and is preferably a saturated hydrocarbon having a boiling point of 50° C. to 200° C. at normal pressure. Specific examples of the polymerization solvents include aliphatic hydrocarbons, such as propane, butane, pentane, hexane, heptane, octane, decane, dodecane and kerosene, and alicyclic hydrocarbons, such as cyclopentane, cyclohexane and methylcyclopentane. Particularly preferable are hexane, heptane, octane, decane and cyclohexane. The α-olefin itself that is a polymerization object can be also used as the polymerization solvent. Aromatic hydrocarbons, such as benzene, toluene and xylene, and halogenated hydrocarbons, such as ethylene chloride, chlorobenzene and dichloromethane, can be also used as the polymerization solvent, but from the viewpoints of reduction in burden on the environment and minimization of effect on human body health, use of these hydrocarbons is undesirable.

The density of the olefin polymer obtained by the olefin polymerization process of the present invention is usually 850 to 950 kg/m³, preferably 860 to 950 kg/m³.

The melt flow rate $MFR_2$ (ASTM D-1238, 190° C., load of 2.16 kg) of the olefin polymer obtained by the olefin polymerization process of the present invention is usually 0.01 to 200 g/10 min, preferably 0.05 to 100 g/10 min. $MFR_2$ in this range is preferable because the olefin polymer is excellent in shaping processability.

The amount of constituent units derived from ethylene in the ethylene/α-olefin copolymer obtained by the present invention is usually 99.5 to 50 mol %, preferably 99.9 to 65 mol %, still more preferably 99.7 to 70 mol %, and the amount of constituent units derived from the α-olefin is 50 mol % to 0.1 mol %, preferably 35 mol % to 0.1 mol %, more preferably 30 mol % to 0.3 mol %, with the proviso that the total amount of the constituent units derived from ethylene and the constituent units derived from the α-olefin is 100 mol %.

The amounts of vinyl, vinylidene, di-substituted olefin and tri-substituted olefin, being molecular chain double bonds, are each preferably less than 0.2, more preferably less than 0.1, per 1000 carbon atoms. The lower limit of each of them is preferably 0 per 1000 carbon atoms. When the amount of the molecular chain double bonds is in this range, crosslinking during thermal shaping and scission of polymer molecular chain are suppressed, variation of MFR during shaping processing or scorch hardly occurs, and in addition, deterioration of the copolymer during, for example, use under the heating conditions can be suppressed, so that such an amount is preferable.

EXAMPLES

The present invention is more concretely described with reference to the following examples, but it should be construed that the present invention is in no way limited to those examples.

Structures of a crosslinked metallocene compound and its precursor were determined by measuring a $^1$H NMR spectrum (270 MHz, JEOL GSH-270), a FD-mass (referred to as "FD-MS" hereinafter) spectrum (JEOL SX-102A), etc.

[Bis(4-methylphenyl)methylene($\eta^5$-cyclopentadienyl)($\eta^5$-octamethyloctahydrodibenzofluorenyl)]zirconium dichloride was synthesized in accordance with a process described in WO2004/029062.

Properties or characteristics of an ethylene/α-olefin copolymer were measured by the following methods.

[1-Octene Content]

Using a Fourier transform infrared spectrophotometer FT/IR-610 manufactured by JASCO Corporation, absorbances of 1-octene in absorption near 1376 cm$^{-1}$ attributed to the methyl symmetric deformation vibration and absorption near 4325 cm$^{-1}$ attributed to an overtone absorption of the C—H stretching vibration were measured. Next, a ratio between these absorbances (D1376 cm$^{-1}$/D4325 cm$^{-1}$) was calculated, and using a previously prepared calibration curve, which was prepared using a standard sample standardized by $^{13}$C-NMR, a 1-octene content (mol %) was determined.

[1-Butene Content]

Using a Fourier transform infrared spectrophotometer FT/IR-4100 manufactured by JASCO Corporation, absorbances of 1-butene in absorption near 771 cm$^{-1}$ attributed to the CH$_2$ deformation vibration on an ethyl group and absorption near 4325 cm$^{-1}$ attributed to an overtone vibration of the C—H stretching vibration were measured. Next, a ratio between these absorbances (D771 cm$^{-1}$/D4325 cm$^{-1}$) was calculated, and using a previously prepared calibration curve, which was prepared using a standard sample standardized by $^{13}$C-NMR, a 1-butene content (mol %) was determined.

[Amount of Molecular Chain Double Bonds]

A $^1$H NMR spectrum (400 MHz, JEOL ECX400P) was measured using o-dichlorobenzene-d$_4$ as a measurement solvent under the measuring conditions of a measuring temperature of 120° C., a spectral width of 20 ppm, a pulse repetition time of 7.0 seconds and a pulse width of 6.15 μsec (45° pulse) to calculate the amount.

[Intrinsic Viscosity ([η])]

Intrinsic viscosity was measured at 135° C. using a decalin solvent. In 15 ml of decalin, about 20 mg of a polymer was dissolved, and a specific viscosity $\eta_{sp}$ was measured in an oil bath at 135° C. To this decalin solution, 5 ml of a decalin solvent was added to dilute the solution, and a specific viscosity $\eta_{sp}$ was measured in the same manner as above. This dilution operation was further repeated twice, and a value of $\eta_{sp}/C$ given when a concentration (C) was extrapolated to 0 was adopted as an intrinsic viscosity.

$$[\eta]=\lim(\eta_{sp}/C)(C \to 0)$$

[Melt flow rate (MFR$_{10}$ and MFR$_2$)]

MFR$_{10}$: value measured by a standard method of ASTM D-1238 at 190° C. under a load of 10.0 kg MFR$_2$: value measured by a standard method of ASTM D-1238 at 190° C. under a load of 2.16 kg

[Density]

Using a hydraulic hot press manufactured by Shinto Metal Industries Corporation, which had been preset at 190° C., a sheet having a thickness of 0.5 mm was produced at a pressure of 100 kg/cm$^2$ (shape of spacer: 45×45×0.5 mm in a plate of 240×240×0.5 mm (thickness), nine-cavity mold), and then using a different hydraulic hot press manufactured by Shinto Metal Industries Corporation, which had been preset at 20° C., the sheet was compressed at a pressure of 100 kg/cm$^2$ to cool the sheet, whereby a test sample was prepared. As the heating plate, a SUS plate having a thickness of 5 mm was used. This pressed sheet was heat-treated at 120° C. for 1 hour and then slowly cooled linearly down to room temperature over a period of 1 hour. Thereafter, a density was measured with a density gradient tube.

Synthesis Example 1

Synthesis of [bis(4-N-morpholinylphenyl)methylene($\eta^5$-cyclopentadienyl)($\eta^5$-octamethyloctahydrodibenzofluorenyl)]hafnium dichloride (i) Synthesis of bis(4-N-morpholinylphenyl) (cyclopentadienyl)(octamethyloctahydrodibenzofluorenyl)methane In nitrogen atmosphere, to a 100 ml three-neck flask, 1.24 g (3.21 mmol) of octamethyloctahydrodibenzofluorene, and 80 ml of dehydrated THF were introduced. Thereto, in an ice water bath, 1.97 ml (3.26 mmol) of a 1.66 M n-butyllithium hexane solution was slowly added dropwise. While gradually returning to room temperature, the mixture was stirred for 20 hours. Thereto, in an ice water bath, 1.08 g (2.69 mmol) of 6,6-bis(4-N-morpholinylphenyl)fulvene was added. The mixture was stirred for 4 hours at room temperature. Thereafter, to the reaction solution, saturated ammonium chloride water was added to separate the organic layer. The aqueous layer was subjected to extraction with diethyl ether. The resultant organic layers were combined, washed one time with a saturated aqueous sodium bicarbonate solution, one time with water, and one time with a saturated saline solution, and dried over magnesium sulfate. The solvent was distilled off. The resultant solid was purified by column chromatography. As a result, 2.1 g (84.0%) of bis(4-N-morpholinylphenyl)(cyclopentadienyl)(octamethyloctahydrodibenzofluorenyl)methane was obtained as a white powder. Bis(4-N-morpholinylphenyl)(cyclopentadienyl)(octamethyloctahydrodibenzofluorenyl)methane was identified by $^1$H NMR spectrum. Measured values thereof are shown below.

$^1$H NMR spectrum (270 MHz, CDCl$_3$): δ/ppm 7.3 (br), 7.2-6.8 (br), 6.5-6.0 (br), 5.2 (s), 3.8 (s), 2.9 (s), 1.7-1.5 (br), 1.4-1.2 (br), 1.1-0.8 (br)

(ii) Synthesis of [bis(4-N-morpholinylphenyl)methylene($\eta^5$-cyclopentadienyl)($\eta^5$-octamethyloctahydrodibenzofluorenyl)]hafnium dichloride In nitrogen atmosphere, to a 100 ml Schlenk flask, 0.8 g (1.0 mmol) of bis(4-N-morpholinylphenyl)(cyclopentadienyl)(octamethyloctahydrodibenzofluorenyl)methane, 30 ml of dehydrated toluene, and 0.4 g of dehydrated THF were added. While the mixture was cooled in a dry ice bath, 1.3 ml (2.0 mmol) of a n-butyllithium/hexane solution (1.66M) was gradually added. The mixture was stirred for 30 minutes at room temperature, and thereafter stirred for 4 hours under heating at 40° C. After the reaction solution returning to room temperature, the solvent was distilled off. To the resultant solid, 50 ml of dehydrated diethyl ether was added, followed by cooling to −20° C., and thereafter 0.317 g (0.98 mmol) of hafnium tetrachloride was added. While the temperature was gradually elevated to room temperature, the mixture was stirred for 16 hours. Subsequently, the solvent was distilled off, and extraction was performed with dehydrated dichloromethane. The resultant was concentrated again, and thereafter washed with dehydrated diethyl ether. As a result, 0.45 g (43.3%) of [bis(4-N-morpholinylphenyl)methylene($\eta^5$-cyclopentadienyl) ($\eta^5$-octamethyloctahydrodibenzofluorenyl)]hafnium dichloride was obtained as a yellow solid. [Bis(4-N-morpholinylphenyl)methylene($\eta^5$-cyclopentadienyl) ($\eta^5$-octamethyloctahydrodibenzofluorenyl)]hafnium dichloride was identified by $^1$H NMR spectrum. Measured values thereof are shown below.

$^1$H NMR spectrum (270 MHz, CDCl$_3$): δ/ppm 8.01 (s, 2H), 7.80-7.60 (m, 4H), 7.00-6.80 (m, 4H), 6.29 (s, 2H), 6.19 (t, J=2.6 Hz, 2H), 5.50 (t, J=2.6 Hz, 2H), 3.83 (t, J=4.8 Hz, 8H), 3.16-3.08 (m, 8H), 1.67-1.60 (m, 8H), 1.46 (s, 6H), 1.36 (s, 6H), 0.96 (s, 6H), 0.85 (s, 6H)

Synthesis Example 2

Synthesis of [bis[4-(dimethylamino)phenyl]methylene($\eta^5$-cyclopentadienyl)($\eta^5$-octamethyloctahydrodibenzofluorenyl)]hafnium dichloride (i) Synthesis of 6,6-bis[4-(dimethylamino)phenyl]fulvene In nitrogen atmosphere, to a 200 ml three-neck flask, 3.06 g (42.4 mmol) of lithiumcyclopentadienide, 10.1 g (37.5 mmol) of 4,4'-bis(dimethylamino)benzophenone, and 100 ml of dehydrated DME were added. While the mixture was cooled in an ice bath, 4.86 g (42.6 mmol) of DMI was added. Thereafter, the mixture was stirred under heating to reflux for 8 days. While the mixture was cooled in an ice bath, 50 ml of water was gradually added. 50 ml of dichloromethane was further added, and the mixture was stirred for 30 minutes at room temperature. The resultant two-layer solution was transferred to a 300 ml separating funnel. The organic layer was washed three times with 100 ml of water, and dried over anhydrous magnesium sulfate for 30 minutes. Subsequently, the solvent was distilled off under reduced pressure. Extraction was performed with a mixed solvent of hexane/ethyl acetate (4:1). Thereafter, the solvent was distilled off under reduced pressure, and recrystallization was performed in ethanol. As a result, 1.04 g (3.29 mmol, 8.8%) of 6,6-bis[4-(dimethylamino)phenyl]fulvene was obtained as a reddish brown solid. 6,6-Bis[4-(dimethylamino)phenyl]fulvene was identified by $^1$H NMR spectrum and FD-MS spectrum. Measured values thereof are shown below.

$^1$H NMR spectrum (270 MHz, CDCl$_3$): δ/ppm 7.29-7.25 (m, 4H), 6.71-6.65 (m, 4H), 6.57-6.54 (m, 2H), 6.36-6.34 (m, 2H), 3.02 (s, 12H) FD-MS spectrum: M/z 316 (M$^+$)

(ii) Synthesis of bis[4-(dimethylamino)phenyl](cyclopentadienyl)(octamethyloctahydrodibenzofluorenyl)methane In nitrogen atmosphere, to a 500 ml three-neck flask, 3.69 g (9.53 mmol) of octamethyloctahydrodibenzofluorene, and 250 ml of dehydrated cyclopentylmethyl ether were added. While the mixture was cooled in an ice bath, 6.10 ml (10.1 mmol) of a n-butyllithium/hexane solution (1.65 M) was gradually added. Thereafter, the mixture was stirred for 24 hours at room temperature. 3.00 g (9.48 mmol) of 6,6-bis[4-(dimethylamino)phenyl]fulvene was added, and the mixture was heated to reflux for 6 days. While the mixture was cooled in an ice bath, 200 ml of water was gradually added. The resultant two-layer solution was transferred to a 1 L separating funnel, to which 200 ml of diethyl ether was added. The resultant solution was shaken several times. Thereafter, the aqueous layer was removed, and the organic layer was washed three times with 200 ml of water, and one time with 200 ml of a saturated saline solution, and dried over anhydrous magnesium sulfate for 30 minutes. Subsequently, the solvent was distilled off under reduced pressure. As a result, an orange-brown solid was obtained, which was then recrystallized from acetone. As a result, 4.63 g (6.58 mmol, 69.4%) of bis[4-(dimethylamino)phenyl](cyclopentadienyl)(octamethyloctahydrodibenzofluorenyl)methane was obtained as a pale yellow solid. Bis[4-(dimethylamino)phenyl](cyclopentadienyl)(octamethyloctahydrodibenzofluorenyl)methane was identified by FD-MS spectrum. A measured value thereof is shown below.

FD-MS spectrum: M/z 702 (M$^+$)

(iii) Synthesis of [bis[4-(dimethylamino)phenyl]methylene($\eta^5$-cyclopentadienyl)($\eta^5$-octamethyloctahydrodibenzofluorenyl)]hafnium dichloride In nitrogen atmosphere, to a 200 ml Schlenk flask, 3.08 g (4.39 mmol) of bis[4-(dimethylamino)phenyl](cyclopentadienyl)(octamethyloctahydrodibenzofluorenyl)methane, 80 ml of dehydrated toluene, and 0.74 ml (9.1 mmol) of dehydrated THF were sequentially added. While the mixture was cooled in an ice bath, 5.50 ml (9.08 mmol) of a n-butyllithium/hexane solution (1.65M) was gradually added. The mixture was stirred at 45° C. for 5 hours. As a result, a red solution was obtained. After the solvent was distilled off under reduced pressure, 80 ml of dehydrated diethyl ether was added to provide a red solution again. While the solution was cooled in a methanol/dry ice bath, 1.37 g (4.27 mmol) of hafnium tetrachloride was added. While the temperature was gradually elevated to room temperature, the mixture was stirred for 16 hours. As a result, an orange slurry was obtained. After the solvent was distilled off under reduced pressure, the resultant solid was transferred into a glove box, washed with hexane, and then subjected to extraction with dichloromethane. After the solvent was distilled off under reduced pressure, a small amount of toluene was added to provide a slurry. Hexane was added thereto, and thereafter the solvent was distilled off little by little under reduced pressure. As a result, an orange solid was collected. This solid was washed with hexane, and dried under reduced pressure. As a result, 2.49 g (2.62 mmol, 61.4%) of [bis[4-(dimethylamino)phenyl] methylene ($\eta^5$-cyclopentadienyl)($\eta^5$-octamethyloctahydrodibenzofluorenyl)]hafnium dichloride was obtained as an orange solid. [Bis[4-(dimethylamino)phenyl]methylene ($\eta^5$-cyclopentadienyl)($\eta^5$-octamethyloctahydrodibenzofluorenyl)]hafnium dichloride was identified by $^1$H NMR spectrum and FD-MS spectrum. Measured values thereof are shown below.

$^1$H NMR spectrum (270 MHz, CDCl$_3$): δ/ppm 8.00 (s, 2H), 7.74-7.61 (m, 4H), 6.80-6.69 (m, 4H), 6.35 (s, 2H), 6.18 (t, J=2.6 Hz, 2H), 5.52 (t, J=2.6 Hz, 2H), 2.90 (s, 12H), 1.7-1.5 (br m, 8H), 1.46 (s, 6H), 1.39 (s, 6H), 0.99 (s, 6H), 0.86 (s, 6H) FD-MS spectrum: M/z 950 (M$^+$)

Synthesis Example 3

Synthesis of [bis(3-N-morpholinylphenyl)methylene ($\eta^5$-cyclopentadienyl)($\eta^5$-octamethyloctahydrodibenzofluorenyl)]hafnium dichloride (i) Synthesis of bis(3-N-morpholinylphenyl)(cyclopentadienyl)(octamethyloctahydrodibenzofluorenyl)methane In nitrogen atmosphere, to a 100 ml three-neck flask, 2.0 g (5.17 mmol) of octamethyloctahydrodibenzofluorene, and 80 ml of dehydrated THF were introduced. Thereto, in an ice water bath, 3.5 ml (5.43 mmol) of a 1.56 M n-butyllithium hexane solution was slowly added dropwise. While gradually returning to room temperature, the mixture was stirred for 4 hours. Thereto, in an ice water bath, 2.17 g (5.4 mmol) of 6,6-bis(3-N-morpholinylphenyl)fulvene was added. The mixture was stirred for 5 hours at room temperature. Thereafter, to the reaction solution, a saturated ammonium chloride water was added to separate the organic layer, and the aqueous layer was subjected to extraction with diethyl ether. The resultant organic layers were combined, washed one time with a saturated aqueous sodium bicarbonate solution, one time with water, and one time with a saturated saline solution, and dried over magnesium sulfate. The solvent was distilled off. The resultant solid was purified by column chromatography. As a result, 2.8 g (71.0%) of bis(3-N-morpholinylphenyl)(cyclopentadienyl)(octamethyloctahydrodibenzofluorenyl)methane was obtained as an ocher powder. Bis(3-N-morpholinylphenyl)(cyclopentadienyl)(octamethyloctahydrodibenzofluorenyl)methane was identified by $^1$H NMR spectrum. Measured values thereof are shown below.

$^1$H NMR spectrum (270 MHz, CDCl$_3$): δ/ppm 7.3-6.2 (br), 5.30 (s), 3.9-3.6 (br), 3.3-3.0 (br), 1.8-1.4 (br), 1.5-1.0 (br), 1.0-0.8 (br)

(ii) Synthesis of [bis(3-N-morpholinylphenyl)methylene($\eta^5$-cyclopentadienyl)($\eta^5$-octamethyloctahydrodibenzofluorenyl)]hafnium dichloride In nitrogen atmosphere, to a 100 ml Schlenk flask, 0.8 g (1.0 mmol) of bis(3-N-morpholinylphenyl)(cyclopentadienyl)(octamethyloctahydrodibenzofluorenyl)methane, 30 ml of dehydrated toluene, and 0.3 g of dehydrated THF were added. While the mixture was cooled in a dry ice bath, 1.3 ml (2.0 mmol) of a n-butyllithium/hexane solution (1.58M) was gradually added. The mixture was stirred for 30 minutes at room temperature, and thereafter stirred for 4 hours under heating at 40° C. After the reaction solution returning to room temperature, the solvent was distilled off. To the resultant solid, 200 ml of dehydrated diethyl ether was added, followed by cooling to −20° C., and thereafter 0.30 g (0.94 mmol) of hafnium tetrachloride was added. While the temperature was gradually elevated to room temperature, the mixture was stirred for 16 hours. Subsequently, the solvent was distilled off, and extraction was performed with a large amount of dehydrated hexane. The resultant was concentrated again, and thereafter washed with a small amount of dehydrated hexane. As a result, 0.3 g (28.6%) of [bis(3-N-morpholinylphenyl)methylene ($\eta^5$-cyclopentadienyl)($\eta^5$-octamethyloctahydrodibenzofluorenyl)]hafnium dichloride was obtained as a yellow solid. [Bis(3-N-morpholinylphenyl)methylene ($\eta^5$-cyclopentadienyl)($\eta^5$-octamethyloctahydrodibenzofluorenyl)]hafnium dichloride was identified by $^1$H NMR spectrum. Measured values thereof are shown below.

$^1$H NMR spectrum (270 MHz, CDCl$_3$): δ/ppm 7.98-7.97 (m, 2H), 7.45-7.14 (m, 6H), 6.81-6.74 (m, 2H), 6.31 (s, 1H), 6.25 (s, 1H), 6.18-6.13 (m, 2H), 5.48-5.45 (m, 2H), 3.81-3.75 (m, 4H), 3.64-3.62 (m, 4H), 3.17-3.10 (m, 4H), 2.92-2.90 (m, 4H), 1.58-1.55 (m, 8H), 1.41 (s, 6H), 1.34 (s, 6H), 0.92 (s, 6H)

Synthesis Example 4

Synthesis of [bis(4-methoxy-3-methylphenyl)methylene($\eta^5$-cyclopentadienyl)($\eta^5$-octamethyloctahydrodibenzofluorenyl)]hafnium dichloride (i) Synthesis of 4,4'-dimethoxy-3,3'-dimethylbenzophenone In nitrogen atmosphere, to a 500 ml three-neck flask, 16.2 g (80.6 mmol) of 4-bromo-2-methylanisole, and 200 ml of dehydrated diethyl ether were added. While the mixture was cooled in a methanol/dry ice bath, 51.6 ml (84.6 mmol) of a n-butyllithium/hexane solution (1.64 M) was gradually added. While the temperature was gradually elevated to room temperature, the mixture was stirred for 15 hours. While the mixture was cooled in an ice bath, a solution composed of 5.06 g (32.2 mmol) of N-carboethoxypiperidine and 50 ml of dehydrated diethyl ether was gradually added with a dropping funnel over a period of 20 minutes. The mixture was stirred for 1 hour at room temperature, and stirred for 2 hours under heating to reflux. While the mixture was cooled in an ice bath, 100 ml of 2N hydrochloric acid was gradually added. The resultant two-layer solution was transferred to a 500 ml separating funnel, and was shaken several times. Thereafter, the aqueous layer was removed. Subsequently, the organic layer was washed two times with 100 ml of water, one time with 100 ml of a saturated aqueous sodium bicarbonate solution, and one time with 100 ml of a saturated saline solution, and dried over anhydrous magnesium sulfate for 30 minutes. After the solvent was distilled off under reduced pressure, a small amount of hexane was added to perform recrystallization. The resultant solid was dried under reduced pressure. As a result, 7.57 g (28.0 mmol, 87.0%) of 4,4'-dimethoxy-3,3'-dimethylbenzophenone was obtained as a white solid. 4,4'-Dimethoxy-3,3'-dimethylbenzophenone was identified by $^1$H NMR spectrum. Measured values thereof are shown below.

$^1$H NMR spectrum (270 MHz, CDCl$_3$): δ/ppm 7.63-7.60 (m, 4H), 6.86-6.83 (m, 2H), 3.89 (s, 6H), 2.24 (s, 6H)

(ii) Synthesis of 6,6-bis(4-methoxy-3-methylphenyl)fulvene

In nitrogen atmosphere, to a 300 ml three-neck flask, 7.44 g (27.5 mmol) of 4,4'-dimethoxy-3,3'-dimethylbenzophenone, 100 ml of dehydrated THF, 100 ml of dehydrated cyclopentylmethyl ether, and 5.95 ml (55.0 mmol) of 1,3-dimethyl-2-imidazolidinone were added. 27.5 ml (55.0 mmol) of a sodium cyclopentadienide/THF solution (2.0 M, Aldrich) was added at room temperature. The mixture was stirred under heating to reflux for 7 days. While the mixture was cooled in an ice bath, 100 ml of water was gradually added. The resultant two-layer solution was transferred to a 300 ml separating funnel, to which 100 ml of diethyl ether was added. The resultant solution was shaken several times. Thereafter, the aqueous layer was removed, and the organic layer was washed three times with 100 ml of water, and one time with 100 ml of a saturated saline solution, and dried over anhydrous magnesium sulfate for 30 minutes. Subsequently, the solvent was distilled off under reduced pressure. As a result, an orange-brown solid was obtained. The resultant solid was subjected to separation with the use of silica gel chromatography (200 g, hexane:ethyl acetate=9:1) to obtain a red solution. The solvent was distilled off under reduced pressure. As a result, 1.67 g (5.24 mmol, 19.0%) of 6, 6-bis(4-methoxy-3-methylphenyl)fulvene was obtained as an orange solid. 6, 6-Bis(4-methoxy-3-methylphenyl) fulvene was identified by $^1$H NMR spectrum. Measured values thereof are shown below.

$^1$H NMR spectrum (270 MHz, CDCl$_3$): δ/ppm 7.16-7.11 (m, 4H), 6.81 (d, J=8.2 Hz, 2H), 6.58-6.56 (m, 2H), 6.31-6.28 (m, 2H), 3.87 (s, 6H), 2.20 (s, 6H)

(iii) Synthesis of bis(4-methoxy-3-methylphenyl) (cyclopentadienyl)(octamethyloctahydrodibenzofluorenyl)methane In nitrogen atmosphere, to a 100 ml three-neck flask, 1.27 g (3.29 mmol) of octamethyloctahydrodibenzofluorene, and 50 ml of dehydrated cyclopentylmethyl ether were added. While the mixture was cooled in an ice bath, 2.10 ml (3.44 mmol) of a n-butyllithium/hexane solution (1.64 M) was gradually added. The mixture was stirred for 16 hours at room temperature. While the mixture was cooled in a sodium chloride/ice bath, 1.10 g (3.44 mmol) of 6,6-bis(4-methoxy-3-methylphenyl)fulvene was added at −12° C. Thereafter the mixture was stirred for 22 hours at room temperature. While the mixture was cooled in an ice bath, 50 ml of water was gradually added. The resultant two-layer solution was transferred to a 300 ml separating funnel, to which 100 ml of diethyl ether was added. The resultant solution was shaken several times. Thereafter, the aqueous layer was removed, and the organic layer was washed three times with 100 ml of water, and one time with 100 ml of a saturated saline solution, and dried over anhydrous magnesium sulfate for 30 minutes. Subsequently, the solvent was distilled off under reduced pressure. A small amount of hexane was added to perform recrystallization to give a solid. This solid was dried under reduced pressure. As a result, 1.98 g (2.81 mmol, 85.3%) of bis(4-methoxy-3-methylphenyl)(cyclopentadienyl)(octamethyloctahydrodibenzofluorenyl)methane was obtained as a pale yellow solid. Bis(4-methoxy-3-methylphenyl)(cyclopentadienyl)(octamethyloctahydrodibenzofluorenyl)methane was identified by FD-MS spectrum. A measured value thereof is shown below.

FD-MS spectrum: M/z 704 (M$^+$)

(iv) Synthesis of [bis(4-methoxy-3-methylphenyl) methylene(η$^5$-cyclopentadienyl)(η$^5$-octamethyloctahydrodibenzofluorenyl)]hafnium dichloride In nitrogen atmosphere, to a 100 ml Schlenk flask, 1.00 g (1.42 mmol) of bis(4-methoxy-3-methylphenyl)(cyclopentadienyl)(octamethyloctahydrodibenzofluorenyl)methane, 40 ml of dehydrated toluene, and 240 μl (2.96 mmol) of dehydrated THF were sequentially added. While the mixture was cooled in an ice bath, 1.80 ml (2.95 mmol) of a n-butyllithium/hexane solution (1.64 M) was gradually added. The mixture was stirred at 45° C. for 5 hours. As a result, a red slurry was obtained. After the solvent was distilled off under reduced pressure, 40 ml of dehydrated diethyl ether was added to provide a red solution. While the solution was cooled in a methanol/dry ice bath, 418 mg (1.30 mmol) of hafnium tetrachloride was added. While the temperature was gradually elevated to room temperature, the mixture was stirred for 16 hours. As a result, an orange slurry was obtained. After the solvent was distilled off under reduced pressure, the resultant solid was transferred into a glove box, and subjected to extraction with hexane. The solvent was distilled off under reduced pressure to give a solid, and to this solid, a small amount of hexane was added. The mixture was allowed to be left at −20° C. As a result, an orange solid was precipitated out. This solid was collected by filtration, washed with a small amount of hexane, and thereafter dried under reduced pressure. As a result, 1.06 g (1.11 mmol, 85.3%) of [bis(4-methoxy-3-methylphenyl) methylene(η$^5$-cyclopentadienyl)(η$^5$-octamethyloctahydrodibenzofluorenyl)]hafnium dichloride was obtained as an orange solid. [Bis(4-methoxy-3-methylphenyl)methylene (η$^5$-cyclopentadienyl)(η$^5$-octamethyloctahydrodibenzofluorenyl)]hafnium dichloride was identified by $^1$H NMR spectrum and FD-MS spectrum. Measured values thereof are shown below.

$^1$H NMR spectrum (270 MHz, CDCl$_3$): δ/ppm 8.02 (s, 2H), 7.71-7.53 (m, 4H), 6.88-6.77 (m, 2H), 6.29-6.27 (m, 2H), 6.21-6.18 (m, 2H), 5.53-5.47 (m, 2H), 3.83-3.77 (m, 6H), 2.28-2.27+2.09-2.08 (m, 6H), 1.7-1.5 (brm, 8H), 1.46 (s, 6H), 1.40-1.39 (m, 6H), 0.99-0.94 (m, 6H), 0.85 (s, 6H)

FD-MS spectrum: M/z 952 (M$^+$)

Synthesis Example 5

Synthesis of [bis(4-methoxy-3,5-dimethylphenyl) methylene(η$^5$-cyclopentadienyl)(η$^5$-octamethyloctahydrodibenzofluorenyl)]hafnium dichloride

(i) Synthesis of 4,4'-dimethoxy-3,3',5,5'-tetramethylbenzophenone

In nitrogen atmosphere, to a 500 ml three-neck flask, 16.7 g (77.6 mmol) of 4-bromo-2,6-dimethylanisole, and 150 ml of dehydrated diethyl ether were added. While the mixture was cooled in a methanol/dry ice bath, 49.7 ml (81.5 mmol) of a n-butyllithium/hexane solution (1.64 M) was gradually added. While the temperature was gradually elevated to room temperature, the mixture was stirred for 16 hours. While the mixture was cooled in an ice bath, a solution composed of 4.83 g (30.7 mmol) of N-carboethoxypiperidine and 50 ml of dehydrated diethyl ether was gradually added with a dropping funnel over a period of 20 minutes. The mixture was stirred for 1 hour at room temperature, and stirred for 2 hours under heating to reflux. Thereto, in an ice bath, 100 ml of 2N hydrochloric acid was gradually added. The resultant two-layer solution was transferred to a 500 ml separating funnel. The resultant solution was shaken several times. Thereafter, the aqueous layer was removed. Subsequently, the organic layer was washed two times with 100 ml of water, one time with 100 ml of a saturated aqueous sodium bicarbonate solution, and one time with 100 ml of a saturated saline solution, and dried over anhydrous magnesium sulfate for 30 minutes. After the solvent was distilled off under reduced pressure, a small amount of hexane was added to perform recrystallization to give a solid. This solid was washed with a small amount of hexane, and dried under reduced pressure. As a result, 6.83 g (22.9 mmol, 74.5%) of 4,4'-dimethoxy-3,3',5,5'-tetramethylbenzophenone was obtained as a white solid. 4,4'-Dimethoxy-3,3',5,5'-tetramethylbenzophenone was identified by $^1$H NMR spectrum. Measured values thereof are shown below.

$^1$H NMR spectrum (270 MHz, CDCl$_3$): δ/ppm 7.44 (s, 4H), 3.77 (s, 6H), 2.31 (s, 12H)

(ii) Synthesis of 6,6-bis(4-methoxy-3,5-dimethylphenyl)fulvene

In nitrogen atmosphere, to a 300 ml three-neck flask, 6.76 g (22.7 mmol) of 4,4'-dimethoxy-3,3',5,5'-tetramethylbenzophenone, 100 ml of dehydrated THF, 100 ml of dehydrated cyclopentylmethyl ether, and 4.90 ml (45.3 mmol) of 1,3-dimethyl-2-imidazolidinone were added. 22.7 ml (45.4 mmol) of a sodium cyclopentadienide/THF solution (2.0 M, Aldrich) was added at room temperature. The mixture was stirred under heating to reflux for 7 days. While the mixture was cooled in an ice bath, 100 ml of water was gradually added. The resultant two-layer solution was transferred to a 300 ml separating funnel, to which 100 ml of diethyl ether was added. The resultant solution was shaken several times. Thereafter, the aqueous layer was removed, and the organic layer was washed three times with 100 ml of water, and one time with 100 ml of a saturated saline solution, and dried over anhydrous magnesium sulfate for 30 minutes. Subsequently, the solvent was distilled off under reduced pressure. As a result, an orange-brown solid was obtained. The resultant solid was subjected to separation with the use of silica gel chromatography (450 g, hexane:ethyl acetate=9:1) to obtain a red solution. The solvent was distilled off under reduced pressure. As a result, 3.80 g (11.0 mmol, 48.4%) of 6,6-bis(4-methoxy-3,5-dimethylphenyl)fulvene was obtained as an orange solid. 6,6-Bis(4-methoxy-3,5-dimethylphenyl)fulvene was identified by $^1$H NMR spectrum. Measured values thereof are shown below.

$^1$H NMR spectrum (270 MHz, CDCl$_3$): δ/ppm 6.95 (s, 4H), 6.57-6.55 (m, 2H), 6.28-6.26 (m, 2H), 3.77 (s, 6H), 2.27 (s, 12H)

(iii) Synthesis of bis(4-methoxy-3,5-dimethylphenyl)(cyclopentadienyl)(octamethyloctahydrodibenzofluorenyl)methane In nitrogen atmosphere, to a 200 ml three-neck flask, 1.59 g (4.12 mmol) of octamethyloctahydrodibenzofluorene, and 50 ml of dehydrated cyclopentylmethyl ether were added. While the mixture was cooled in an ice bath, 2.70 ml (4.43 mmol) of a n-butyllithium/hexane solution (1.64 M) was gradually added. The mixture was stirred for 16 hours at room temperature. While the mixture was cooled in an ice bath, 1.51 g (4.35 mmol) of 6,6-bis(4-methoxy-3,5-dimethylphenyl)fulvene was added. Thereafter, the mixture was stirred for 4 hours at room temperature. While the mixture was cooled in an ice bath, 100 ml of water was gradually added. The resultant two-layer solution was transferred to a 300 ml separating funnel, to which 100 ml of diethyl ether was added. The resultant solution was shaken several times. Thereafter, the aqueous layer was removed, and the organic layer was washed three times with 100 ml of water, and one time with 100 ml of a saturated saline solution, and dried over anhydrous magnesium sulfate for 30 minutes. Subsequently, the solvent was distilled off under reduced pressure. A small amount of methanol was added to perform recrystallization to give a solid. This solid was washed with a small amount of ethanol, and dried under reduced pressure. As a result, 2.35 g (3.21 mmol, 77.8%) of bis(4-methoxy-3,5-dimethylphenyl)(cyclopentadienyl)(octamethyloctahydrodibenzofluorenyl)methane was obtained as a white solid. Bis(4-methoxy-3,5-dimethylphenyl)(cyclopentadienyl)(octamethyloctahydrodibenzofluorenyl)methane was identified by FD-MS spectrum. A measured value thereof is shown below.

FD-MS spectrum: M/z 732 (M$^+$)

(iv) Synthesis of [bis(4-methoxy-3,5-dimethylphenyl)methylene(η$^5$-cyclopentadienyl)(η$^5$-octamethyloctahydrodibenzofluorenyl)]hafnium dichloride In nitrogen atmosphere, to a 100 ml Schlenk flask, 1.30 g (1.77 mmol) of bis(4-methoxy-3,5-dimethylphenyl)(cyclopentadienyl)(octamethyloctahydrodibenzofluorenyl)methane, 40 ml of dehydrated toluene, and 300 μl (3.70 mmol) of dehydrated THF were sequentially added. While the mixture was cooled in an ice bath, 2.20 ml (3.61 mmol) of a n-butyllithium/hexane solution (1.64 M) was gradually added. The mixture was stirred for 5 hours at 45° C. As a result, a red slurry was obtained. After the solvent was distilled off under reduced pressure, 40 ml of dehydrated diethyl ether was added to provide a red solution. While the solution was cooled in a methanol/dry ice bath, 532 mg (1.66 mmol) of hafnium tetrachloride was added. While the temperature was gradually elevated to room temperature, the mixture was stirred for 18 hours. As a result, an orange slurry was obtained. After the solvent was distilled off under reduced pressure, the resultant solid was transferred into a glove box, and subjected to extraction with hexane. The solvent was distilled off under reduced pressure to give a solid, and to this solid, a small amount of hexane and diethyl ether were added. The mixture was allowed to be left at −20° C. As a result, an orange solid was precipitated out. This solid was collected by filtration, washed with a small amount of hexane, and thereafter dried under reduced pressure. As a result, 1.27 g (1.29 mmol, 77.7%) of [bis(4-methoxy-3,5-dimethylphenyl)methylene(η$^5$-cyclopentadienyl)(η$^5$-octamethyloctahydrodibenzofluorenyl)]hafnium dichloride was obtained as an orange solid. [Bis(4-methoxy-3,5-dimethylphenyl)methylene(η$^5$-cyclopentadienyl)(η$^5$-octamethyloctahydrodibenzofluorenyl)]hafnium dichloride was identified by $^1$H NMR spectrum and FD-MS spectrum. Measured values thereof are shown below.

$^1$H NMR spectrum (270 MHz, CDCl$_3$): δ/ppm 8.02 (s, 2H), 7.55-7.43 (m, 4H), 6.28 (s, 2H), 6.19 (t, J=2.6 Hz, 2H), 5.48 (t, J=2.6 Hz, 2H), 3.72 (s, 6H), 2.35 (s, 6H), 2.16 (s, 6H), 1.7-1.5 (br m, 8H), 1.46 (s, 6H), 1.40 (s, 6H), 0.98 (s, 6H), 0.86 (s, 6H) FD-MS spectrum: M/z 980 (M$^+$)

Synthesis Example 6

Synthesis of [bis(4-methoxyphenyl)methylene(η$^5$-cyclopentadienyl)(η$^5$-octamethyloctahydrodibenzofluorenyl)]hafnium dichloride (i) Synthesis of 6,6-bis(4-methoxyphenyl)fulvene In nitrogen atmosphere, to a 500 ml three-neck flask, 8.28 g (115 mmol) of lithiumcyclopentadienide, and 200 ml of dehydrated THF were added. While the mixture was cooled in an ice bath, 13.6 g (119 mmol) of DMI was added. The mixture was stirred for 30 minutes at room temperature. Thereafter, 25.3 g (105 mmol) of 4,4'-dimethoxybenzophenone was added. The mixture was stirred under heating to reflux for 1 hour. While the mixture was cooled in an ice bath, 100 ml of water was gradually added. 200 ml of dichloromethane was further added, and the mixture was stirred for 30 minutes at room temperature. The resultant two-layer solution was transferred to a 500 ml separating funnel. The organic layer was washed three times with 200 ml of water, and dried over anhydrous magnesium sulfate for 30 minutes. Subsequently, the solvent was distilled off under reduced pressure. As a result, an orange-brown solid was obtained. The resultant solid was subjected to separation with the use of silica gel chromatography (700 g, hexane:ethyl acetate=4:1) to obtain a red solution. The solvent was distilled off under reduced pressure. As a result, 9.32 g (32.1 mmol, 30.7%) of 6,6-bis(4-methoxyphenyl)fulvene was obtained as an orange solid. 6,6-Bis(4-methoxyphenyl)fulvene was identified by ¹H NMR spectrum. Measured values thereof are shown below.

¹H NMR spectrum (270 MHz, CDCl₃): δ/ppm 7.28-7.23 (m, 4H), 6.92-6.87 (m, 4H), 6.59-6.57 (m, 2H), 6.30-6.28 (m, 2H), 3.84 (s, 6H)

(ii) Synthesis of bis(4-methoxyphenyl)(cyclopentadienyl)(octamethyloctahydrodibenzofluorenyl)methane In nitrogen atmosphere, to a 200 ml three-neck flask, 1.33 g (3.45 mmol) of octamethyloctahydrodibenzofluorene, and 100 ml of dehydrated t-butylmethyl ether were added. While the mixture was cooled in an ice bath, 2.30 ml (3.75 mmol) of a n-butyllithium/hexane solution (1.63 M) was gradually added. The mixture was stirred for 4 hours at room temperature. After 0.909 g (3.13 mmol) of 6,6-bis(4-methoxyphenyl)fulvene was added, the mixture was heated to reflux for 40 hours. While the mixture was cooled in an ice bath, 50 ml of water and 50 ml of diethyl ether was gradually added. The resultant solution was transferred to a 500 ml separating funnel. The resultant solution was shaken several times. Thereafter, the aqueous layer was separated, and the organic layer was washed three times with 100 ml of water, and one time with 100 ml of a saturated saline solution, and dried over anhydrous magnesium sulfate for 30 minutes. Subsequently, the solvent was distilled off under reduced pressure. The resultant was subjected to separation with the use of silica gel chromatography (150 g, hexane:ethyl acetate=19:1) to obtain a colorless solution. The solvent was distilled off under reduced pressure. As a result, 2.06 g (3.04 mmol, 97.3%) of bis(4-methoxyphenyl)(cyclopentadienyl)(octamethyloctahydrodibenzofluorenyl)methane was obtained as a pale yellow solid. Bis(4-methoxyphenyl)(cyclopentadienyl)(octamethyloctahydrodibenzofluorenyl)methane was identified by FD-MS spectrum. A measured value thereof is shown below.

FD-MS spectrum: M/z 676 (M⁺)

(iii) Synthesis of [bis(4-methoxyphenyl)methylene(η⁵-cyclopentadienyl)(η⁵-octamethyloctahydrodibenzofluorenyl)]hafnium dichloride In nitrogen atmosphere, to a 100 ml Schlenk flask, 1.06 g (1.57 mmol) of bis(4-methoxyphenyl)(cyclopentadienyl)(octamethyloctahydrodibenzofluorenyl)methane, 40 ml of dehydrated toluene, and 270 μl (3.33 mmol) of dehydrated THF were sequentially added. While the mixture was cooled in an ice bath, 2.00 ml (3.28 mmol) of a n-butyllithium/hexane solution (1.64 M) was gradually added. The mixture was stirred at 45° C. for 5 hours. As a result, a red solution was obtained. After the solvent was distilled off under reduced pressure, 40 ml of dehydrated diethyl ether was added to provide a red solution again. While the solution was cooled in a methanol/dry ice bath, 718 mg (1.53 mmol) of hafnium tetrachloride-bis(diethyl ether) complex was added. While the temperature was gradually elevated to room temperature, the mixture was stirred for 17 hours. As a result, an orange slurry was obtained. After the solvent was distilled off under reduced pressure, the resultant solid was transferred into a glove box, washed with hexane, and then subjected to extraction with dichloromethane. After the solvent was distilled off under reduced pressure, the resultant solid was allowed to dissolve in toluene, and hexane was added thereto. Thereafter, the solvent was distilled off little by little under reduced pressure. As a result, an orange solid was precipitated out. This solid was collected by filtration, washed with hexane, and then dried under reduced pressure. As a result, 984 mg (1.06 mmol, 69.4%) of [bis(4-methoxyphenyl)methylene(η⁵-cyclopentadienyl)(η⁵-octamethyloctahydrodibenzofluorenyl)]hafnium dichloride was obtained as an orange solid. [Bis(4-methoxyphenyl)methylene(η⁵-cyclopentadienyl)(η⁵-octamethyloctahydrodibenzofluorenyl)]hafnium dichloride was identified by ¹H NMR spectrum and FD-MS spectrum. Measured values thereof are shown below.

¹H NMR spectrum (270 MHz, CDCl₃): δ/ppm 8.02 (s, 2H), 7.83-7.69 (m, 4H), 6.98-6.85 (m, 4H), 6.27 (s, 2H), 6.20 (t, J=2.6 Hz, 2H), 5.50 (t, J=2.6 Hz, 2H), 3.79 (s, 6H), 1.7-1.5 (br m, 8H), 1.46 (s, 6H), 1.40 (s, 6H), 0.98 (s, 6H), 0.86 (s, 6H) FD-MS spectrum: M/z 924 (M⁺)

Comparative Synthesis Example 1

Synthesis of [bis(3-chlorophenyl)methylene(η⁵-cyclopentadienyl)(η⁵-octamethyloctahydrodibenzofluorenyl)]hafnium dichloride (i) Synthesis of [bis(3-chlorophenyl)methylene(η⁵-cyclopentadienyl)(η⁵-octamethyloctahydrodibenzofluorenyl)]hafnium dichloride In nitrogen atmosphere, to a 100 ml Schlenk flask, 568 mg (829 μmol) of bis(3-chlorophenyl)(cyclopentadienyl)(octamethyloctahydrodibenzofluorenyl)methane, and 30 ml of dehydrated diethyl ether were added. While the mixture was cooled in a methanol/dry ice bath, 1.2 ml (1.9 mmol) of a n-butyllithium/hexane solution (1.59 M) was gradually added. The mixture was stirred for 6 hours at room temperature. While the mixture was cooled in a methanol/dry ice bath, 265 mg (826 μmol) of hafnium tetrachloride was added. While the temperature was gradually elevated to room temperature, the mixture was stirred for 16 hours. As a result, an orange slurry was obtained. After the solvent was distilled off under reduced pressure, the resultant solid was transferred into a glove box, and subjected to extraction with hexane. The solvent was distilled off under reduced pressure to give a solid, and to this solid, a small amount of hexane was added. The mixture was allowed to be left at −20° C. As a result, a yellow solid was precipitated out. This solid was collected by filtration, washed with a small amount of hexane, and thereafter dried under reduced pressure. As a result, 150 mg (161 μmol, 19.4%) of [Bis(3-chlorophenyl)methylene(η⁵-cyclopentadienyl)(η⁵-octamethyloctahydrodibenzofluorenyl)]hafnium dichloride was obtained as a yellow solid. [Bis(3-chlorophenyl)methylene(η⁵-cyclopentadienyl)(η⁵-octamethyloctahydrodibenzofluorenyl)]hafnium dichloride was identified by ¹H NMR spectrum and FD-MS spectrum. Measured values thereof are shown below.

¹H NMR spectrum (270 MHz, CDCl₃): δ/ppm 7.73-7.68 (m, 2H), 7.60-7.57 (m, 1H), 7.52-7.45 (m, 2H), 7.44-7.40 (m, 1H), 7.38-7.32 (m, 1H), 7.07 (td, J=7.8 Hz, J=5.4 Hz, 1H), 6.96-6.91 (m, 2H), 5.92-5.85 (m, 4H), 5.16-5.09 (m, 2H), 1.4-1.2 (br m, 8H), 1.11 (s, 6H), 1.06 (s, 3H), 1.04 (s, 3H), 0.68 (s, 3H) 0.61 (s, 3H), 0.52 (s, 3H), 0.50 (s, 3H)

FD-MS spectrum: M/z 932 (M⁺)

Synthesis Example 7

Synthesis of [bis[4-(dimethylamino)phenyl]methylene (η$^5$-cyclopentadienyl)(η$^5$-tetramethyloctahydrodibenzofluorenyl)]hafnium dichloride (i) Synthesis of bis[4-(dimethylamino)phenyl](cyclopentadienyl)(tetramethyloctahydrodibenzofluorenyl)methane In nitrogen atmosphere, to a 100 ml three-neck flask, 1.4 g (4.24 mmol) of tetramethyloctahydrodibenzofluorene, and 50 ml of dehydrated cyclopentylmethyl ether were introduced. Thereto, in an ice water bath, 2.7 ml (4.45 mmol) of a 1.66 M n-butyllithium hexane solution was slowly added dropwise. While gradually returning to room temperature, the mixture was stirred for 20 hours. Thereto, in an ice water bath, 1.47 g (4.66 mmol) of 6,6-bis[4-(dimethylamino)phenyl]fulvene was added. The mixture was stirred for 8 hours at room temperature. Thereafter, to the reaction solution, a saturated ammonium chloride water was added to separate the organic layer, and the aqueous layer was subjected to extraction with diethyl ether. The resultant organic layers were combined, washed one time with a saturated aqueous sodium bicarbonate solution, one time with water, and one time with a saturated saline solution, and dried over magnesium sulfate. The solvent was distilled off. The resultant solid was washed with diethyl ether. As a result, 1.8 g (64.0%) of bis[4-(dimethylamino)phenyl](cyclopentadienyl)(tetramethyloctahydrodibenzofluorenyl)methane was obtained as a white powder. Bis[4-(dimethylamino)phenyl](cyclopentadienyl)(tetramethyloctahydrodibenzofluorenyl)methane was identified by $^1$H NMR spectrum. Measured values thereof are shown below.

$^1$H NMR spectrum (270 MHz, CDCl$_3$): δ/ppm 7.3 (s), 7.2-6.9 (br), 6.6 (s), 6.6-6.3 (br), 6.5-6.0 (br), 5.2 (s), 2.8 (s), 2.7-2.4 (m), 1.8-1.6 (br), 1.4-1.2 (m)

(ii) Synthesis of [bis[4-(dimethylamino)phenyl] methylene (η$^5$-cyclopentadienyl)(η$^5$-tetramethyloctahydrodibenzofluorenyl)]hafnium dichloride In nitrogen atmosphere, to a 100 ml Schlenk flask, 0.8 g (1.24 mmol) of bis[4-(dimethylamino)phenyl](cyclopentadienyl)(tetramethyloctahydrodibenzofluorenyl)methane, 30 ml of dehydrated toluene, and 0.4 g of dehydrated THF were added. While the mixture was cooled in a dry ice bath, 1.5 ml (2.5 mmol) of a n-butyllithium/hexane solution (1.66 M) was gradually added. The mixture was stirred for 30 minutes at room temperature, and thereafter stirred for 4 hours under heating at 40° C. After the reaction solution returning to room temperature, the solvent was distilled off. To the resultant solid, 80 ml of dehydrated diethyl ether was added, followed by cooling to −20° C., and thereafter 0.38 g (1.20 mmol) of hafnium tetrachloride was added. While the temperature was gradually elevated to room temperature, the mixture was stirred for 16 hours. Thereafter, the solvent was distilled off, the resultant solid was washed with dehydrated hexane, and then subjected to extraction with dehydrated diethyl ether. The resultant was concentrated again, and thereafter washed with dehydrated diethyl ether. As a result, 0.60 g (54.2%) of [bis[4-(dimethylamino)phenyl]methylene (η$^5$-cyclopentadienyl)(η$^5$-tetramethyloctahydrodibenzofluorenyl)]hafnium dichloride was obtained as a yellow solid.

[Bis[4-(dimethylamino)phenyl]methylene (η$^5$-cyclopentadienyl)(η$^5$-tetramethyloctahydrodibenzofluorenyl)]hafnium dichloride was identified by $^1$H NMR spectrum. Measured values thereof are shown below.

$^1$H NMR spectrum (270 MHz, CDCl$_3$): δ/ppm 8.03 (s, 2H), 7.65-7.58 (m, 4H), 6.73-6.66 (m, 4H), 6.20 (t, J=2.6 Hz, 2H), 6.08 (s, 2H), 5.60 (t, J=2.6 Hz, 2H), 2.91 (s, 12H), 2.51-2.49 (m, 4H), 1.71-1.66 (m, 8H), 1.47 (s, 6H), 1.40 (s, 6H)

Synthesis Example 8

Synthesis of [bis(4-methoxyphenyl)methylene(η$^5$-cyclopentadienyl)(η$^5$-tetramethyloctahydrodibenzofluorenyl)]hafnium dichloride (i) Synthesis of bis(4-methoxyphenyl)(cyclopentadienyl)(tetramethyldodecahydrodibenzofluorenyl) methane In nitrogen atmosphere, to a 200 ml three-neck flask, 2.40 g (7.26 mmol) of tetramethyldodecahydrodibenzofluorene, and 80 ml of dehydrated cyclopentylmethyl ether were added. While the mixture was cooled in a sodium chloride/ice bath, 4.70 ml (7.71 mmol) of a n-butyllithium/hexane solution (1.64 M) was gradually added. Thereafter, while the temperature was gradually elevated to room temperature, the mixture was stirred for 16 hours. After 1.96 g (6.75 mmol) of 6,6-bis(4-methoxyphenyl)fulvene was added, the mixture was stirred for 4 hours at room temperature. While the mixture was cooled in an ice bath, 100 ml of water was gradually added. The resultant solution was transferred to a 300 ml separating funnel, to which 100 ml of dichloromethane was added. The resultant solution was shaken several times. Thereafter, the aqueous layer was separated, and the organic layer was washed three times with 100 ml of water, and dried over anhydrous magnesium sulfate for 30 minutes. Subsequently, the solvent was distilled off under reduced pressure. The resultant solid was washed with diethyl ether, and dried under reduced pressure. As a result, 3.99 g (6.43 mmol, 95.3%) of bis(4-methoxyphenyl)(cyclopentadienyl)(tetramethyldodecahydrodibenzofluorenyl)methane was obtained as a white solid. Bis(4-methoxyphenyl)(cyclopentadienyl)(tetramethyldodecahydrodibenzofluorenyl)methane was identified by $^1$H NMR spectrum. Measured values thereof are shown below.

$^1$H NMR spectrum (270 MHz, CDCl$_3$): δ/ppm 7.34 (s), 7.09 (br s), 6.63 (br s), 6.40-6.38 (m), 6.27-6.23 (m), 5.26-5.22 (m), 3.72 (s), 2.97 (br s), 2.82 (brs), 2.65-2.42 (m), 1.74-1.58 (m), 1.27-1.17 (m)

(ii) Synthesis of [bis(4-methoxyphenyl)methylene (η$^5$-cyclopentadienyl)(η$^5$-tetramethyloctahydrodibenzofluorenyl)]hafnium dichloride In nitrogen atmosphere, to a 300 ml Schlenk flask, 5.07 g (8.16 mmol) of bis(4-methoxyphenyl)(cyclopentadienyl)(tetramethyldodecahydrodibenzofluorenyl)methane, 120 ml of dehydrated toluene, and 1.38 ml (17.0 mmol) of dehydrated THF were sequentially added. While the mixture cooled in an ice bath, 10.4 ml (17.1 mmol) of a n-butyllithium/hexane solution (1.64 M) was gradually added. The mixture was stirred at 45° C. for 5 hours. As a result, a red solution was obtained. After the solvent was distilled off under reduced pressure, 200 ml of dehydrated diethyl ether was added to provide a red solution again. While the solution was cooled in a methanol/dry ice bath, 2.47 g (7.70 mmol) of hafnium tetrachloride was added. While the temperature was gradually elevated to room temperature, the mixture was stirred for 16 hours. As a result, an orange slurry was obtained. After the solvent was distilled off under reduced pressure, the resultant solid was transferred into a glove box, washed with diethyl ether, and then subjected to extraction with dichloromethane. After the solvent was distilled off under reduced pressure, the resultant solid was allowed to dissolve in toluene, hexane was added thereto. Thereafter, the solvent was distilled off little by little under reduced pressure. As a result, an orange solid was precipitated out. This solid was collected by filtration, washed with hexane, and dried under reduced pressure. As a result, 4.12 g (4.75 mmol, 61.6%) of [bis(4-methoxyphenyl)methylene($\eta^5$-cyclopentadienyl)($\eta^5$-tetramethyloctahydrodibenzofluorenyl)]hafnium dichloride was obtained as an orange solid. [Bis(4-methoxyphenyl)methylene($\eta^5$-cyclopentadienyl)($\eta^5$-tetramethyloctahydrodibenzofluorenyl)]hafnium dichloride was identified by $^1$H NMR spectrum. Measured values thereof are shown below.

$^1$H NMR spectrum (270 MHz, CDCl$_3$): δ/ppm 8.05 (s, 2H), 7.77-7.64 (m, 4H), 6.93-6.83 (m, 4H), 6.22 (t, J=2.6 Hz, 2H), 5.99 (s, 2H), 5.58 (t, J=2.6 Hz, 2H), 3.79 (s, 6H), 2.6-2.4 (br m, 4H), 1.8-1.6 (br m, 8H), 1.47 (s, 6H), 1.41 (s, 6H)

Synthesis Example 9

Synthesis of [bis(3,4-dimethoxyphenyl)methylene($\eta^5$-cyclopentadienyl)($\eta^5$-2,7-dimethyl-3,6-di-t-butylfluorenyl)]hafnium dichloride (i) Synthesis of 3,3',4,4'-tetramethoxybenzophenone To a 300 ml three-neck flask, 17.3 g (125.2 mmol) of 1,2-dimethoxybenzene, and 200 ml of polyphosphoric acid were added and stirred at room temperature. Further, 22.8 g (125.2 mmol) of 3,4-dimethoxybenzoic acid was added. The mixture was heated at 100° C., and stirred for 6 hours. Thereafter, the reaction product was added, and insoluble substances were filtered off. The resultant solid was washed with ethanol. As a result, 26.2 g (69%) of 3,3',4,4'-tetramethoxybenzophenone was obtained as a white powder. 3,3',4,4'-Tetramethoxybenzophenone was identified by $^1$H NMR spectrum. Measured values thereof are shown below.

$^1$H NMR spectrum (270 MHz, CDCl$_3$): δ/ppm 7.42 (d, J=2.0 Hz, 2H), 7.36 (dd, J=8.2, 2.0 Hz, 2H), 6.89 (d, J=8.2 Hz, 2H), 3.95 (s, 6H), 3.93 (s, 6H)

(ii) Synthesis of 6,6-bis(3,4-dimethoxyphenyl)fulvene

In nitrogen atmosphere, to a 200 ml three-neck flask, 1.74 g (19.8 mmol) of cyclopentadiene sodium salt, and 100 ml of dehydrated THF were introduced. Thereto, in an ice water bath, 3.0 ml (27.3 mmol) of 1,3-dimethyl-2-imidazolidinone and 4.65 g (15.38 mmol) of 3,3',4,4'-tetramethoxybenzophenone were added. The mixture was stirred for 3 days under heating to reflux at 60° C. Thereafter, to the reaction solution, an aqueous hydrochloric acid solution was added to separate the organic layer. This was followed by extraction with ethyl acetate. The resultant organic layer was washed one time with a saturated aqueous sodium bicarbonate solution, one time with water, and one time with a saturated saline solution, and dried over magnesium sulfate. The solvent was distilled off. The resultant solid was purified by column chromatography. As a result, 3.0 g (56%) of 6,6-bis(3,4-dimethoxyphenyl)fulvene was obtained as an orange powder. 6,6-Bis(3,4-dimethoxyphenyl)fulvene was identified by $^1$H NMR spectrum. Measured values thereof are shown below.

$^1$H NMR spectrum (270 MHz, CDCl$_3$): δ/ppm 6.89-6.87 (m, 6H), 6.59 (d, J=6.6 Hz, 2H), 6.32 (d, J=6.6 Hz, 2H), 3.93 (s, 6H), 3.82 (s, 6H)

(iii) Synthesis of bis(3,4-dimethoxyphenyl)(cyclopentadienyl)(2,7-dimethyl-3,6-di-t-butylfluorenyl)methane In nitrogen atmosphere, to a 100 ml three-neck flask, 1.5 g (4.89 mmol) of 2,7-dimethyl-3,6-di-t-butylfluorene, and 30 ml of dehydrated cyclopentylmethyl ether were introduced. Thereto, in an ice water bath, 3.1 ml (5.14 mmol) of a 1.66 M n-butyllithium hexane solution was slowly added dropwise. While gradually returning to room temperature, the mixture was stirred for 20 hours. In an ice water bath, 1.71 g (4.9 mmol) of 6,6-bis(3,4-dimethoxyphenyl)fulvene was added, and the mixture was stirred for 20 hours at room temperature. Thereafter, the reaction solution was quenched with an aqueous hydrochloric acid solution, and subjected to extraction with diethyl ether. The resultant organic layer was washed one time with a saturated aqueous sodium bicarbonate solution, one time with water, and one time with a saturated saline solution, and dried over magnesium sulfate. The solvent was distilled off. The resultant solid was washed with methanol. As a result, 1.9 g (58.0%) of bis(3,4-dimethoxyphenyl)(cyclopentadienyl)(2,7-dimethyl-3,6-d i-t-butylfluorenyl)methane was obtained as a white powder. Bis(3,4-dimethoxyphenyl)(cyclopentadienyl)(2,7-dimethyl-3,6-di-t-butylfluorenyl)methane was identified by $^1$H NMR spectrum. Measured values thereof are shown below.

$^1$H NMR spectrum (270 MHz, CDCl$_3$): δ/ppm 7.4 (s), 7.2-6.3 (br), 5.2 (s), 3.7 (br), 3.5-3.0 (br), 2.3 (s), 1.3 (s)

(iv) Synthesis of [bis(3,4-dimethoxyphenyl)methylene($\eta^5$-cyclopentadienyl)($\eta^5$-2,7-dimethyl-3,6-di-t-butylfluorenyl)]hafnium dichloride In nitrogen atmosphere, to a 100 ml Schlenk flask, 0.8 g (1.22 mmol) of bis(3,4-dimethoxyphenyl)(cyclopentadienyl)(2,7-dimethyl-3,6-d i-t-butylfluorenyl)methane, 30 ml of dehydrated toluene, and 0.4 g of dehydrated THF were added. While the mixture was cooled in a dry ice bath, 1.5 ml (2.45 mmol) of a n-butyllithium/hexane solution (1.66 M) was gradually added. The mixture was stirred for 30 minutes at room temperature, and thereafter stirred for 4 hours under heating at 40° C. After the reaction solution returning to room temperature, the solvent was distilled off. To the resultant solid, 80 ml of dehydrated diethyl ether was added, followed by cooling to −20° C., and thereafter 0.38 g (1.20 mmol) of hafnium tetrachloride was added. While the temperature was gradually elevated to room temperature, the mixture was stirred for 16 hours. Thereafter, the solvent was distilled off, and the resultant solid was washed with dehydrated hexane, and then subjected to extraction with dehydrated diethyl ether and dehydrated dichloromethane. The resultant was concentrated again, and thereafter washed with dehydrated diethyl ether. As a result, 0.62 g (56.4%) of [bis(3,4-dimethoxyphenyl)methylene($\eta^5$-cyclopentadienyl)($\eta^5$-2,7-dimethyl-3,6-di-t-butylfluorenyl)]hafnium dichloride was obtained as a yellow solid. [Bis(3,4-dimethoxyphenyl)methylene($\eta^5$-cyclopentadienyl)($\eta^5$-2,7-dimethyl-3,6-di-t-butylfluorenyl)]hafnium dichloride was identified by $^1$H NMR spectrum. Measured values thereof are shown below.

$^1$H NMR spectrum (270 MHz, CDCl$_3$): δ/ppm 8.06 (d, J=2.3 Hz, 2H), 7.46-7.28 (m, 4H), 6.91-6.83 (m, 2H), 6.28-6.27 (m, 2H), 6.17 (t, J=10.1 Hz, 2H), 5.68-5.60 (m, 2H), 3.90-3.87 (m, 9H), 3.62 (s, 3H), 2.30 (s, 6H), 1.49 (s, 18H)

Synthesis Example 10

Synthesis of [bis(4-methoxyphenyl)methylene(η$^5$-cyclopentadienyl)(η$^5$-2,7-dimethyl-3,6-di-t-butyl-fluorenyl)]hafnium dichloride (i) Synthesis of bis(4-methoxyphenyl)(cyclopentadienyl)(2,7-dimethyl-3,6-di-t-butylfluorenyl)methane In nitrogen atmosphere, to a 100 ml three-neck flask, 1.2 g (3.92 mmol) of 2,7-dimethyl-3,6-di-t-butylfluorene, and 40 ml of dehydrated cyclopentylmethyl ether were introduced. Thereto, in an ice water bath, 2.5 ml (4.11 mmol) of a 1.66 M n-butyllithium hexane solution was slowly added dropwise. While gradually returning to room temperature, the mixture was stirred for 20 hours. In an ice water bath, 1.25 g (4.31 mmol) of 6,6-bis(4-methoxyphenyl)fulvene was added, and the mixture was stirred for 4 hours at room temperature. Thereafter, the reaction solution was quenched with an aqueous hydrochloric acid solution, and subjected to extraction with diethyl ether. The resultant organic layer was washed one time with a saturated aqueous sodium bicarbonate solution, one time with water, and one time with a saturated saline solution, and dried over magnesium sulfate. The solvent was distilled off. The resultant solid was washed with hexane. As a result, 1.7 g (74%) of bis(4-methoxyphenyl)(cyclopentadienyl)(2,7-dimethyl-3,6-di-t-butylfluorenyl) methane was obtained as a white powder. Bis(4-methoxyphenyl)(cyclopentadienyl)(2,7-dimethyl-3,6-di-t-butylfluorenyl) methane was identified by $^1$H NMR spectrum. Measured values thereof are shown below.

$^1$H NMR spectrum (270 MHz, CDCl$_3$): δ/ppm 7.43 (s), 7.12 (s), 6.68 (br s), 6.32 (br s), 5.22 (s), 3.73 (s), 2.97 (br s), 2.84 (br s), 2.32 (s), 1.38 (s)

(ii) Synthesis of [bis(4-methoxyphenyl)methylene(η$^5$-cyclopentadienyl)(η$^5$-2,7-dimethyl-3,6-di-t-butylfluorenyl)]hafnium dichloride In nitrogen atmosphere, to a 100 ml Schlenk flask, 0.8 g (1.22 mmol) of bis(4-methoxyphenyl)(cyclopentadienyl)(2,7-dimethyl-3,6-di-t-butylfluorenyl)methane, 20 ml of dehydrated toluene, and 0.5 g of dehydrated THF were added. While the mixture was cooled in a dry ice bath, 1.7 ml (2.75 mmol) of a n-butyllithium/hexane solution (1.66 M) was gradually added. The mixture was stirred for 30 minutes at room temperature, and thereafter stirred for 4 hours under heating at 40° C. After the reaction solution returning to room temperature, the solvent was distilled off. To the resultant solid, 30 ml of dehydrated diethyl ether was added, followed by cooling to −20° C., and thereafter 0.41 g (1.28 mmol) of hafnium tetrachloride was added. While the temperature was gradually elevated to room temperature, the mixture was stirred for 16 hours. Thereafter, the solvent was distilled off, and the resultant solid was washed with dehydrated hexane, and then subjected to extraction with dehydrated diethyl ether and dehydrated dichloromethane. The dichloromethane solution was concentrated again, and thereafter washed with dehydrated diethyl ether. As a result, 0.70 g (79.1%) of [bis(4-methoxyphenyl)methylene(η$^5$-cyclopentadienyl)(η$^5$-2,7-dim ethyl-3,6-di-t-butylfluorenyl)]hafnium dichloride was obtained as a yellow solid. [Bis(4-methoxyphenyl)methylene(η$^5$-cyclopentadienyl)(η$^5$-2,7-dimethyl-3,6-di-t-butylfluorenyl)]hafnium dichloride was identified by $^1$H NMR spectrum. Measured values thereof are shown below.

$^1$H NMR spectrum (270 MHz, CDCl$_3$): δ/ppm 8.05 (s, 2H), 7.80-7.66 (m, 4H), 6.96-6.84 (m, 4H), 6.25 (t, J=2.8 Hz, 2H), 6.12 (s, 2H), 5.61 (t, J=2.8 Hz, 2H), 3.80 (s, 6H), 2.29 (s, 6H), 1.49 (s, 18H)

Synthesis Example 11

Synthesis of [bis(4-methoxyphenyl)methylene(η$^5$-cyclopentadienyl)(η$^5$-2,3,6,7-tetramethylfluorenyl)]hafnium dichloride (i) Synthesis of bis(4-methoxyphenyl)(cyclopentadienyl)(2,3,6,7-tetramethylfluorenyl)methane In nitrogen atmosphere, to a 100 ml three-neck flask, 500 mg (2.25 mmol) of 2,3,6,7-tetramethylfluorene, and 40 ml of dehydrated t-butylmethyl ether were added. While the mixture was cooled in an ice bath, 1.45 ml (2.36 mmol) of a n-butyllithium/hexane solution (1.63 M) was gradually added, and the mixture was stirred for 18 hours at room temperature. After 591 mg (2.03 mmol) of 6,6-bis(4-methoxyphenyl)fulvene was added, the mixture was heated to reflux for 3 days. While the mixture was cooled in an ice bath, 50 ml of water was gradually added. The resultant solution was transferred to a 300 ml separating funnel, to which 50 ml of dichloromethane was added. The resultant solution was shaken several times. Thereafter, the aqueous layer was separated, and the organic layer was washed three times with 50 ml of water, and dried over anhydrous magnesium sulfate for 30 minutes. Subsequently, the solvent was distilled off under reduced pressure. The resultant solid was washed with a small amount of diethyl ether. As a result, a white solid was obtained. Further, the solvent of the washing liquid was distilled off under reduced pressure, and the resultant solid was washed with a small amount of diethyl ether to collect a white solid, which was then combined with the white solid previously obtained. The resultant solid was dried under reduced pressure. As a result, 793 mg (1.55 mmol, 76.0%) of bis(4-methoxyphenyl)(cyclopentadienyl)(2,3,6,7-tetramethylfluorenyl)methane was obtained. Bis(4-methoxyphenyl)(cyclopentadienyl)(2,3,6,7-tetramethylfluorenyl)methane was identified by FD-MS spectrum. A measured value thereof is shown below.

FD-MS spectrum: M/z 512 (M$^+$)

(ii) Synthesis of [bis(4-methoxyphenyl)methylene(η$^5$-cyclopentadienyl)(η$^5$-2,3,6,7-tetramethylfluorenyl)]hafnium dichloride In nitrogen atmosphere, to a 100 ml Schlenk flask, 272 mg (0.531 mmol) of bis(4-methoxyphenyl)(cyclopentadienyl)(2,3,6,7-tetramethylfluorenyl)methane, 20 ml of dehydrated toluene, and 90 μl (1.1 mmol) of THF were sequentially added. While the mixture was cooled in an ice bath, 0.68 ml (1.1 mmol) of a n-butyllithium/hexane solution (1.63 M) was gradually added. The mixture was stirred at 45° C. for 5 hours. As a result, a red solution was obtained. After the solvent was distilled off under reduced pressure, 20 ml of dehydrated diethyl ether was added to provide a red solution again. While the solution was cooled in a methanol/dry ice bath, 164 mg (0.511 mmol) of hafnium tetrachloride was added. While the temperature was gradually elevated to room temperature, the mixture was stirred for 16 hours. As a result, a yellow slurry was obtained. After the solvent was distilled off under reduced pressure, the resultant solid was transferred into a glove box, washed with hexane, and then subjected to extraction with dichloromethane. After the solvent was distilled off under reduced pressure, the resultant solid was allowed to dissolve in a small amount of dichloromethane, and hexane was added to perform recrystallization at −20° C. A solid precipitated was collected, washed with hexane, and dried under reduced pressure. As a result, 275 mg (0.362 mmol, 70.8%) of [bis(4-methoxyphenyl)methylene($\eta^5$-cyclopentadienyl)($\eta^5$-2,3,6,7-tetramethylfluorenyl)]hafnium dichloride was obtained as a yellow solid. [Bis(4-methoxyphenyl)methylene($\eta^5$-cyclopentadienyl)($\eta^5$-2,3,6,7-tetramethylfluorenyl)]hafnium dichloride was identified by $^1$H NMR spectrum and FD-MS spectrum. Measured values thereof are shown below.

$^1$H NMR spectrum (270 MHz, CDCl$_3$): δ/ppm 7.87 (s, 2H), 7.80-7.66 (m, 4H), 6.94-6.83 (m, 4H), 6.24 (t, J=2.6 Hz, 2H), 6.15 (s, 2H), 5.65 (t, J=2.6 Hz, 2H), 3.80 (s, 6H), 2.47 (s, 6H), 2.05 (s, 6H) FD-MS spectrum: M/z 760 (M$^+$)

Synthesis Example 12

Synthesis of [bis(4-N-morpholinylphenyl)methylene ($\eta^5$-cyclopentadienyl) ($\eta^5$-2,7-di-t-butylfluorenyl)] hafnium dichloride (i) Synthesis of bis(4-N-morpholinylphenyl)(cyclopentadienyl)(2,7-di-t-butylfluorenyl)methane In nitrogen atmosphere, to a 100 ml three-neck flask, 1.6 g (5.8 mmol) of 2,7-di-t-butylfluorene, and 80 ml of dehydrated THF were introduced. Thereto, in an ice water bath, 3.9 ml (6.1 mmol) of a 1.56 M n-butyllithium hexane solution was slowly added dropwise. While gradually returning to room temperature, the mixture was stirred for 4 hours. Thereto, in an ice water bath, 2.30 g (5.8 mmol) of 6,6-bis(4-N-morpholinylphenyl)fulvene was added. The mixture was stirred for 20 hours at room temperature. Thereafter, to the reaction solution, saturated ammonium chloride water was added to separate the organic layer, and the aqueous layer was subjected to extraction with diethyl ether. The resultant organic layers were combined, washed one time with a saturated aqueous sodium bicarbonate solution, one time with water, and one time with a saturated saline solution, and dried over magnesium sulfate. The solvent was distilled off. The resultant solid was washed with methanol. As a result, 1.3 g (32.6%) of bis(4-N-morpholinylphenyl)(cyclopentadienyl)(2,7-di-t-butylfluorenyl)methane was obtained as an ocher powder. Bis(4-N-morpholinylphenyl)(cyclopentadienyl)(2,7-di-t-butylfluorenyl)methane was identified by $^1$H NMR spectrum. Measured values thereof are shown below.

$^1$H NMR spectrum (270 MHz, CDCl$_3$): δ/ppm 7.5-7.0 (br), 6.7-6.5 (br), 6.5-6.0 (br), 5.30 (s), 3.9-3.7 (br),3.3-2.9 (br),1.2-1.0 (s)

(ii) Synthesis of [bis(4-N-morpholinylphenyl)methylene($\eta^5$-cyclopentadienyl)($\eta^5$-2,7-di-t-butylfluorenyl)]hafnium dichloride In nitrogen atmosphere, to a 100 ml Schlenk flask, 0.8 g (1.2 mmol) of bis(4-N-morpholinylphenyl)(cyclopentadienyl)(2,7-di-t-butylfluorenyl)methane, 30 ml of dehydrated toluene, and 0.5 g of dehydrated THF were added. While the mixture was cooled in a dry ice bath, 1.5 ml (2.4 mmol) of a n-butyllithium/hexane solution (1.58M) was gradually added. The mixture was stirred for 30 minutes at room temperature, and thereafter stirred for 4 hours under heating at 40° C. After the reaction solution returning to room temperature, the solvent was distilled off. To the resultant solid, 50 ml of dehydrated diethyl ether was added, followed by cooling to −20° C., and thereafter 0.381 g (1.2 mmol) of hafnium tetrachloride was added. While the temperature was gradually elevated to room temperature, the mixture was stirred for 16 hours. Subsequently, the solvent was distilled off, and the resultant was washed with dehydrated hexane and dehydrated diethyl ether, and then subjected to extraction with dehydrated dichloromethane. The resultant was concentrated again, and thereafter washed with dehydrated diethyl ether. As a result, 0.64 g (58%) of [bis(4-N-morpholinylphenyl)methylene($\eta^5$-cyclopentadienyl)($\eta^5$-2,7-di-t-butylfluorenyl)]hafnium dichloride was obtained as a yellow solid. [Bis(4-N-morpholinylphenyl)methylene($\eta^5$-cyclopentadienyl)($\eta^5$-2,7-di-t-butylfluorenyl)]hafnium dichloride was identified by $^1$H NMR spectrum. Measured values thereof are shown below.

$^1$H NMR spectrum (270 MHz, CDCl$_3$): δ/ppm 7.99 (d, J=8.9 Hz, 2H), 7.82-7.67 (m, 4H), 7.54 (d, J=8.9 Hz, 2H), 6.96-6.84 (m, 4H), 6.44 (s, 2H), 6.25 (t, J=2.6 Hz, 2H), 5.60 (t, J=2.6 Hz, 2H), 3.83 (t, J=4.8 Hz, 8H), 3.12 (t, J=4.8 Hz, 8H), 1.05 (s, 18H)

Comparative Synthesis Example 2

Synthesis of [bis(4-methylphenyl)methylene($\eta^5$-cyclopentadienyl)($\eta^5$-2,7-di-t-butylfluorenyl)]hafnium dichloride (i) Synthesis of [bis(4-methylphenyl)methylene($\eta^5$-cyclopentadienyl)($\eta^5$-2,7-di-t-butylfluorenyl)]hafnium dichloride In nitrogen atmosphere, to a 100 ml Schlenk flask, 684 g (1.27 mmol) of bis(4-methylphenyl)(cyclopentadienyl)(2,7-di-t-butylfluorenyl) methane, and 50 ml of dehydrated diethyl ether were added. While the mixture was cooled in a methanol/dry ice bath, 1.7 ml (2.8 mmol) of a n-butyllithium/hexane solution (1.63 M) was gradually added. The mixture was stirred for 17 hours at room temperature. While the mixture was cooled in a methanol/dry ice bath, 406 mg (1.27 mmol) of hafnium tetrachloride was added. While the temperature was gradually elevated to room temperature, the mixture was stirred for 16 hours. As a result, an orange slurry was obtained. After the solvent was distilled off under reduced pressure, the resultant solid was transferred into a glove box, and subjected to extraction with diethyl ether. The solvent was distilled off under reduced pressure to give a solid, and to this solid, a small amount of methylene chloride was added. Thereafter, hexane was added. The mixture was allowed to be left at −20° C. As a result, a yellow solid was precipitated out. This solid was collected by filtration, washed with a small amount of hexane, and thereafter dried under reduced pressure. As a result, 131 mg (167 μmol, 13.2%) of [bis(4-methylphenyl)methylene($\eta^5$-cyclopentadienyl)($\eta^5$-2,7-di-t-butylfluorenyl)]hafnium dichloride was obtained as a yellow solid. [Bis(4-methylphenyl)methylene($\eta^5$-cyclopentadienyl)($\eta^5$-2,7-di-t-butylfluorenyl)]hafnium dichloride was identified by $^1$H NMR spectrum and FD-MS spectrum. Measured values thereof are shown below.

$^1$H NMR spectrum (270 MHz, CDCl$_3$): δ/ppm 7.99 (d, J=8.9 Hz, 2H), 7.80 (dd, J=8.0 Hz, 2.2 Hz, 2H), 7.73 (dd, J=8.0 Hz, 2.2 Hz, 2H), 7.54 (dd, J=8.9 Hz, 1.6 Hz, 2H), 7.22 (br d, J=8.9 Hz, 2H), 7.14 (br d, J=8.6 Hz, 2H), 6.36 (d, J=0.8 Hz, 2H) 6.26 (t, J=2.7 Hz, 2H), 5.60 (t, J=2.7 Hz, 2H), 2.32 (s, 6H), 1.03 (s, 18H)

FD-MS spectrum: M/z 784 (M+)

Synthesis Example 13

Synthesis of [bis(3,4-dimethoxyphenyl)methylene ($\eta^5$-cyclopentadienyl)($\eta^5$-2,7-dimethylfluorenyl)] hafnium dichloride (i) Synthesis of bis(3,4-dimethoxyphenyl)(cyclopentadienyl)(2,7-dimethylfluorenyl)methane In nitrogen atmosphere, to a 100 ml three-neck flask, 1.0 g (5.15 mmol) of 2,7-dimethylfluorene, and 30 ml of dehydrated cyclopentylmethyl ether were introduced. Thereto, in an ice water bath, 3.3 ml (5.40 mmol) of a 1.66 M n-butyllithium hexane solution was slowly added dropwise. While gradually returning to room temperature, the mixture was stirred for 20 hours. In an ice water bath, 1.80 g (5.15 mmol) of 6,6-bis(3,4-dimethoxyphenyl)fulvene was added, and the mixture was stirred for 8 hours at room temperature. Thereafter, the reaction solution was quenched with an aqueous hydrochloric acid solution, and subjected to extraction with diethyl ether. The resultant organic layer was washed one time with a saturated aqueous sodium bicarbonate solution, one time with water, and one time with a saturated saline solution, and dried over magnesium sulfate. The solvent was distilled off. The resultant solid was washed with a small amount of diethyl ether. As a result, 1.7 g (62%) of bis(3,4-dimethoxyphenyl)(cyclopentadienyl)(2,7-dimethylfluorenyl)methane was obtained as a white powder. Bis(3,4-dimethoxyphenyl)(cyclopentadienyl)(2,7-dimethylfluorenyl)methane was identified by $^1$H NMR spectrum. Measured values thereof are shown below.

$^1$H NMR spectrum (270 MHz, CDCl$_3$): δ/ppm 7.3 (br), 7.0-6.8 (br), 6.7-6.5 (br), 6.4-6.2 (br), 5.3 (s), 3.8 (bs), 3.7-3.5 (br), 3.1 (s), 2.2 (s)

(ii) Synthesis of [bis(3,4-dimethoxyphenyl)methylene($\eta^5$-cyclopentadienyl)($\eta^5$-2,7-dimethylfluorenyl)] hafnium dichloride In nitrogen atmosphere, to a 50 ml Schlenk flask, 0.8 g (1.47 mmol) of bis(3,4-dimethoxyphenyl)(cyclopentadienyl)(2,7-dimethylfluorenyl)methane, 30 ml of dehydrated toluene, and 0.5 g of dehydrated THF were added. While the mixture was cooled in a dry ice bath, 1.8 ml (2.94 mmol) of a n-butyllithium/hexane solution (1.66 M) was gradually added. The mixture was stirred for 30 minutes at room temperature, and thereafter stirred for 4 hours under heating at 40° C. After the reaction solution returning to room temperature, the solvent was distilled off. To the resultant solid, 80 ml of dehydrated diethyl ether was added, followed by cooling to −20° C., and thereafter 0.38 g (1.20 mmol) of hafnium tetrachloride was added. While the temperature was gradually elevated to room temperature, the mixture was stirred for 16 hours. Thereafter, the solvent was distilled off, and the resultant solid was subjected to extraction with dehydrated diethyl ether and dehydrated dichloromethane. Then, the solvent was distilled off, and the resultant solid was washed with a small amount of dehydrated diethyl ether and dehydrated dichloromethane. As a result, 0.34 g (29%) of [bis(3,4-dimethoxyphenyl)methylene($\eta^5$-cyclopentadienyl)($\eta^5$-2,7-dimethylfluorenyl)]hafnium dichloride was obtained as a yellow solid. [Bis(3,4-dimethoxyphenyl)methylene($\eta^5$-cyclopentadienyl)($\eta^5$-2,7-dimethylfluorenyl)]hafnium dichloride was identified by $^1$H NMR spectrum. Measured values thereof are shown below.

$^1$H NMR spectrum (270 MHz, CDCl3): δ/ppm 7.93 (d, J=8.6 Hz, 2H), 7.41-7.22 (m, 6H), 6.82 (dd, J=15.1, 8.6 Hz, 2H), 6.25-6.20 (m, 4H), 5.69-5.62 (m, 2H), 3.85-3.82 (m, 9H), 3.58 (s, 3H), 2.10 (s, 6H)

Synthesis Example 14

Synthesis of [bis(4-methoxyphenyl)methylene($\eta^5$-cyclopentadienyl)($\eta^5$-2,7-dimethylfluorenyl)]hafnium dichloride (i) Synthesis of bis(4-methoxyphenyl)(cyclopentadienyl)(2,7-dimethylfluorenyl) methane In nitrogen atmosphere, to a 100 ml three-neck flask, 1.0 g (5.15 mmol) of 2,7-dimethylfluorene, and 30 ml of dehydrated cyclopentylmethyl ether were introduced. Thereto, in an ice water bath, 3.3 ml (5.40 mmol) of a 1.66 M n-butyllithium hexane solution was slowly added dropwise. While gradually returning to room temperature, the mixture was stirred for 20 hours. Thereafter, the resultant was cooled to −20° C., and 1.5 g (5.17 mmol) of 6,6-bis(4-methoxyphenyl) fulvene was added. The mixture was stirred for 8 hours at room temperature. Subsequently, the reaction solution was quenched with an aqueous hydrochloric acid solution, and subjected to extraction with diethyl ether. The resultant organic layer was washed one time with a saturated aqueous sodium bicarbonate solution, one time with water, and one time with a saturated saline solution, and dried over magnesium sulfate. The solvent was distilled off. The resultant solid was washed with a small amount of hexane. As a result, 2.1 g (83%) of bis(4-methoxyphenyl)(cyclopentadienyl)(2,7-dimethylfluorenyl) methane was obtained as a white powder.

Bis(4-methoxyphenyl)(cyclopentadienyl)(2,7-dimethylfluorenyl) methane was identified by $^1$H NMR spectrum. Measured values thereof are shown below.

$^1$H NMR spectrum (270 MHz, CDCl$_3$): δ/ppm 7.31 (d, J=7.6 Hz), 7.10 (br s), 6.96 (d, J=7.6 Hz), 6.84 (br s), 6.62 (br s), 6.41 (s), 6.30-6.24 (br m), 5.29 (s), 3.73 (br s), 3.00 (br s), 2.83 (br s), 2.21 (s), 2.16 (s)

(ii) Synthesis of [bis(4-methoxyphenyl)methylene ($\eta^5$-cyclopentadienyl)($\eta^5$-2,7-dimethylfluorenyl)] hafnium dichloride In nitrogen atmosphere, to a 50 ml Schlenk flask, 0.8 g (1.65 mmol) of bis(4-methoxyphenyl)(cyclopentadienyl)(2,7-dimethylfluorenyl) methane, 30 ml of dehydrated toluene, and 0.5 g of dehydrated THF were added. While the mixture was cooled in a dry ice bath, 2.1 ml (3.38 mmol) of a n-butyllithium/hexane solution (1.66 M) was gradually added. The mixture was stirred for 30 minutes at room temperature, and thereafter stirred for 4 hours under heating at 40° C. After the reaction solution returning to room temperature, the solvent was distilled off. To the resultant solid, 80 ml of dehydrated diethyl ether was added, followed by cooling to −20° C., and thereafter 0.527 g (1.65 mmol) of hafnium tetrachloride was added. While the temperature was gradually elevated to room temperature, the mixture was stirred for 16 hours. Thereafter, the solvent was distilled off, the resultant solid was washed with dehydrated diethyl ether, and then subjected to extraction with dehydrated dichloromethane. The solvent was distilled off, and the resultant solid was washed with a small amount of dehydrated diethyl ether. As a result, 0.66 g (55%) of [bis(4-methoxyphenyl)methylene($\eta^5$-cyclopentadienyl)($\eta^5$-2,7-dimethylfluorenyl)]hafnium dichloride was obtained as a yellow solid. [Bis(4-methoxyphenyl)methylene($\eta^5$-cyclopentadienyl)($\eta^5$-2,7-dimethylfluorenyl)]hafnium dichloride was identified by $^1$H NMR spectrum. Measured values thereof are shown below.

$^1$H NMR spectrum (270 MHz, CDCl$_3$): δ/ppm 7.97 (d, J=8.6 Hz, 2H), 7.80-7.64 (m, 4H), 7.32 (d, J=8.6 Hz, 2H), 6.96-6.83 (m, 4H), 6.29 (t, J=2.6 Hz, 2H), 6.18 (s, 2H), 5.68 (t, J=2.6 Hz, 2H), 3.80 (s, 6H), 2.14 (s, 6H)

Comparative Synthesis Example 3

Synthesis of [bis(4-methylphenyl)methylene($\eta^5$-cyclopentadienyl)($\eta^5$-2,7-dimethylfluorenyl)]hafnium dichloride (i) Synthesis of bis(4-methylphenyl)(cyclopentadienyl)(2,7-dimethylfluorenyl)methane In nitrogen atmosphere, to a 200 ml three-neck flask, 876 mg (4.51 mmol) of 2,7-dimethylfluorene, and 20 ml of dehydrated THF were added. While the mixture was cooled in a methanol/dry ice bath, 3.0 ml (4.9 mmol) of a n-butyllithium/hexane solution (1.63 M) was gradually added. The mixture was stirred for 4 hours at room temperature. While the mixture was cooled in a methanol/dry ice bath, a solution of 1.28 g (4.96 mmol) of 6,6-bis(4-methylphenyl)fulvene dissolved in 25 ml of THF was added. While the temperature was gradually elevated to room temperature, the mixture was stirred for 23 hours. As a result, an orange slurry was obtained. The organic phase was extracted, washed with 100 ml of a saturated aqueous ammonium chloride solution, with 100 ml of a saturated aqueous sodium bicarbonate solution, and then with 100 ml of a saturated aqueous sodium chloride solution, and thereafter, dehydrated with anhydrous magnesium sulfate. The solvent was distilled off under reduced pressure. As a result, a yellow solid was obtained. The resultant solid was washed with hexane and methanol, and dried under reduced pressure. As a result, 880 mg (1.94 mmol, 43.1%) of bis(4-methylphenyl)(cyclopentadienyl)(2,7-dimethylfluorenyl)methane was obtained as a yellow powder. Bis(4-methylphenyl)(cyclopentadienyl)(2,7-dimethylfluorenyl)methane was identified by FD-MS spectrum. A measured value thereof is shown below.

FD-MS spectrum: M/z 453 (M+)

(ii) Synthesis of [bis(4-methylphenyl)methylene($\eta^5$-cyclopentadienyl)($\eta^5$-2,7-dimethylfluorenyl)]hafnium dichloride In nitrogen atmosphere, to a 100 ml Schlenk flask, 843 mg (1.86 mmol) of 4,4'-ditolylcyclopentadienyl)(2,7-dimethylfluorenyl)methane, and 50 ml of dehydrated diethyl ether were added. While the mixture was cooled in a methanol/dry ice bath, 2.5 ml (4.0 mmol) of a n-butyllithium/hexane solution (1.59 M) was gradually added. The mixture was stirred for 24 hours at room temperature. While the mixture was cooled in a methanol/dry ice bath, 594 mg (1.86 mmol) of hafnium tetrachloride was added. While the temperature was gradually elevated to room temperature, the mixture was stirred for 19 hours. As a result, an orange slurry was obtained. After the solvent was distilled off under reduced pressure, the resultant solid was transferred into a glove box, and subjected to extraction with methylene chloride. The solvent was distilled off under reduced pressure to give a solid, and to this solid, a small amount of methylene chloride and hexane were added. The mixture was allowed to be left at −20° C. As a result, a yellow solid was precipitated out. This solid was collected by filtration, washed with a small amount of hexane, and thereafter dried under reduced pressure. As a result, 670 mg (957 μmol, 51.6%) of [bis(4-methylphenyl)methylene($\eta^5$-cyclopentadienyl)($\eta^5$-2,7-dimethylfluorenyl)]hafnium dichloride was obtained as a yellow solid. [Bis(4-methylphenyl)methylene($\eta^5$-cyclopentadienyl)($\eta^5$-2,7-dimethylfluorenyl)]hafnium dichloride was identified by $^1$H NMR spectrum and FD-MS spectrum. Measured values thereof are shown below.

$^1$H NMR spectrum (270 MHz, CDCl$_3$): δ/ppm 7.96 (d, J=8.6 Hz, 2H), 7.76 (dd, J=8.1 Hz, 2.4 Hz, 2H), 7.67 (dd, J=7.8 Hz, 1.9 Hz, 2H), 7.31 (dd, J=8.6 Hz, 1.4 Hz, 2H), 7.20 (br d, J=7.8 Hz, 2H), 7.10 (br d, J=7.8 Hz, 2H), 6.28 (t, J=8.0 Hz, 2H), 6.15 (br s, 2H), 5.68 (t, J=8.0 Hz, 2H), 2.33 (s, 6H), 2.12 (s, 6H) FD-MS spectrum: M/z 700 (M$^+$)

Synthesis Example 15

Synthesis of [bis[4-(dimethylamino)phenyl]methylene ($\eta^5$-cyclopentadienyl)($\eta^5$-3,6-di-t-butylfluorenyl)]hafnium dichloride (i) Synthesis of bis[4-(dimethylamino)phenyl](cyclopentadienyl)(3,6-di-t-butyl fluorenyl)methane In nitrogen atmosphere, to a 100 ml three-neck flask, 867 mg (3.12 mmol) of 3,6-di-t-butylfluorene, and 50 ml of dehydrated t-butylmethyl ether were added. While the mixture was cooled in an ice bath, 2.10 ml (3.34 mmol) of a n-butyllithium/hexane solution (1.59 M) was gradually added. Thereafter, the mixture was stirred for 19 hours at room temperature. After 988 mg (3.12 mmol) of 6,6-bis[4-(dimethylamino)phenyl]fulvene was added, the mixture was heated to reflux for 2 days. While the mixture was cooled in an ice bath, 50 ml of water was gradually added. The resultant two-layer solution was transferred to a 300 ml separating funnel, to which 100 ml of diethyl ether was added. The resultant solution was shaken several times. Thereafter, the aqueous layer was removed, and the organic layer was washed three times with 50 ml of water, and one time with 50 ml of a saturated saline solution, and dried over anhydrous magnesium sulfate for 30 minutes. Thereafter, the solvent was distilled off under reduced pressure. As a result, a brown solid was obtained, which was then recrystallized from hexane. As a result, 1.07 g (1.81 mmol, 58.0%) of bis[4-(dimethylamino)phenyl](cyclopentadienyl)(3,6-di-t-butyl fluorenyl)methane was obtained as a white solid. Bis[4-(dimethylamino)phenyl](cyclopentadienyl)(3,6-di-t-butyl fluorenyl)methane was identified by FD-MS spectrum. A measured value thereof is shown below.

FD-MS spectrum: M/z 594 (M$^+$)

(ii) Synthesis of [bis[4-(dimethylamino)phenyl] methylene ($\eta^5$-cyclopentadienyl)($\eta^5$-3,6-di-t-butylfluorenyl)]hafnium dichloride In nitrogen atmosphere, to a 100 ml Schlenk flask, 501 mg (841 μmol) of bis[4-(dimethylamino)phenyl](cyclopentadienyl)(3,6-di-t-butyl fluorenyl)methane, 30 ml of dehydrated toluene, and 0.14 ml (1.7 mmol) of dehydrated THF were sequentially added. While the mixture was cooled in an ice bath, 1.10 ml (1.75 mmol) of a n-butyllithium/hexane solution (1.59M) was gradually added. The mixture was stirred at 45° C. for 5 hours. As a result, a red solution was obtained. After the solvent was distilled off under reduced pressure, 30 ml of dehydrated diethyl ether was added to provide a red solution again. While the solution was cooled in a methanol/dry ice bath, 235 mg (735 μmol) of hafnium tetrachloride was added. While the temperature was gradually elevated to room temperature, the mixture was stirred for 16 hours. After the solvent was distilled off under reduced pressure, the resultant solid was transferred into a glove box, washed with hexane, and then subjected to extraction with dichloromethane. The solvent was distilled off under reduced pressure for concentration. A small amount of hexane was added to perform recrystallization at −20° C. A solid precipitated was washed with a small amount of hexane, and dried under reduced pressure. As a result, 459 mg (545 μmol, 74.2%) of [bis[4-(dimethylamino)phenyl]methylene ($\eta^5$-cyclopentadienyl)($\eta^5$-3,6-di-t-butylfluorenyl)]hafnium dichloride was obtained as a yellow solid. [Bis[4-(dimethylamino)phenyl]methylene ($\eta^5$-cyclopentadienyl)($\eta^5$-3,6-di-t-butylfluorenyl)]hafnium dichloride was identified by $^1$H NMR spectrum and FD-MS spectrum. Measured values thereof are shown below.

$^1$H NMR spectrum (270 MHz, CDCl$_3$): δ/ppm 8.04 (d, J=1.3 Hz, 2H), 7.70-7.60 (m, 4H), 7.08-7.04 (m, 2H), 6.72-6.69 (m, 4H), 6.52-6.48 (m, 2H), 6.24 (t, J=2.6 Hz, 2H), 5.68 (t, J=2.6 Hz, 2H), 2.93 (s, 12H), 1.40 (s, 18H)
FD-MS spectrum: M/z 842 (M$^+$)

Comparative Synthesis Example 4

Synthesis of [bis(4-methylphenyl)methylene($\eta^5$-cyclopentadienyl)($\eta^5$-3,6-di-t-butylfluorenyl)]hafnium dichloride (i) Synthesis of bis(4-methylphenyl)(cyclopentadienyl)(3,6-di-t-butylfluorenyl) methane In nitrogen atmosphere, to a 200 ml three-neck flask, 2.50 g (8.98 mmol) of 3,6-di-t-butylfluorene, and 150 ml of dehydrated THF were added and stirred. With this solution cooled to −20° C., 5.9 ml (9.26 mmol) of a n-butyllithium/hexane solution (1.57 M) was gradually added. Thereafter, the mixture was stirred for 14 hours at room temperature. The resultant solution was cooled again to −20° C., and then, a THF solution of 2.78 g (10.76 mmol) of 6,6-bis(4-methylphenyl)fulvene was added dropwise. Thereafter, the mixture was stirred for 14 hours at room temperature. Subsequently, the reaction solution was quenched with a saturated aqueous ammonium chloride solution, and subjected to extraction with diethyl ether. The resultant organic layer was washed one time with a saturated aqueous sodium bicarbonate solution, one time with water, and one time with a saturated saline solution, and dried over magnesium sulfate. The solvent was distilled off. The resultant solid was washed with methanol. As a result, 3.45 g (72%) of bis(4-methylphenyl)(cyclopentadienyl)(3,6-di-t-butylfluorenyl) methane was obtained as a white solid. Bis(4-methylphenyl)(cyclopentadienyl)(3,6-di-t-butylfluorenyl) methane was identified by $^1$H NMR spectrum. Measured values thereof are shown below.

H NMR spectrum (270 MHz, CDCl$_3$): δ/ppm 7.5-6.7 (m), 5.38 (s),3.0-2.8 (br), 2.3 (br), 1.3 (s)

(ii) Synthesis of [bis(4-methylphenyl)methylene($\eta^5$-cyclopentadienyl)($\eta^5$-3,6-di-t-butylfluorenyl)]hafnium dichloride In nitrogen atmosphere, to a 50 ml Schlenk flask, 0.565 g (1.05 mmol) of bis(4-methylphenyl)(cyclopentadienyl)(3,6-di-t-butylfluorenyl) methane, 10 ml of dehydrated toluene, and 0.3 g of dehydrated THF were added. While the mixture was cooled in a dry ice bath, 1.3 ml (2.11 mmol) of a n-butyllithium/hexane solution (1.66 M) was gradually added. The mixture was stirred for 30 minutes at room temperature, and thereafter stirred for 4 hours under heating at 40° C. After the reaction solution returning to room temperature, the solvent was distilled off. To the resultant solid, 80 ml of dehydrated diethyl ether was added, followed by cooling to −20° C., and thereafter 0.318 g (1.0 mmol) of hafnium tetrachloride was added. While the temperature was gradually elevated to room temperature, the mixture was stirred for 16 hours. Thereafter, the solvent was distilled off, and the resultant solid was subjected to extraction with dehydrated diethyl ether and dehydrated dichloromethane, followed by distilling off the solvent. The resultant solid was washed with a small amount of dehydrated diethyl ether. As a result, 0.32 g (38%) of [bis(4-methylphenyl)methylene ($\eta^5$-cyclopentadienyl)($\eta^5$-3,6-di-t-butylfluorenyl)]hafnium dichloride was obtained as a yellow solid. [Bis(4-methylphenyl)methylene($\eta^5$-cyclopentadienyl)($\eta^5$-3,6-di-t-butylfluorenyl)]hafnium dichloride was identified by $^1$H NMR spectrum. Measured values thereof are shown below.

$^1$H NMR spectrum (270 MHz, CDCl$_3$): δ/ppm 8.05 (d, J=1.0 Hz, 2H), 7.76-7.70 (m, 4H), 7.19-7.10 (m, 4H), 7.07 (d, J=9.2 Hz, 2H), 6.39 (d, J=9.2 Hz, 2H), 6.25 (t, J=2.6 Hz, 2H), 5.67 (t, J=2.6 Hz, 2H), 2.32 (s, 6H), 1.40 (s, 18H)

Comparative Synthesis Example 5

Synthesis of [bis(4-chlorophenyl)methylene($\eta^5$-cyclopentadienyl)($\eta^5$-3,6-di-t-butylfluorenyl)]hafnium dichloride (i) Synthesis of [bis(4-chlorophenyl)methylene($\eta^5$-cyclopentadienyl)($\eta^5$-3,6-di-t-butylfluorenyl)]hafnium dichloride In nitrogen atmosphere, to a 50 ml Schlenk flask, 0.50 g (0.87 mmol) of bis(4-chlorophenyl)(cyclopentadienyl)(3,6-di-t-butylfluorenyl) methane, 20 ml of dehydrated toluene, and 0.4 g of dehydrated THF were added. While the mixture was cooled in a dry ice bath, 1.1 ml (1.73 mmol) of a n-butyllithium/hexane solution (1.67 M) was gradually added. The mixture was stirred for 30 minutes at room temperature, and thereafter stirred for 4 hours under heating at 40° C. After the reaction solution returning to room temperature, the solvent was distilled off. To the resultant solid, 80 ml of dehydrated diethyl ether was added, followed by cooling to −20° C., and thereafter 0.308 g (0.96 mmol) of hafnium tetrachloride was added. While the temperature was gradually elevated to room temperature, the mixture was stirred for 16 hours. Thereafter, the solution was filtered, concentrated and solidified by drying to give a solid. This solid was subjected to extraction with dehydrated hexane. The solvent was distilled off. The resultant solid was washed with a small amount of dehydrated diethyl ether. As a result, 0.23 g (32%) of [bis(4-chlorophenyl)methylene($\eta^5$-cyclopentadienyl)($\eta^5$-3,6-di-t-butylfluorenyl)]hafnium dichloride was obtained as a yellow solid. [Bis(4-chlorophenyl)methylene($\eta^5$-cyclopentadienyl)($\eta^5$-3,6-di-t-butylfluorenyl)]hafnium dichloride was identified by $^1$H NMR spectrum. Measured values thereof are shown below.

$^1$H NMR spectrum (270 MHz, CDCl$_3$): δ/ppm 8.07 (s, 2H), 7.88-7.73 (m, 4H), 7.44-7.31 (m, 4H), 7.12 (dd, J=9.2, 2.0 Hz, 2H), 6.35 (d, J=9.2 Hz, 2H), 6.28 (t, J=2.6 Hz, 2H), 5.63 (t, J=2.6 Hz, 2H), 1.41 (s, 18H)

Comparative Synthesis Example 6

Synthesis of [diphenylmethylene($\eta^5$-cyclopentadienyl)($\eta^5$-3,6-di-t-butylfluorenyl)]hafnium dichloride (i) Synthesis of diphenyl(cyclopentadienyl)(3,6-di-t-butylfluorenyl)methane In nitrogen atmosphere, to a 200 ml three-neck flask, 7.0 g (24.6 mmol) of 3,6-di-t-butylfluorene lithium salt, and 100 ml of dehydrated THF were introduced. While the mixture was cooled to −20° C., 16.6 ml (26.9 mmol) of a 1.62 M n-butyllithium hexane solution was slowly added dropwise. While gradually returning to room temperature, the mixture was stirred for 20 hours. Thereafter, while the mixture was cooled to −20° C., 6.0 g (26.1 mmol) of 6,6-diphenylfulvene was added. The mixture was stirred for 1 hour at room temperature. Subsequently, the reaction solution was quenched with an aqueous hydrochloric acid solution, and subjected to extraction with diethyl ether. The resultant organic layer was washed one time with a saturated aqueous sodium bicarbonate solution, one time with water, and one time with a saturated saline solution, and dried over magnesium sulfate. The solvent was distilled off. The resultant solid was washed with methanol. As a result, 10.2 g (82%) of diphenyl(cyclopentadienyl)(3,6-di-t-butylfluorenyl)methane was obtained as a white powder. Diphenyl(cyclopentadienyl)(3,6-di-t-butylfluorenyl)methane was identified by $^1$H NMR spectrum. Measured values thereof are shown below.

$^1$H NMR spectrum (270 MHz, CDCl$_3$): δ/ppm 7.5 (s), 7.2-6.9 (br), 6.4-6.0 (br), 5.4 (br), 3.2-2.8 (br), 1.3 (s)

(ii) Synthesis of [diphenylmethylene($\eta^5$-cyclopentadienyl)($\eta^5$-3,6-di-t-butylfluorenyl)]hafnium dichloride In nitrogen atmosphere, to a 150 ml Schlenk flask, 3.0 g (5.9 mmol) of diphenyl(cyclopentadienyl)(3,6-di-t-butylfluorenyl)methane, and 80 ml of dehydrated diethyl ether were added. While the mixture was cooled in a dry ice bath, 7.3 ml (11.8 mmol) of a n-butyllithium/hexane solution (1.63 M) was gradually added. The mixture was stirred for 24 hours at room temperature. Thereafter, the solvent was distilled off to give a solid, and to this solid, 100 ml of dehydrated hexane was added, followed by cooling to −20° C., and thereafter 1.76 g (5.5 mmol) of hafnium tetrachloride was added. While the temperature was gradually elevated to room temperature, the mixture was stirred for 16 hours. Thereafter, the solvent was distilled off, and the resultant solid was washed with dehydrated hexane and dehydrated diethyl ether, and then subjected to extraction with dehydrated dichloromethane. The solvent was distilled off, and the resultant solid was washed with a small amount of dehydrated diethyl ether. As a result, 1.66 g (37%) of [diphenylmethylene ($\eta^5$-cyclopentadienyl)($\eta^5$-3,6-di-t-butylfluorenyl)]hafnium dichloride was obtained as a yellow solid. [Diphenylmethylene ($\eta^5$-cyclopentadienyl)($\eta^5$-3,6-di-t-butylfluorenyl)]hafnium dichloride was identified by $^1$H NMR spectrum. Measured values thereof are shown below.

$^1$H NMR spectrum (270 MHz, CDCl$_3$): δ/ppm 8.07 (s, 2H), 7.91-7.86 (m, 4H), 7.38-7.30 (m, 6H), 7.07 (dd, J=9.2, 1.5 Hz, 2H), 6.34 (dd, J=9.2, 1.5 Hz, 2H), 6.27 (t, J=2.8 Hz, 2H), 5.68 (t, J=2.8 Hz, 2H), 1.40 (s, 18H)

Synthesis Example 16

Synthesis of [bis[4-(dimethylamino)phenyl]methylene ($\eta^5$-cyclopentadienyl)($\eta^5$-octamethyloctahydrodibenzofluorenyl)]zirconium dichloride (i) Synthesis of [bis[4-(dimethylamino)phenyl]methylene ($\eta^5$-cyclopentadienyl)($\eta^5$-octamethyloctahydrodibenzofluorenyl)]hafnium dichloride In nitrogen atmosphere, to a 100 ml Schlenk flask, 1.52 g (2.17 mmol) of bis[4-(dimethylamino)phenyl](cyclopentadienyl)(octamethyloctahydrodibenzofluorenyl)methane, 50 ml of dehydrated toluene, and 0.37 ml (4.6 mmol) of dehydrated THF were sequentially added. While the mixture was cooled in an ice bath, 2.80 ml (4.59 mmol) of a n-butyllithium/hexane solution (1.64 M) was gradually added. The mixture was stirred at 45° C. for 5 hours. As a result, a red solution was obtained. After the solvent was distilled off under reduced pressure, 50 ml of dehydrated diethyl ether was added to provide a red solution again. While the solution was cooled in a methanol/dry ice bath, 466 mg (2.00 mmol) of zirconium tetrachloride was added. While the temperature was gradually elevated to room temperature, the mixture was stirred for 16 hours. As a result, a red slurry was obtained. After the solvent was distilled off under reduced pressure, the resultant solid was transferred into a glove box, washed with hexane, and then subjected to extraction with dichloromethane. The solvent was distilled off under reduced pressure for concentration, and a small amount of hexane was added thereto. As a result, a solid was precipitated and collected. This solid was washed with hexane, and dried under reduced pressure. As a result, 750 mg (0.869 mmol, 43.5%) of [bis[4-(dimethylamino)phenyl]methylene($\eta^5$-cyclopentadienyl)($\eta^5$-octamethyloctahydrodibenzofluorenyl)]zirconium dichloride was obtained as a red solid. [Bis[4-(dimethylamino)phenyl]methylene($\eta^5$-cyclopentadienyl)($\eta^5$-octamethyloctahydrodibenzofluorenyl)]zirconium dichloride was identified by $^1$H NMR spectrum. Measured values thereof are shown below.

$^1$H NMR spectrum (270 MHz, CDCl$_3$): δ/ppm 8.02 (s, 2H), 7.73-7.61 (m, 4H), 6.80-6.68 (m, 4H), 6.30 (s, 2H), 6.23 (t, J=2.6 Hz, 2H), 5.53 (t, J=2.6 Hz, 2H), 2.90 (s, 12H), 1.7-1.5 (br m, 8H), 1.46 (s, 6H), 1.39 (s, 6H), 0.98 (s, 6H), 0.84 (s, 6H)

Comparative Synthesis Example 7

Synthesis of [bis(4-methylphenyl)methylene($\eta^5$-cyclopentadienyl)($\eta^5$-octamethyloctahydrodibenzofluorenyl)]hafnium dichloride (i) Synthesis of [bis(4-methylphenyl)methylene($\eta^5$-cyclopentadienyl)($\eta^5$-octamethyloctahydrodibenzofluorenyl)]hafnium dichloride In nitrogen atmosphere, to a 200 ml Schlenk flask, 3.07 g (4.76 mmol) of bis(4-methylphenyl)(cyclopentadienyl)(octamethyloctahydrodibenzofluorenyl)methane, 80 ml of dehydrated toluene, and 800 µl (9.9 mmol) of dehydrated THF were sequentially added. While the mixture was cooled in an ice bath, 6.00 ml (9.90 mmol) of a n-butyllithium/hexane solution (1.65 M) was gradually added. The mixture was stirred at 45° C. for 5 hours. As a result, a red solution was obtained. After the solvent was distilled off under reduced pressure, 100 ml of dehydrated diethyl ether was added to provide a red solution again. While the solution was cooled in a methanol/dry ice bath, 1.43 g (4.46 mmol) of hafnium tetrachloride was added. While the temperature was gradually elevated to room temperature, the mixture was stirred for 15 hours. As a result, an orange slurry was obtained. After the solvent was distilled off under reduced pressure, the resultant solid was transferred into a glove box, washed with hexane, and then subjected to extraction with dichloromethane. After the solvent was distilled off under reduced pressure, the resultant solid was allowed to dissolve in a small amount of dichloromethane, and hexane was added thereto. Thereafter, the solvent was distilled off little by little under reduced pressure. As a result, an orange solid was precipitated out. This solid was collected by filtration, washed with hexane, and dried under reduced pressure. As a result, 3.14 g (3.51 mmol, 78.7%) of [bis(4-methylphenyl)methylene($\eta^5$-cyclopentadienyl)($\eta^5$-octamethyloctahydrodibenzofluorenyl)]hafnium dichloride was obtained as an orange solid. [Bis(4-methylphenyl)methylene($\eta^5$-cyclopentadienyl)($\eta^5$-octamethyloctahydrodibenzofluorenyl)]hafnium dichloride was identified by $^1$H NMR spectrum and FD-MS spectrum. Measured values thereof are shown below.

$^1$H NMR spectrum (270 MHz, CDCl$_3$): δ/ppm 8.02 (s, 2H), 7.82-7.69 (m, 4H), 7.25-7.11 (m, 4H), 6.22 (s, 2H), 6.19 (t, J=2.6 Hz, 2H), 5.50 (t, J=2.6 Hz, 2H), 2.32 (s, 6H), 1.7-1.5 (br m, 8H), 1.46 (s, 6H), 1.39 (s, 6H), 0.94 (s, 6H), 0.83 (s, 6H) FD-MS spectrum: M/z 892 (M$^+$)

Example 1

Ethylene/1-octene copolymerization using [bis(4-N-morpholinylphenyl)methylene($\eta^5$-cyclopentadienyl)($\eta^5$-octamethyloctahydrodibenzofluorenyl)]hafnium dichloride To a stainless autoclave with an inner volume of 2 L sufficiently nitrogen-purged, 850 ml of heptane, and 150 ml of 1-octene were introduced, and the temperature of the system was elevated to 147° C. Thereafter, ethylene was fed so that the total pressure became 3 MPa-G. Subsequently, 0.3 mmol of triisobutylaluminum, 0.00005 mmol of [bis(4-N-morpholinylphenyl)methylene($\eta^5$-cyclopentadienyl)($\eta^5$-octamethyloctahydrodibenzofluorenyl)]hafnium dichloride, and 0.00020 mmol of N,N-dimethylaniliniumtetrakis(pentafluorophenyl)borate were injected with nitrogen, and the number of stirring rotations was set at 250 rpm. Thereby, polymerization was initiated. Thereafter, ethylene alone was continuously fed to keep the total pressure at 3 MPa-G. Polymerization was performed for 10 minutes at 150° C. A small amount of ethanol was added into the system to terminate the polymerization, and thereafter unreacted ethylene was purged. The resultant polymer solution was poured into an excess amount of methanol to precipitate out a polymer. The polymer was collected by filtration, and dried under reduced pressure at 120° C. overnight.

As a result, 3.1 g of an ethylene-1-octene copolymer was obtained. The resultant polymer contained 1-octene in an amount of 12.5 mol %, and had [η]=6.92 dl/g.

Example 2

Ethylene/1-octene copolymerization using [bis[4-(dimethylamino)phenyl]methylene ($\eta^5$-cyclopentadienyl)($\eta^5$-octamethyloctahydrodibenzofluorenyl)]hafnium dichloride Polymerization was performed in the same manner as in Example 1, except that 0.00005 mmol of [bis(4-N-morpholinylphenyl)methylene($\eta^5$-cyclopentadienyl)($\eta^5$-octamethyloctahydrodibenzofluorenyl)]hafnium dichloride was replaced by 0.00005 mmol of [bis[4-(dimethylamino)phenyl]methylene ($\eta^5$-cyclopentadienyl)($\eta^5$-octamethyloctahydrodibenzofluorenyl)]hafnium dichloride.

As a result, 15.2 g of an ethylene-1-octene copolymer was obtained. The resultant polymer contained 1-octene in an amount of 12.2 mol %, and had [η]=5.48 dl/g.

Example 3

Ethylene/1-octene copolymerization using [bis(3-N-morpholinylphenyl)methylene($\eta^5$-cyclopentadienyl)($\eta^5$-octamethyloctahydrodibenzofluorenyl)]hafnium dichloride Polymerization was performed in the same manner as in Example 1, except that 0.00005 mmol of [bis(4-N-morpholinylphenyl)methylene($\eta^5$-cyclopentadienyl)($\eta^5$-octamethyloctahydrodibenzofluorenyl)]hafnium dichloride was replaced by 0.00020 mmol of [bis(3-N-morpholinylphenyl)methylene($\eta^5$-cyclopentadienyl)($\eta^5$-octamethyloctahydrodibenzofluorenyl)]hafnium dichloride, and that N,N-dimethylaniliniumtetrakis(pentafluorophenyl)borate was used in an amount of 0.00080 mmol.

As a result, 14.4 g of an ethylene-1-octene copolymer was obtained. The resultant polymer contained 1-octene in an amount of 13.2 mol %, and had [η]=5.30 dl/g.

Example 4

Ethylene/1-octene copolymerization using [bis(4-methoxy-3-methylphenyl)methylene($\eta^5$-cyclopentadienyl)($\eta^5$-octamethyloctahydrodibenzofluorenyl)]hafnium dichloride Polymerization was performed in the same manner as in Example 1, except that 0.00005 mmol of [bis(4-N-morpholinylphenyl)methylene($\eta^5$-cyclopentadienyl)($\eta^5$-octamethyloctahydrodibenzofluorenyl)]hafnium dichloride was replaced by 0.00006 mmol of [bis(4-methoxy-3-methylphenyl)methylene($\eta^5$-cyclopentadienyl)($\eta^5$-octamethyloctahydrodibenzofluorenyl)]hafnium dichloride, and that N,N-dimethylaniliniumtetrakis(pentafluorophenyl)borate was used in an amount of 0.00024 mmol.

As a result, 12.0 g of an ethylene-1-octene copolymer was obtained. The resultant polymer contained 1-octene in an amount of 12.9 mol %, and had [η]=5.29 dl/g.

Example 5

Ethylene/1-octene copolymerization using [bis(4-methoxy-3,5-dimethylphenyl)methylene($\eta^5$-cyclopentadienyl)($\eta^5$-octamethyloctahydrodibenzofluorenyl)]hafnium dichloride Polymerization was performed in the same manner as in Example 1, except that 0.00005 mmol of [bis(4-N-morpholinylphenyl)methylene($\eta^5$-cyclopentadienyl)($\eta^5$-octamethyloctahydrodibenzofluorenyl)]hafnium dichloride was replaced by 0.00006 mmol of [bis(4-methoxy-3,5-dimethylphenyl)methylene($\eta^5$-cyclopentadienyl)($\eta^5$-octamethyloctahydrodibenzofluorenyl)]hafnium dichloride, and that N,N-dimethylaniliniumtetrakis(pentafluorophenyl)borate was used in an amount of 0.00024 mmol.

As a result, 10.2 g of an ethylene-1-octene copolymer was obtained. The resultant polymer contained 1-octene in an amount of 13.4 mol %, and had [η]=5.15 dl/g.

Example 6

Ethylene/1-octene copolymerization using [bis(4-methoxyphenyl)methylene($\eta^5$-cyclopentadienyl)($\eta^5$-octamethyloctahydrodibenzofluorenyl)]hafnium dichloride Polymerization was performed in the same manner as in Example 1, except that 0.00005 mmol of [bis(4-N-morpholinylphenyl)methylene($\eta^5$-cyclopentadienyl)($\eta^5$-octamethyloctahydrodibenzofluorenyl)]hafnium dichloride was replaced by 0.00006 mmol of [bis(4-methoxyphenyl)methylene($\eta^5$-cyclopentadienyl)($\eta^5$-octamethyloctahydrodibenzofluorenyl)]hafnium dichloride, and that N,N-dimethylaniliniumtetrakis(pentafluorophenyl)borate was used in an amount of 0.00024 mmol.

As a result, 17.9 g of an ethylene-1-octene copolymer was obtained. The resultant polymer contained 1-octene in an amount of 12.8 mol %, and had [η]=4.73 dl/g.

Comparative Example 1

Ethylene/1-octene copolymerization using [bis(3-chlorophenyl)methylene($\eta^5$-cyclopentadienyl)($\eta^5$-octamethyloctahydrodibenzofluorenyl)]hafnium dichloride Polymerization was performed in the same manner as in Example 1, except that 0.00005 mmol of [bis(4-N-morpholinylphenyl)methylene($\eta^5$-cyclopentadienyl)($\eta^5$-octamethyloctahydrodibenzofluorenyl)]hafnium dichloride was replaced by 0.00010 mmol of [bis(3-chlorophenyl)methylene($\eta^5$-cyclopentadienyl)($\eta^5$-octamethyloctahydrodibenzofluorenyl)]hafnium dichloride, and that N,N-dimethylaniliniumtetrakis(pentafluorophenyl)borate was used in an amount of 0.00040 mmol.

As a result, 7.2 g of an ethylene-1-octene copolymer was obtained. The resultant polymer contained 1-octene in an amount of 14.9 mol %, and had [η]=4.17 dl/g.

Example 7

Ethylene/1-octene copolymerization using [bis[4-(dimethylamino)phenyl]methylene($\eta^5$-cyclopentadienyl)($\eta^5$-tetramethyloctahydrodibenzofluorenyl)]hafnium dichloride Polymerization was performed in the same manner as in Example 1, except that 0.00005 mmol of [bis(4-N-morpholinylphenyl)methylene($\eta^5$-cyclopentadienyl)($\eta^5$-octamethyloctahydrodibenzofluorenyl)]hafnium dichloride was replaced by 0.00005 mmol of [bis[4-(dimethylamino)phenyl]methylene($\eta^5$-cyclopentadienyl)($\eta^5$-tetramethyloctahydrodibenzofluorenyl)]hafnium dichloride.

As a result, 23.0 g of an ethylene-1-octene copolymer was obtained. The resultant polymer contained 1-octene in an amount of 10.0 mol %, and had [η]=6.55 dl/g.

Example 8

Ethylene/1-octene copolymerization using [bis(4-methoxyphenyl)methylene($\eta^5$-cyclopentadienyl)($\eta^5$-tetramethyloctahydrodibenzofluorenyl)]hafnium dichloride Polymerization was performed in the same manner as in Example 1, except that 0.00005 mmol of [bis(4-N-morpholinylphenyl)methylene($\eta^5$-cyclopentadienyl)($\eta^5$-octamethyloctahydrodibenzofluorenyl)]hafnium dichloride was replaced by 0.00005 mmol of [bis(4-methoxyphenyl)methylene($\eta^5$-cyclopentadienyl)($\eta^5$-tetramethyloctahydrodibenzofluorenyl)]hafnium dichloride.

As a result, 10.0 g of an ethylene-1-octene copolymer was obtained. The resultant polymer contained 1-octene in an amount of 11.0 mol %, and had [η]=6.27 dl/g.

Example 9

Ethylene/1-octene copolymerization using [bis(3,4-dimethoxyphenyl)methylene($\eta^5$-cyclopentadienyl)($\eta^5$-2,7-dimethyl-3,6-di-t-butylfluorenyl)]hafnium dichloride Polymerization was performed in the same manner as in Example 1, except that 0.00005 mmol of [bis(4-N-morpholinylphenyl)methylene($\eta^5$-cyclopentadienyl)($\eta^5$-octamethyloctahydrodibenzofluorenyl)]hafnium dichloride was replaced by 0.00005 mmol of [bis(3,4-dimethoxyphenyl)methylene($\eta^5$-cyclopentadienyl)($\eta^5$-2,7-dimethyl-3,6-di-t-butylfluorenyl)]hafnium dichloride.

As a result, 4.8 g of an ethylene-1-octene copolymer was obtained. The resultant polymer contained 1-octene in an amount of 12.1 mol %, and had [η]=6.59 dl/g.

Example 10

Ethylene/1-octene copolymerization using [bis(4-methoxyphenyl)methylene($\eta^5$-cyclopentadienyl)($\eta^5$-2,7-dimethyl-3,6-di-t-butylfluorenyl)]hafnium dichloride Polymerization was performed in the same manner as in Example 1, except that 0.00005 mmol of [bis(4-N-morpholinylphenyl)methylene($\eta^5$-cyclopentadienyl)($\eta^5$-octamethyloctahydrodibenzofluorenyl)]hafnium dichloride was replaced by 0.00005 mmol of [bis(4-methoxyphenyl)methylene($\eta^5$-cyclopentadienyl)($\eta^5$-2,7-dimethyl-3,6-di-t-butylfluorenyl)]hafnium dichloride.

As a result, 10.2 g of an ethylene-1-octene copolymer was obtained. The resultant polymer contained 1-octene in an amount of 11.4 mol %, and had [η]=5.37 dl/g.

Example 11

Ethylene/1-octene copolymerization using [bis(4-methoxyphenyl)methylene($\eta^5$-cyclopentadienyl)($\eta^5$-2,3,6,7-tetramethylfluorenyl)]hafnium dichloride Polymerization was performed in the same manner as in Example 1, except that 0.00005 mmol of [bis(4-N-morpholinylphenyl)methylene($\eta^5$-cyclopentadienyl)($\eta^5$-octamethyloctahydrodibenzofluorenyl)]hafnium dichloride was replaced by 0.00005 mmol of [bis(4-methoxyphenyl)methylene($\eta^5$-cyclopentadienyl)($\eta^5$-2,3,6,7-tetramethylfluorenyl)]hafnium dichloride.

As a result, 8.3 g of an ethylene-1-octene copolymer was obtained. The resultant polymer contained 1-octene in an amount of 10.6 mol %, and had [η]=5.70 dl/g.

Example 12

Ethylene/1-octene copolymerization using [bis(4-N-morpholinylphenyl)methylene($\eta^5$-cyclopentadienyl)($\eta^5$-2,7-di-t-butylfluorenyl)]hafnium dichloride Polymerization was performed in the same manner as in Example 1, except that 0.00005 mmol of [bis(4-N-morpholinylphenyl)methylene($\eta^5$-cyclopentadienyl)($\eta^5$-octamethyl-octahydrodibenzofluorenyl)]hafnium dichloride was replaced by 0.00050 mmol of [bis(4-N-morpholinylphenyl)methylene($\eta^5$-cyclopentadienyl)($\eta^5$-2,7-di-t-butylfluorenyl)]hafnium dichloride, and that N,N-dimethylaniliniumtetrakis(pentafluorophenyl)borate was used in an amount of 0.00200 mmol.

As a result, 15.6 g of an ethylene-1-octene copolymer was obtained. The resultant polymer contained 1-octene in an amount of 13.0 mol %, and had [η]=4.83 dl/g.

Comparative Example 2

Synthesis using [bis(4-methylphenyl)methylene($\eta^5$-cyclopentadienyl)($\eta^5$-2,7-di-t-butylfluorenyl)]hafnium dichloride Polymerization was performed in the same manner as in Example 1, except that 0.00005 mmol of [bis(4-N-morpholinylphenyl)methylene($\eta^5$-cyclopentadienyl)($\eta^5$-octamethyl-octahydrodibenzofluorenyl)]hafnium dichloride was replaced by 0.00005 mmol of [bis(4-methylphenyl)methylene($\eta^5$-cyclopentadienyl)($\eta^5$-2,7-di-t-butylfluorenyl)]hafnium dichloride.

As a result, 7.9 g of an ethylene-1-octene copolymer was obtained. The resultant polymer contained 1-octene in an amount of 14.0 mol %, and had [η]=3.86 dl/g.

Example 13

Ethylene/1-octene copolymerization using [bis(3,4-dimethoxyphenyl)methylene($\eta^5$-cyclopentadienyl)($\eta^5$-2,7-dimethylfluorenyl)]hafnium dichloride Polymerization was performed in the same manner as in Example 1, except that 0.00005 mmol of [bis(4-N-morpholinylphenyl)methylene($\eta^5$-cyclopentadienyl)($\eta^5$-octamethyl-octahydrodibenzofluorenyl)]hafnium dichloride was replaced by 0.00005 mmol of [bis(3,4-dimethoxyphenyl)methylene($\eta^5$-cyclopentadienyl)($\eta^5$-2,7-dimethylfluorenyl)]hafnium dichloride.

As a result, 2.6 g of an ethylene-1-octene copolymer was obtained. The resultant polymer contained 1-octene in an amount of 12.6 mol %, and had [η]=5.59 dl/g.

Example 14

Ethylene/1-octene copolymerization using [bis(4-methoxyphenyl)methylene($\eta^5$-cyclopentadienyl)($\eta^5$-2,7-dimethylfluorenyl)]hafnium dichloride Polymerization was performed in the same manner as in Example 1, except that 0.00005 mmol of [bis(4-N-morpholinylphenyl)methylene($\eta^5$-cyclopentadienyl)($\eta^5$-octamethyl-octahydrodibenzofluorenyl)]hafnium dichloride was replaced by 0.00005 mmol of [bis(4-methoxyphenyl)methylene($\eta^5$-cyclopentadienyl)($\eta^5$-2,7-dimethylfluorenyl)]hafnium dichloride.

As a result, 7.0 g of an ethylene-1-octene copolymer was obtained. The resultant polymer contained 1-octene in an amount of 12.0 mol %, and had [η]=5.24 dl/g.

Comparative Example 3

Ethylene/1-octene copolymerization using [bis(4-methylphenyl)methylene($\eta^5$-cyclopentadienyl)($\eta^5$-2,7-dimethylfluorenyl)]hafnium dichloride Polymerization was performed in the same manner as in Example 1, except that 0.00005 mmol of [bis(4-N-morpholinylphenyl)methylene($\eta^5$-cyclopentadienyl)($\eta^5$-octamethyl-octahydrodibenzofluorenyl)]hafnium dichloride was replaced by 0.00005 mmol of [bis(4-methylphenyl)methylene($\eta^5$-cyclopentadienyl)($\eta^5$-2,7-dimethylfluorenyl)]hafnium dichloride.

As a result, 4.0 g of an ethylene-1-octene copolymer was obtained. The resultant polymer contained 1-octene in an amount of 11.8 mol %, and had [η]=4.32 dl/g.

Example 15

Ethylene/1-octene copolymerization using [bis[4-(dimethylamino)phenyl]methylene($\eta^5$-cyclopentadienyl)($\eta^5$-3,6-di-t-butylfluorenyl)]hafnium dichloride Polymerization was performed in the same manner as in Example 1, except that 0.00005 mmol of [bis(4-N-morpholinylphenyl)methylene($\eta^5$-cyclopentadienyl)($\eta^5$-octamethyl-octahydrodibenzofluorenyl)]hafnium dichloride was replaced by 0.00004 mmol of [bis[4-(dimethylamino)phenyl]methylene($\eta^5$-cyclopentadienyl)($\eta^5$-3,6-di-t-butylfluorenyl)]hafnium dichloride, and that N,N-dimethylaniliniumtetrakis(pentafluorophenyl)borate was used in an amount of 0.00016 mmol.

As a result, 13.3 g of an ethylene-1-octene copolymer was obtained. The resultant polymer contained 1-octene in an amount of 11.9 mol %, and had [η]=4.49 dl/g.

Comparative Example 4

Ethylene/1-octene copolymerization using [bis(4-methylphenyl)methylene($\eta^5$-cyclopentadienyl)($\eta^5$-3,6-di-t-butylfluorenyl)]hafnium dichloride Polymerization was performed in the same manner as in Example 1, except that 0.00005 mmol of [bis(4-N-morpholinylphenyl)methylene($\eta^5$-cyclopentadienyl)($\eta^5$-octamethyl-octahydrodibenzofluorenyl)]hafnium dichloride was replaced by 0.00005 mmol of [bis(4-methylphenyl)methylene($\eta^5$-cyclopentadienyl)($\eta^5$-3,6-di-t-butylfluorenyl)]hafnium dichloride.

As a result, 3.6 g of an ethylene-1-octene copolymer was obtained. The resultant polymer contained 1-octene in an amount of 13.2 mol %, and had [η]=3.92 dl/g.

Comparative Example 5

Ethylene/1-octene copolymerization using [bis(4-chlorophenyl)methylene($\eta^5$-cyclopentadienyl)($\eta^5$-3,6-di-t-butylfluorenyl)]hafnium dichloride Polymerization was performed in the same manner as in Example 1, except that 0.00005 mmol of [bis(4-N-morpholinylphenyl)methylene($\eta^5$-cyclopentadienyl)($\eta^5$-octamethyl-octahydrodibenzofluorenyl)]hafnium dichloride was replaced by 0.00010 mmol of [bis(4-chlorophenyl)methylene($\eta^5$-cyclopentadienyl)($\eta^5$-3,6-di-t-butylfluorenyl)]hafnium dichloride, and that N,N-dimethylaniliniumtetrakis(pentafluorophenyl)borate was used in an amount of 0.00040 mmol.

As a result, 3.5 g of an ethylene-1-octene copolymer was obtained. The resultant polymer contained 1-octene in an amount of 15.2 mol %, and had [η]=3.23 dl/g.

Comparative Example 6

Ethylene/1-octene copolymerization using [diphenylmethylene($\eta^5$-cyclopentadienyl)($\eta^5$-3,6-di-t-butylfluorenyl)]hafnium dichloride Polymerization was performed in the same manner as in Example 1, except that 0.00005 mmol of [bis(4-N-morpholinylphenyl)methylene($\eta^5$-cyclopentadienyl)($\eta^5$-octamethyloctahydrodibenzofluorenyl)]hafnium dichloride was replaced by 0.00003 mmol of [diphenylmethylene($\eta^5$-cyclopentadienyl)($\eta^5$-3,6-di-t-butylfluorenyl)]hafnium dichloride, and that N,N-dimethylaniliniumtetrakis(pentafluorophenyl)borate was used in an amount of 0.00012 mmol.

As a result, 2.2 g of an ethylene-1-octene copolymer was obtained. The resultant polymer contained 1-octene in an amount of 13.8 mol %, and had [$\eta$]=3.74 dl/g.

Example 16

Ethylene/1-octene copolymerization using [bis[4-(dimethylamino)phenyl]methylene($\eta^5$-cyclopentadienyl)($\eta^5$-octamethyloctahydrodibenzofluorenyl)] zirconium dichloride To a stainless autoclave with an inner volume of 2 L sufficiently nitrogen-purged, 300 ml of heptane, and 700 ml of 1-octene were introduced, and the temperature of the system was elevated to 147° C. Thereafter, ethylene was fed so that the total pressure became 3 MPa-G. Subsequently, 0.3 mmol of triisobutylaluminum, 0.00010 mmol of [bis[4-(dimethylamino)phenyl]methylene($\eta^5$-cyclopentadienyl)($\eta^5$-octamethyloctahydrodibenzofluorenyl)]zirconium dichloride, and 0.050 mmol of MMAO were injected with nitrogen, and the number of stirring rotations was set at 250 rpm. Thereby, polymerization was initiated. Thereafter, ethylene alone was continuously fed to keep the total pressure at 3 MPa-G. Polymerization was performed for 10 minutes at 150° C. A small amount of ethanol was added into the system to terminate the polymerization, and thereafter unreacted ethylene was purged. The resultant polymer solution was poured into an excess amount of methanol to precipitate out a polymer. The polymer was collected by filtration, and dried under reduced pressure at 120° C. overnight.

As a result, 30.9 g of an ethylene-1-octene copolymer was obtained. The resultant polymer contained 1-octene in an amount of 12.5 mol %, and had [$\eta$]=2.72 dl/g.

Comparative Example 7

Ethylene/1-octene copolymerization using [bis(4-methylphenyl)methylene($\eta^5$-cyclopentadienyl)($\eta^5$-octamethyloctahydrodibenzofluorenyl)]zirconium dichloride Polymerization was performed in the same manner as in Example 16, except that 0.00010 mmol of [bis[4-(dimethylamino)phenyl]methylene($\eta^5$-cyclopentadienyl)($\eta^5$-octamethyloctahydrodibenzofluorenyl)]zirconium dichloride was replaced by 0.00010 mmol of [bis(4-methylphenyl)methylene($\eta^5$-cyclopentadienyl)($\eta^5$-octamethyloctahydrodibenzofluorenyl)]zirconium dichloride.

As a result, 29.1 g of an ethylene-1-octene copolymer was obtained. The resultant polymer contained 1-octene in an amount of 12.6 mol %, and had [$\eta$]=2.65 dl/g.

Example 17

Ethylene/1-octene copolymerization using [bis(4-N-morpholinylphenyl)methylene($\eta^5$-cyclopentadienyl)($\eta^5$-octamethyloctahydrodibenzofluorenyl)]hafnium dichloride To a stainless autoclave with an inner volume of 2 L sufficiently nitrogen-purged, 850 ml of heptane, and 150 ml of 1-octene were introduced, and the temperature of the system was elevated to 147° C., and thereafter, 500 ml of hydrogen was introduced, and ethylene was fed so that the total pressure became 3 MPa-G. Subsequently, 0.3 mmol of triisobutylaluminum, 0.00015 mmol of [bis(4-N-morpholinylphenyl)methylene($\eta^5$-cyclopentadienyl)($\eta^5$-octamethyloctahydrodibenzofluorenyl)]hafnium dichloride, and 0.00060 mmol of N,N-dimethylaniliniumtetrakis(pentafluorophenyl)borate were injected with nitrogen, and the number of stirring rotations was set at 250 rpm. Thereby, polymerization was initiated. Thereafter, ethylene alone was continuously fed to keep the total pressure at 3 MPa-G. Polymerization was performed for 10 minutes at 150° C. A small amount of ethanol was added into the system to terminate the polymerization, and thereafter unreacted ethylene was purged. The resultant polymer solution was poured into an excess amount of methanol to precipitate out a polymer. The polymer was collected by filtration, and dried under reduced pressure at 120° C. overnight.

As a result, 9.7 g of an ethylene-1-octene copolymer was obtained. The resultant polymer contained 1-octene in an amount of 11.2 mol %, and had [$\eta$]=1.66 dl/g, MFR$_2$=1.69 g/10 min, MFR$_{10}$=10.5 g/10 min, and a density of 881 kg/m$^3$. The amount of the molecular chain double bonds (number/1000 carbons) was as follows: vinyl=0.1, vinylidene=0.1, di-substituted olefin=0.1, and tri-substituted olefin=0.1.

Example 18

Ethylene/1-octene copolymerization using [bis[4-(dimethylamino)phenyl]methylene($\eta^5$-cyclopentadienyl)($\eta^5$-octamethyloctahydrodibenzofluorenyl)] hafnium dichloride Polymerization was performed in the same manner as in Example 17, except that hydrogen was introduced in an amount of 400 ml, that 0.00015 mmol of [bis(4-N-morpholinylphenyl)methylene($\eta^5$-cyclopentadienyl)($\eta^5$-octamethyloctahydrodibenzofluorenyl)]hafnium dichloride was replaced by 0.00005 mmol of [bis[4-(dimethylamino)phenyl]methylene($\eta^5$-cyclopentadienyl)($\eta^5$-octamethyloctahydrodibenzofluorenyl)]hafnium dichloride, and that N,N-dimethylaniliniumtetrakis(pentafluorophenyl)borate was used in an amount of 0.00020 mmol.

As a result, 27.0 g of an ethylene-1-octene copolymer was obtained. The resultant polymer contained 1-octene in an amount of 11.8 mol %, and had [$\eta$]=1.76 dl/g, MFR$_2$=1.40 g/10 min, MFR$_{10}$=8.7 g/10 min, and a density of 877 kg/m$^3$. The amount of the molecular chain double bonds (number/1000 carbons) was as follows: vinyl<0.1 (below detectable lower limit), vinylidene<0.1 (below detectable lower limit), di-substituted olefin<0.1 (below detectable lower limit), and tri-substituted olefin=0.1.

Example 19

Ethylene/1-octene copolymerization using [bis(3-N-morpholinylphenyl)methylene($\eta^5$-cyclopentadienyl)($\eta^5$-octamethyloctahydrodibenzofluorenyl)]hafnium dichloride Polymerization was performed in the same manner as in Example 17, except that hydrogen was introduced in an amount of 400 ml, that 0.00015 mmol of [bis(4-N-morpholinylphenyl)methylene($\eta^5$-cyclopentadienyl)($\eta^5$-octamethyloctahydrodibenzofluorenyl)]hafnium dichloride was replaced by 0.00020 mmol of [bis(3-N-morpholinylphenyl)methylene($\eta^5$-cyclopentadienyl)($\eta^5$-octamethyloctahydrodibenzofluorenyl)]hafnium dichloride, and that N,N-dimethylaniliniumtetrakis(pentafluorophenyl)borate was used in an amount of 0.00080 mmol.

As a result, 16.8 g of an ethylene-1-octene copolymer was obtained. The resultant polymer contained 1-octene in an amount of 12.6 mol %, and had $[\eta]$=1.90 dl/g, $MFR_2$=0.87 g/10 min, $MFR_{10}$=5.4 g/10 min, and a density of 875 kg/m$^3$.

Example 20

Ethylene/1-octene copolymerization using [bis(4-methoxy-3-methylphenyl)methylene($\eta^5$-cyclopentadienyl)($\eta^5$-octamethyloctahydrodibenzofluorenyl)]hafnium dichloride Polymerization was performed in the same manner as in Example 17, except that hydrogen was introduced in an amount of 400 ml, that 0.00015 mmol of [bis(4-N-morpholinylphenyl)methylene($\eta^5$-cyclopentadienyl)($\eta^5$-octamethyloctahydrodibenzofluorenyl)]hafnium dichloride was replaced by 0.00006 mmol of [bis(4-methoxy-3-methylphenyl)methylene($\eta^5$-cyclopentadienyl)($\eta^5$-octamethyloctahydrodibenzofluorenyl)]hafnium dichloride, and that N,N-dimethylaniliniumtetrakis(pentafluorophenyl)borate was used in an amount of 0.00024 mmol.

As a result, 18.7 g of an ethylene-1-octene copolymer was obtained. The resultant polymer contained 1-octene in an amount of 12.6 mol %, and had $[\eta]$=1.83 dl/g, $MFR_2$=1.10 g/10 min, $MFR_{10}$=6.8 g/10 min, and a density of 875 kg/m$^3$.

Example 21

Ethylene/1-octene copolymerization using [bis(4-methoxy-3,5-dimethylphenyl)methylene($\eta^5$-cyclopentadienyl)($\eta^5$-octamethyloctahydrodibenzofluorenyl)]hafnium dichloride Polymerization was performed in the same manner as in Example 17, except that hydrogen was introduced in an amount of 400 ml, that 0.00015 mmol of [bis(4-N-morpholinylphenyl)methylene($\eta^5$-cyclopentadienyl)($\eta^5$-octamethyloctahydrodibenzofluorenyl)]hafnium dichloride was replaced by 0.00006 mmol of [bis(4-methoxy-3,5-dimethylphenyl)methylene($\eta^5$-cyclopentadienyl)($\eta^5$-octamethyloctahydrodibenzofluorenyl)]hafnium dichloride, and that N,N-dimethylaniliniumtetrakis(pentafluorophenyl)borate was used in an amount of 0.00024 mmol.

As a result, 19.3 g of an ethylene-1-octene copolymer was obtained. The resultant polymer contained 1-octene in an amount of 13.4 mol %, and had $[\eta]$=1.78 dl/g, $MFR_2$=1.23 g/10 min, $MFR_{10}$=7.6 g/10 min, and a density of 873 kg/m$^3$.

Example 22

Ethylene/1-octene copolymerization using [bis(4-methoxyphenyl)methylene($\eta^5$-cyclopentadienyl)($\eta^5$-octamethyloctahydrodibenzofluorenyl)]hafnium dichloride Polymerization was performed in the same manner as in Example 17, except that hydrogen was introduced in an amount of 400 ml, that 0.00015 mmol of [bis(4-N-morpholinylphenyl)methylene($\eta^5$-cyclopentadienyl)($\eta^5$-octamethyloctahydrodibenzofluorenyl)]hafnium dichloride was replaced by 0.00006 mmol of [bis(4-methoxyphenyl)methylene($\eta^5$-cyclopentadienyl)($\eta^5$-octamethyloctahydrodibenzofluorenyl)]hafnium dichloride, and that N,N-dimethylaniliniumtetrakis(pentafluorophenyl)borate was used in an amount of 0.00024 mmol.

As a result, 25.5 g of an ethylene-1-octene copolymer was obtained. The resultant polymer contained 1-octene in an amount of 12.7 mol %, and had $[\eta]$=1.71 dl/g, $MFR_2$=1.45 g/10 min, $MFR_{10}$=9.3 g/10 min, and a density of 874 kg/m$^3$.

Comparative Example 8

Ethylene/1-octene copolymerization using [bis(3-chlorophenyl)methylene($\eta^5$-cyclopentadienyl)($\eta^5$-octamethyloctahydrodibenzofluorenyl)]hafnium dichloride Polymerization was performed in the same manner as in Example 17, except that hydrogen was introduced in an amount of 400 ml, that 0.00015 mmol of [bis(4-N-morpholinylphenyl)methylene($\eta^5$-cyclopentadienyl)($\eta^5$-octamethyloctahydrodibenzofluorenyl)]hafnium dichloride was replaced by 0.00010 mmol of [bis(3-chlorophenyl)methylene($\eta^5$-cyclopentadienyl)($\eta^5$-octamethyloctahydrodibenzofluorenyl)]hafnium dichloride, and that N,N-dimethylaniliniumtetrakis(pentafluorophenyl)borate was used in an amount of 0.00040 mmol.

As a result, 14.0 g of an ethylene-1-octene copolymer was obtained. The resultant polymer contained 1-octene in an amount of 14.8 mol %, and had $[\eta]$=1.74 dl/g, $MFR_2$=1.38 g/10 min, $MFR_{10}$=9.4 g/10 min, and a density of 866 kg/m$^3$.

Example 23

Ethylene/1-octene copolymerization using [bis[4-(dimethylamino)phenyl]methylene($\eta^5$-cyclopentadienyl)($\eta^5$-tetramethyloctahydrodibenzofluorenyl)]hafnium dichloride Polymerization was performed in the same manner as in Example 17, except that 0.00015 mmol of [bis(4-N-morpholinylphenyl)methylene($\eta^5$-cyclopentadienyl)($\eta^5$-octamethyloctahydrodibenzofluorenyl)]hafnium dichloride was replaced by 0.00003 mmol of [bis[4-(dimethylamino)phenyl]methylene($\eta^5$-cyclopentadienyl)($\eta^5$-tetramethyloctahydrodibenzofluorenyl)]hafnium dichloride, and that N,N-dimethylaniliniumtetrakis(pentafluorophenyl)borate was used in an amount of 0.00012 mmol.

As a result, 11.0 g of an ethylene-1-octene copolymer was obtained. The resultant polymer contained 1-octene in an amount of 10.0 mol %, and had $[\eta]$=1.90 dl/g, $MFR_2$=0.93 g/10 min, $MFR_{10}$=5.6 g/10 min, and a density of 884 kg/m$^3$. The amount of molecular chains double bond (number/1000 carbons) was as follows: vinyl<0.1 (below detectable lower

Example 24

Ethylene/1-octene copolymerization using [bis(4-methoxyphenyl)methylene($\eta^5$-cyclopentadienyl)($\eta^5$-tetramethyloctahydrodibenzofluorenyl)]hafnium dichloride Polymerization was performed in the same manner as in Example 17, except that 0.00015 mmol of [bis(4-N-morpholinylphenyl)methylene($\eta^5$-cyclopentadienyl)($\eta^5$-octamethyloctahydrodibenzofluorenyl)]hafnium dichloride was replaced by 0.00005 mmol of [bis(4-methoxyphenyl)methylene($\eta^5$-cyclopentadienyl)($\eta^5$-tetramethyloctahydrodibenzofluorenyl)]hafnium dichloride, and that N,N-dimethylaniliniumtetrakis(pentafluorophenyl)borate was used in an amount of 0.00020 mmol.

As a result, 22.8 g of an ethylene-1-octene copolymer was obtained. The resultant polymer contained 1-octene in an amount of 10.6 mol %, and had $[\eta]=1.80$ dl/g, $MFR_2=1.16$ g/10 min, $MFR_{10}=7.1$ g/10 min, and a density of 881 kg/m$^3$.

Example 25

Ethylene/1-octene copolymerization using [bis(3,4-dimethoxyphenyl)methylene($\eta^5$-cyclopentadienyl)($\eta^5$-2,7-dimethyl-3,6-di-t-butylfluorenyl)]hafnium dichloride Polymerization was performed in the same manner as in Example 17, except that 0.00015 mmol of [bis(4-N-morpholinylphenyl)methylene($\eta^5$-cyclopentadienyl)($\eta^5$-octamethyloctahydrodibenzofluorenyl)]hafnium dichloride was replaced by 0.00020 mmol of [bis(3,4-dimethoxyphenyl)methylene($\eta^5$-cyclopentadienyl)($\eta^5$-2,7-dimethyl-3,6-di-t-butylfluorenyl)]hafnium dichloride, and that N,N-dimethylaniliniumtetrakis(pentafluorophenyl)borate was used in an amount of 0.00080 mmol.

As a result, 17.2 g of an ethylene-1-octene copolymer was obtained. The resultant polymer contained 1-octene in an amount of 12.4 mol %, and had $[\eta]=1.88$ dl/g, $MFR_2=0.80$ g/10 min, $MFR_{10}=4.8$ g/10 min, and a density of 876 kg/m$^3$.

Example 26

Ethylene/1-octene copolymerization using [bis(4-methoxyphenyl)methylene($\eta^5$-cyclopentadienyl)($\eta^5$-2,7-dimethyl-3,6-di-t-butylfluorenyl)]hafnium dichloride Polymerization was performed in the same manner as in Example 17, except that 0.00015 mmol of [bis(4-N-morpholinylphenyl)methylene($\eta^5$-cyclopentadienyl)($\eta^5$-octamethyloctahydrodibenzofluorenyl)]hafnium dichloride was replaced by 0.00003 mmol of [bis(4-methoxyphenyl)methylene($\eta^5$-cyclopentadienyl)($\eta^5$-2,7-dimethyl-3,6-di-t-butylfluorenyl)]hafnium dichloride, and that N,N-dimethylaniliniumtetrakis(pentafluorophenyl)borate was used in an amount of 0.00012 mmol.

As a result, 12.0 g of an ethylene-1-octene copolymer was obtained. The resultant polymer contained 1-octene in an amount of 11.4 mol %, and had $[\eta]=1.92$ dl/g, $MFR_2=0.87$ g/10 min, $MFR_{10}=5.4$ g/10 min, and a density of 879 kg/m$^3$.

Example 27

Ethylene/1-octene copolymerization using [bis(4-methoxyphenyl)methylene($\eta^5$-cyclopentadienyl)($\eta^5$-2,3,6,7-tetramethylfluorenyl)]hafnium dichloride Polymerization was performed in the same manner as in Example 17, except that 0.00015 mmol of [bis(4-N-morpholinylphenyl)methylene($\eta^5$-cyclopentadienyl)($\eta^5$-octamethyloctahydrodibenzofluorenyl)]hafnium dichloride was replaced by 0.00005 mmol of [bis(4-methoxyphenyl)methylene($\eta^5$-cyclopentadienyl)($\eta^5$-2,3,6,7-tetramethylfluorenyl)]hafnium dichloride, and that N,N-dimethylaniliniumtetrakis(pentafluorophenyl)borate was used in an amount of 0.00020 mmol.

As a result, 17.3 g of an ethylene-1-octene copolymer was obtained. The resultant polymer contained 1-octene in an amount of 10.5 mol %, and had $[\eta]=1.79$ dl/g, $MFR_2=1.20$ g/10 min, $MFR_{10}=7.2$ g/10 min, and a density of 881 kg/m$^3$. The amount of the molecular chain double bonds (number/1000 carbons) was as follows: vinyl<0.1 (below detectable lower limit), vinylidene<0.1 (below detectable lower limit), di-substituted olefin<0.1 (below detectable lower limit), and tri-substituted olefin=0.1.

Example 28

Ethylene/1-octene copolymerization using [bis(4-N-morpholinylphenyl)methylene($\eta^5$-cyclopentadienyl)($\eta^5$-2,7-di-t-butylfluorenyl)]hafnium dichloride Polymerization was performed in the same manner as in Example 17, except that hydrogen was introduced in an amount of 400 ml, that 0.00015 mmol of [bis(4-N-morpholinylphenyl)methylene($\eta^5$-cyclopentadienyl) ($\eta^5$-octamethyloctahydrodibenzofluorenyl)]hafnium dichloride mmol was replaced by 0.00040 mmol of [bis(4-N-morpholinylphenyl)methylene($\eta^5$-cyclopentadienyl)($\eta^5$-2,7-di-t-butylfluorenyl)]hafnium dichloride, and that N,N-dimethylaniliniumtetrakis(pentafluorophenyl)borate was used in an amount of 0.00160 mmol.

As a result, 18.5 g of an ethylene-1-octene copolymer was obtained. The resultant polymer contained 1-octene in an amount of 13.0 mol %, and had $[\eta]=2.04$ dl/g, $MFR_2=0.64$ g/10 min, $MFR_{10}=3.8$ g/10 min, and a density of 874 kg/m$^3$.

Comparative Example 9

Ethylene/1-octene copolymerization using [bis(4-methylphenyl)methylene($\eta^5$-cyclopentadienyl)($\eta^5$-2,7-di-t-butylfluorenyl)]hafnium dichloride Polymerization was performed in the same manner as in Example 17, except that hydrogen was introduced in an amount of 400 ml, that 0.00015 mmol of [bis(4-N-morpholinylphenyl)methylene($\eta^5$-cyclopentadienyl)($\eta^5$-octamethyloctahydrodibenzofluorenyl)]hafnium dichloride was replaced by 0.00005 mmol of [bis(4-methylphenyl)methylene($\eta^5$-cyclopentadienyl)($\eta^5$-2,7-di-t-butylfluorenyl)]hafnium dichloride, and that N,N-dimethylaniliniumtetrakis(pentafluorophenyl)borate was used in an amount of 0.00020 mmol.

As a result, 14.4 g of an ethylene-1-octene copolymer was obtained. The resultant polymer contained 1-octene in an amount of 13.5 mol %, and had $[\eta]=1.84$ dl/g, $MFR_2=1.24$ g/10 min, $MFR_{10}=8.9$ g/10 min, and a density of 870 kg/m$^3$.

Example 29

Ethylene/1-octene copolymerization using [bis(3,4-dimethoxyphenyl)methylene($\eta^5$-cyclopentadienyl)($\eta^5$-2,7-dimethylfluorenyl)]hafnium dichloride Polymerization was performed in the same manner as in Example 17, except that 0.00015 mmol of [bis(4-N-morpholinylphenyl)methylene($\eta^5$-cyclopentadienyl)($\eta^5$-octamethyloctahydrodibenzofluorenyl)]hafnium dichloride was replaced by 0.00030 mmol of [bis(3,4-dimethoxyphenyl)methylene($\eta^5$-cyclopentadienyl)($\eta^5$-2,7-dimethylfluorenyl)]hafnium dichloride, and that N,N-dimethylaniliniumtetrakis(pentafluorophenyl)borate was used in an amount of 0.00120 mmol.

As a result, 12.1 g of an ethylene-1-octene copolymer was obtained. The resultant polymer contained 1-octene in an amount of 13.2 mol %, and had [η]=1.86 dl/g, MFR$_2$=0.88 g/10 min, MFR$_{10}$=5.2 g/10 min, and a density of 874 kg/m$^3$.

Example 30

Ethylene/1-octene copolymerization using [bis(4-methoxyphenyl)methylene($\eta^5$-cyclopentadienyl)($\eta^5$-2,7-dimethylfluorenyl)]hafnium dichloride Polymerization was performed in the same manner as in Example 17, except that hydrogen was introduced in an amount of 400 ml, that 0.00015 mmol of [bis(4-N-morpholinylphenyl)methylene($\eta^5$-cyclopentadienyl)($\eta^5$-octamethyloctahydrodibenzofluorenyl)]hafnium dichloride was replaced by 0.00010 mmol of [bis(4-methoxyphenyl)methylene($\eta^5$-cyclopentadienyl)($\eta^5$-2,7-dimethylfluorenyl)]hafnium dichloride, and that N,N-dimethylaniliniumtetrakis(pentafluorophenyl)borate was used in an amount of 0.00040 mmol.

As a result, 24.0 g of an ethylene-1-octene copolymer was obtained. The resultant polymer contained 1-octene in an amount of 11.4 mol %, and had [η]=1.85 dl/g, MFR$_2$=1.24 g/10 min, MFR$_{10}$=7.4 g/10 min, and a density of 879 kg/m$^3$.

Comparative Example 10

Ethylene/1-octene copolymerization using [bis(4-methylphenyl)methylene($\eta^5$-cyclopentadienyl)($\eta^5$-2,7-dimethylfluorenyl)]hafnium dichloride Polymerization was performed in the same manner as in Example 17, except that hydrogen was introduced in an amount of 400 ml, that 0.00015 mmol of [bis(4-N-morpholinylphenyl)methylene($\eta^5$-cyclopentadienyl)($\eta^5$-octamethyloctahydrodibenzofluorenyl)]hafnium dichloride was replaced by 0.00008 mmol of [bis(4-methylphenyl)methylene($\eta^5$-cyclopentadienyl)($\eta^5$-2,7-dimethylfluorenyl)]hafnium dichloride, and that N,N-dimethylaniliniumtetrakis(pentafluorophenyl)borate was used in an amount of 0.00032 mmol.

As a result, 16.9 g of an ethylene-1-octene copolymer was obtained. The resultant polymer contained 1-octene in an amount of 11.7 mol %, and had [η]=1.89 dl/g, MFR$_2$=0.96 g/10 min, MFR$_{10}$=6.2 g/10 min, and a density of 877 kg/m$^3$.

Example 31

Ethylene/1-octene copolymerization using [bis[4-(dimethylamino)phenyl]methylene($\eta^5$-cyclopentadienyl)($\eta^5$-3,6-di-t-butylfluorenyl)]hafnium dichloride Polymerization was performed in the same manner as in Example 17, except that hydrogen was introduced in an amount of 400 ml, that 0.00015 mmol of [bis(4-N-morpholinylphenyl)methylene($\eta^5$-cyclopentadienyl)($\eta^5$-octamethyloctahydrodibenzofluorenyl)]hafnium dichloride was replaced by 0.00003 mmol of [bis[4-(dimethylamino)phenyl]methylene($\eta^5$-cyclopentadienyl)($\eta^5$-3,6-di-t-butylfluorenyl)]hafnium dichloride, and that N,N-dimethylaniliniumtetrakis(pentafluorophenyl)borate was used in an amount of 0.00012 mmol.

As a result, 16.3 g of an ethylene-1-octene copolymer was obtained. The resultant polymer contained 1-octene in an amount of 12.0 mol %, and had [η]=1.86 dl/g, MFR$_2$=0.98 g/10 min, MFR$_{10}$=6.1 g/10 min, and a density of 876 kg/m$^3$.

Comparative Example 11

Ethylene/1-octene copolymerization using [bis(4-methylphenyl)methylene($\eta^5$-cyclopentadienyl)($\eta^5$-3,6-di-t-butylfluorenyl)]hafnium dichloride Polymerization was performed in the same manner as in Example 17, except that hydrogen was introduced in an amount of 400 ml, that 0.00015 mmol of [bis(4-N-morpholinylphenyl)methylene($\eta^5$-cyclopentadienyl)($\eta^5$-octamethyloctahydrodibenzofluorenyl)]hafnium dichloride was replaced by 0.00010 mmol of [bis(4-methylphenyl)methylene($\eta^5$-cyclopentadienyl)($\eta^5$-3,6-di-t-butylfluorenyl)]hafnium dichloride, and that N,N-dimethylaniliniumtetrakis(pentafluorophenyl)borate was used in an amount of 0.00040 mmol.

As a result, 21.3 g of an ethylene-1-octene copolymer was obtained. The resultant polymer contained 1-octene in an amount of 13.1 mol %, and had [η]=1.58 dl/g, MFR$_2$=1.95 g/10 min, MFR$_{10}$=13.2 g/10 min, and a density of 873 kg/m$^3$.

Comparative Example 12

Ethylene/1-octene copolymerization using [bis(4-chlorophenyl)methylene($\eta^5$-cyclopentadienyl)($\eta^5$-3,6-di-t-butylfluorenyl)]hafnium dichloride Polymerization was performed in the same manner as in Example 17, except that hydrogen was introduced in an amount of 400 ml, that 0.00015 mmol of [bis(4-N-morpholinylphenyl)methylene($\eta^5$-cyclopentadienyl)($\eta^5$-octamethyloctahydrodibenzofluorenyl)]hafnium dichloride was replaced by 0.00020 mmol of [bis(4-chlorophenyl)methylene($\eta^5$-cyclopentadienyl)($\eta^5$-3,6-di-t-butylfluorenyl)]hafnium dichloride, and that N,N-dimethylaniliniumtetrakis(pentafluorophenyl)borate was used in an amount of 0.00080 mmol.

As a result, 14.8 g of an ethylene-1-octene copolymer was obtained. The resultant polymer contained 1-octene in an amount of 15.2 mol %, and had [η]=1.81 dl/g, MFR$_2$=1.13 g/10 min, MFR$_{10}$=8.1 g/10 min, and a density of 866 kg/m$^3$.

Comparative Example 13

Ethylene/1-octene copolymerization using [diphenylmethylene($\eta^5$-cyclopentadienyl)($\eta^5$-3,6-di-t-butylfluorenyl)]hafnium dichloride Polymerization was performed in the same manner as in Example 17, except that hydrogen was introduced in an amount of 400 ml, that 0.00015 mmol of [bis(4-N-morpholinylphenyl)methylene($\eta^5$-cyclopentadienyl)($\eta^5$-octamethyloctahydrodibenzofluorenyl)]hafnium dichloride was replaced by 0.00008 mmol of [diphenylmethylene($\eta^5$-cyclopentadienyl)($\eta^5$-3,6-di-t-butylfluorenyl)]hafnium dichloride, and that N,N-dimethylaniliniumtetrakis(pentafluorophenyl)borate was used in an amount of 0.00032 mmol.

As a result, 8.6 g of an ethylene-1-octene copolymer was obtained. The resultant polymer contained 1-octene in an amount of 13.8 mol %, and had [$\eta$]=1.90 dl/g, MFR$_2$=0.90 g/10 min, MFR$_{10}$=6.0 g/10 min, and a density of 870 kg/m$^3$.

Example 32

Ethylene/1-octene copolymerization using [bis[4-(dimethylamino)phenyl]methylene($\eta^5$-cyclopentadienyl)($\eta^5$-octamethyloctahydrodibenzofluorenyl)] zirconium dichloride To a stainless autoclave with an inner volume of 2 L sufficiently nitrogen-purged, 300 ml of heptane, and 700 ml of 1-octene were introduced, and the temperature of the system was elevated to 147° C. Thereafter, 400 ml of hydrogen was introduced, and ethylene was fed so that the total pressure became 3 MPa-G. Subsequently, 0.3 mmol of triisobutylaluminum, 0.00010 mmol of [bis[4-(dimethylamino)phenyl]methylene($\eta^5$-cyclopentadienyl)($\eta^5$-octamethyloctahydrodibenzofluorenyl)]zirconium dichloride, and 0.050 mmol of MAO were injected with nitrogen, and the number of stirring rotations was set at 250 rpm. Thereby, polymerization was initiated. Thereafter, ethylene alone was continuously fed to keep the total pressure at 3 MPa-G. Polymerization was performed for 10 minutes at 150° C. A small amount of ethanol was added into the system to terminate the polymerization, and thereafter unreacted ethylene was purged. The resultant polymer solution was poured into an excess amount of methanol to precipitate out a polymer. The polymer was collected by filtration, and dried under reduced pressure at 120° C. overnight.

As a result, 38.5 g of an ethylene-1-octene copolymer was obtained. The resultant polymer contained 1-octene in an amount of 12.4 mol %, and had [$\eta$]=1.71 dl/g.

Comparative Example 14

Ethylene/1-octene copolymerization using [bis(4-methylphenyl)methylene($\eta^5$-cyclopentadienyl)($\eta^5$-octamethyloctahydrodibenzofluorenyl)]zirconium dichloride Polymerization was performed in the same manner as in Example 32, except that 0.00010 mmol of [bis[4-(dimethylamino)phenyl]methylene($\eta^5$-cyclopentadienyl)($\eta^5$-octamethyloctahydrodibenzofluorenyl)]zirconium dichloride was replaced by 0.00010 mmol of [bis(4-methylphenyl)methylene($\eta^5$-cyclopentadienyl)($\eta^5$-octamethyloctahydrodibenzofluorenyl)]zirconium dichloride.

As a result, 21.5 g of an ethylene-1-octene copolymer was obtained. The resultant polymer contained 1-octene in an amount of 13.0 mol %, and had [$\eta$]=1.74 dl/g.

Example 33

Ethylene/1-butene copolymerization using [bis[4-(dimethylamino)phenyl]methylene($\eta^5$-cyclopentadienyl)($\eta^5$-octamethyloctahydrodibenzofluorenyl)] hafnium dichloride To a stainless autoclave with an inner volume of 2 L sufficiently nitrogen-purged, 900 ml of heptane, and 45 g of 1-butene were introduced, and the temperature of the system was elevated to 147° C. Thereafter, ethylene was fed so that the total pressure became 3 MPa-G. Subsequently, 0.3 mmol of triisobutylaluminum, 0.00055 mmol of [bis[4-(dimethylamino)phenyl]methylene($\eta^5$-cyclopentadienyl)($\eta^5$-octamethyloctahydrodibenzofluorenyl)]hafnium dichloride, and 0.0055 mmol of N,N-dimethylaniliniumtetrakis(pentafluorophenyl)borate were injected with nitrogen, and the number of rotating numbers was set at 400 rpm. Thereby, polymerization was initiated. Thereafter, ethylene alone was continuously fed to keep the total pressure at 3 MPa-G. Polymerization was performed for 10 minutes at 150° C. A small amount of ethanol was added into the system to terminate the polymerization, and thereafter unreacted ethylene was purged. The resultant polymer solution was poured into an excess amount of methanol to precipitate out a polymer. The polymer was collected by filtration, and dried under reduced pressure at 120° C. overnight.

As a result, 44.7 g of an ethylene-1-butene copolymer was obtained. The resultant polymer contained 1-butene in an amount of 7.0 mol %, and had [$\eta$]=9.0 dl/g, and a density of 895 kg/m$^3$.

Example 34

Ethylene/1-butene copolymerization using [bis(4-methoxyphenyl)methylene($\eta^5$-cyclopentadienyl)($\eta^5$-octamethyloctahydrodibenzofluorenyl)]hafnium dichloride Polymerization was performed in the same manner as in Example 33, except that 0.00055 mmol of [bis[4-(dimethylamino)phenyl]methylene($\eta^5$-cyclopentadienyl)($\eta^5$-octamethyloctahydrodibenzofluorenyl)]hafnium dichloride, and 0.0055 mmol of N,N-dimethylaniliniumtetrakis(pentafluorophenyl)borate were replaced by 0.00050 mmol of [bis(4-methoxyphenyl)methylene($\eta^5$-cyclopentadienyl)($\eta^5$-octamethyloctahydrodibenzofluorenyl)]hafnium dichloride, and 0.0050 mmol of N,N-dimethylaniliniumtetrakis(pentafluorophenyl)borate.

As a result, 20.7 g of an ethylene-1-butene copolymer was obtained. The resultant polymer contained 1-butene in an amount of 7.3 mol %, and had [$\eta$]=9.8 dl/g, and a density of 894 kg/m$^3$.

Comparative Example 15

Ethylene/1-butene copolymerization using [bis(4-methylphenyl)methylene($\eta^5$-cyclopentadienyl)($\eta^5$-octamethyloctahydrodibenzofluorenyl)]hafnium dichloride Polymerization was performed in the same manner as in Example 33, except that 0.00055 mmol of [bis[4-(dimethylamino)phenyl]methylene($\eta^5$-cyclopentadienyl)($\eta^5$-octamethyloctahydrodibenzofluorenyl)]hafnium dichloride, and 0.0055 mmol of N,N-dimethylaniliniumtetrakis(pentafluorophenyl)borate were replaced by 0.00080 mmol of [bis(4-methylphenyl)methylene($\eta^5$-cyclopentadienyl)($\eta^5$-octamethyloctahydrodibenzofluorenyl)]hafnium dichloride, and 0.0080 mmol of N,N-dimethylaniliniumtetrakis(pentafluorophenyl)borate, and that polymerization time was changed to 5 minutes.

As a result, 54.9 g of an ethylene-1-butene copolymer was obtained. The resultant polymer contained 1-butene in an amount of 7.3 mol %, and had [$\eta$]=6.7 dl/g, and a density of 896 kg/m$^3$.

Example 35

Ethylene/1-butene copolymerization using [bis[4-(dimethylamino)phenyl]methylene($\eta^5$-cyclopentadienyl)($\eta^5$-tetramethyloctahydrodibenzofluorenyl)] hafnium dichloride Polymerization was performed in the same manner as in Example 33, except that 1-butene was introduced in an amount of 50 g, that 0.00055 mmol of [bis[4-(dimethylamino)phenyl]methylene($\eta^5$-cyclopentadienyl)($\eta^5$-octamethyloctahydrodibenzofluorenyl)]hafnium dichloride, and 0.0055 mmol of N,N-dimethylaniliniumtetrakis(pentafluorophenyl)borate were replaced by 0.00022 mmol of [bis[4-(dimethylamino)phenyl]methylene($\eta^5$-cyclopentadienyl)($\eta^5$-tetramethyloctahydrodibenzofluorenyl)]hafnium dichloride, and 0.0022 mmol of N,N-dimethylaniliniumtetrakis(pentafluorophenyl)borate, and that polymerization time was changed to 6 minutes.

As a result, 53.6 g of an ethylene-1-butene copolymer was obtained. The resultant polymer contained 1-butene in an amount of 6.1 mol %, and had [η]=8.7 dl/g, and a density of 897 kg/m$^3$.

Example 36

Ethylene/1-butene copolymerization using [bis(4-methoxyphenyl)methylene($\eta^5$-cyclopentadienyl)($\eta^5$-tetramethyloctahydrodibenzofluorenyl)]hafnium dichloride Polymerization was performed in the same manner as in Example 33, except that 1-butene was introduced in an amount of 50 g, and that 0.00055 mmol of [bis[4-(dimethylamino)phenyl]methylene($\eta^5$-cyclopentadienyl)($\eta^5$-octamethyloctahydrodibenzofluorenyl)]hafnium dichloride, and 0.0055 mmol of N,N-dimethylaniliniumtetrakis(pentafluorophenyl)borate were replaced by 0.00050 mmol of [bis(4-methoxyphenyl)methylene($\eta^5$-cyclopentadienyl)($\eta^5$-tetramethyloctahydrodibenzofluorenyl)]hafnium dichloride, and 0.0050 mmol of N,N-dimethylaniliniumtetrakis(pentafluorophenyl)borate.

As a result, 24.1 g of an ethylene-1-butene copolymer was obtained. The resultant polymer contained 1-butene in an amount of 7.0 mol %, and had [η]=10.2 dl/g, and a density of 895 kg/m$^3$.

Example 37

Ethylene/1-butene copolymerization using [bis[4-(dimethylamino)phenyl]methylene($\eta^5$-cyclopentadienyl)($\eta^5$-octamethyloctahydrodibenzofluorenyl)] hafnium dichloride To a stainless autoclave with an inner volume of 2 L sufficiently nitrogen-purged, 900 ml of heptane, 45 g of 1-butene, and 500 ml of hydrogen were introduced, and the temperature of the system was elevated to 147° C. Thereafter, ethylene was fed so that the total pressure became 3 MPa-G. Subsequently, 0.3 mmol of triisobutylaluminum, 0.00055 mmol of [bis[4-(dimethylamino)phenyl]methylene($\eta^5$-cyclopentadienyl)($\eta^5$-octamethyloctahydrodibenzofluorenyl)]hafnium dichloride, and 0.0055 mmol of N,N-dimethylaniliniumtetrakis(pentafluorophenyl)borate were injected with nitrogen, and the number of stirring rotations was set at 400 rpm. Thereby, polymerization was initiated. Thereafter, ethylene alone was continuously fed to keep the total pressure at 3 MPa-G. Polymerization was performed for 10 minutes at 150° C. A small amount of ethanol was added into the system to terminate the polymerization, and thereafter unreacted ethylene was purged. The resultant polymer solution was poured into an excess amount of methanol to precipitate out a polymer. The polymer was collected by filtration, and dried under reduced pressure at 120° C. overnight.

As a result, 46.4 g of an ethylene-1-butene copolymer was obtained. The resultant polymer contained 1-butene in an amount of 6.0 mol %, and had [η]=2.00 dl/g, MFR$_2$=0.94 g/10 min, MFR$_{10}$=5.7 g/10 min, and a density of 907 kg/m$^3$. The amount of the molecular chain double bonds (number/1000 carbons) was as follows: vinyl<0.1 (below detectable lower limit), vinylidene<0.1 (below detectable lower limit), di-substituted olefin<0.1 (below detectable lower limit), and tri-substituted olefin=0.1.

Example 38

Ethylene/1-butene copolymerization using [bis(4-methoxyphenyl)methylene($\eta^5$-cyclopentadienyl)($\eta^5$-octamethyloctahydrodibenzofluorenyl)]hafnium dichloride Polymerization was performed in the same manner as in Example 37, except that hydrogen was introduced in an amount of 600 ml, that 0.00055 mmol of [bis[4-(dimethylamino)phenyl]methylene($\eta^5$-cyclopentadienyl)($\eta^5$-octamethyloctahydrodibenzofluorenyl)]hafnium dichloride, and 0.0055 mmol of N,N-dimethylaniliniumtetrakis(pentafluorophenyl)borate were replaced by 0.00050 mmol of [bis(4-methoxyphenyl)methylene($\eta^5$-cyclopentadienyl)($\eta^5$-octamethyloctahydrodibenzofluorenyl)]hafnium dichloride, and 0.0050 mmol of N,N-dimethylaniliniumtetrakis(pentafluorophenyl)borate, and that polymerization time was changed to 15 minutes.

As a result, 45.1 g of an ethylene-1-butene copolymer was obtained. The resultant polymer contained 1-butene in an amount of 6.5 mol %, and had [η]=1.81 dl/g, MFR$_2$=1.45 g/10 min, MFR$_{10}$=8.3 g/10 min, and a density of 905 kg/m$^3$. The amount of the molecular chain double bonds (number/1000 carbons) was as follows: vinyl<0.1 (below detectable lower limit), vinylidene<0.1 (below detectable lower limit), di-substituted olefin<0.1 (below detectable lower limit), and tri-substituted olefin=0.1.

Comparative Example 16

Ethylene/1-butene copolymerization using [bis(4-methylphenyl)methylene($\eta^5$-cyclopentadienyl)($\eta^5$-octamethyloctahydrodibenzofluorenyl)]hafnium dichloride Polymerization was performed in the same manner as in Example 37, except that hydrogen was introduced in an amount of 550 ml, and that 0.00055 mmol of [bis[4-(dimethylamino)phenyl]methylene($\eta^5$-cyclopentadienyl)($\eta^5$-octamethyloctahydrodibenzofluorenyl)]hafnium dichloride, and 0.0055 mmol of N,N-dimethylaniliniumtetrakis(pentafluorophenyl)borate were replaced by 0.00080 mmol of [bis(4-methylphenyl)methylene($\eta^5$-cyclopentadienyl)($\eta^5$-octamethyloctahydrodibenzofluorenyl)]hafnium dichloride, and 0.0080 mmol of N,N-dimethylaniliniumtetrakis(pentafluorophenyl)borate.

As a result, 46.6 g of an ethylene-1-butene copolymer was obtained. The resultant polymer contained 1-butene in an amount of 6.7 mol %, and had [η]=1.81 dl/g, MFR$_2$=1.35 g/10 min, MFR$_{10}$=8.3 g/10 min, and a density of 904 kg/m$^3$. The amount of the molecular chain double bonds (number/1000 carbons) was as follows: vinyl<0.1 (below detectable lower limit), vinylidene<0.1 (below detectable lower limit), di-substituted olefin=0.1, and tri-substituted olefin=0.1.

Example 39

Ethylene/1-butene copolymerization using [bis[4-(dimethylamino)phenyl]methylene(η$^5$-cyclopentadienyl)(η$^5$-tetramethyloctahydrodibenzofluorenyl)]hafnium dichloride Polymerization was performed in the same manner as in Example 37, except that 1-butene was introduced in an amount of 50 g, that hydrogen was introduced in an amount of 600 ml, and that 0.00055 mmol of [bis[4-(dimethylamino)phenyl]methylene(η$^5$-cyclopentadienyl)(η$^5$-octamethyloctahydrodibenzofluorenyl)]hafnium dichloride, and 0.0055 mmol of N,N-dimethylaniliniumtetrakis(pentafluorophenyl)borate were replaced by 0.00022 mmol of [bis[4-(dimethylamino)phenyl]methylene(η$^5$-cyclopentadienyl)(η$^5$-tetramethyloctahydrodibenzofluorenyl)]hafnium dichloride, and 0.0022 mmol of N,N-dimethylaniliniumtetrakis(pentafluorophenyl)borate.

As a result, 61.3 g of an ethylene-1-butene copolymer was obtained. The resultant polymer contained 1-butene in an amount of 5.8 mol %, and had [η]=1.82 dl/g, MFR$_2$=1.30 g/10 min, MFR$_{10}$=7.9 g/10 min, and a density of 906 kg/m$^3$. The amount of the molecular chain double bonds (number/1000 carbons) was as follows: vinyl<0.1 (below detectable lower limit), vinylidene<0.1 (below detectable lower limit), di-substituted olefin=0.1, and tri-substituted olefin=0.1.

Example 40

Ethylene/1-butene copolymerization using [bis(4-methoxyphenyl)methylene(η$^5$-cyclopentadienyl)(η$^5$-tetramethyloctahydrodibenzofluorenyl)]hafnium dichloride Polymerization was performed in the same manner as in Example 37, except that 1-butene was introduced in an amount of 50 g, that hydrogen was introduced in an amount of 600 ml, and that 0.00055 mmol of [bis[4-(dimethylamino)phenyl]methylene(η$^5$-cyclopentadienyl)(η$^5$-octamethyloctahydrodibenzofluorenyl)]hafnium dichloride, and 0.0055 mmol of N,N-dimethylaniliniumtetrakis(pentafluorophenyl)borate were replaced by 0.00050 mmol of [bis(4-methoxyphenyl)methylene(η$^5$-cyclopentadienyl)(η$^5$-tetramethyloctahydrodibenzofluorenyl)]hafnium dichloride, and 0.0050 mmol of N,N-dimethylaniliniumtetrakis(pentafluorophenyl)borate.

As a result, 51.0 g of an ethylene-1-butene copolymer was obtained. The resultant polymer contained 1-butene in an amount of 5.9 mol %, and had [η]=2.05 dl/g, MFR$_2$=0.87 g/10 min, MFR$_{10}$=4.9 g/10 min, and a density of 904 kg/m$^3$. The amount of the molecular chain double bonds (number/1000 carbons) was as follows: vinyl<0.1 (below detectable lower limit), vinylidene<0.1 (below detectable lower limit), di-substituted olefin=0.1, and tri-substituted olefin=0.1.

TABLE 1

Polymerization result of ethylene/1-octene copolymerization

| | Component (A) | | Component (B) | | | | | | Amount added of 1-octene ml | Amount added of hydrogen ml | Polymerization temperature ° C. | Polymerization time min |
| | | | (B-1) | | (B-2) | | (B-3) | | | | | |
| | Type Note 1) | mmol | Type Note 2) | mmol | Type Note 3) | mmol | Type Note 4) | mmol | | | | |
|---|---|---|---|---|---|---|---|---|---|---|---|---|
| Example 1 | i | 0.00005 | a | 0.3 | — | — | c | 0.00020 | 150 | 0 | 150 | 10 |
| Example 17 | i | 0.00015 | a | 0.3 | — | — | c | 0.00060 | 150 | 500 | 150 | 10 |
| Example 2 | ii | 0.00005 | a | 0.3 | — | — | c | 0.00020 | 150 | 0 | 150 | 10 |
| Example 18 | ii | 0.00005 | a | 0.3 | — | — | c | 0.00020 | 150 | 400 | 150 | 10 |
| Example 3 | iii | 0.00020 | a | 0.3 | — | — | c | 0.00080 | 150 | 0 | 150 | 10 |
| Example 19 | iii | 0.00020 | a | 0.3 | — | — | c | 0.00080 | 150 | 400 | 150 | 10 |
| Example 4 | iv | 0.00006 | a | 0.3 | — | — | c | 0.00024 | 150 | 0 | 150 | 10 |
| Example 20 | iv | 0.00006 | a | 0.3 | — | — | c | 0.00024 | 150 | 400 | 150 | 10 |
| Example 5 | v | 0.00006 | a | 0.3 | — | — | c | 0.00024 | 150 | 0 | 150 | 10 |
| Example 21 | v | 0.00006 | a | 0.3 | — | — | c | 0.00024 | 150 | 400 | 150 | 10 |
| Example 6 | vi | 0.00006 | a | 0.3 | — | — | c | 0.00024 | 150 | 0 | 150 | 10 |
| Example 22 | vi | 0.00006 | a | 0.3 | — | — | c | 0.00024 | 150 | 400 | 150 | 10 |
| Comp. Ex. 1 | vii | 0.00010 | a | 0.3 | — | — | c | 0.00040 | 150 | 0 | 150 | 10 |
| Comp. Ex. 8 | vii | 0.00010 | a | 0.3 | — | — | c | 0.00040 | 150 | 400 | 150 | 10 |
| Example 7 | viii | 0.00005 | a | 0.3 | — | — | c | 0.00020 | 150 | 0 | 150 | 10 |
| Example 23 | viii | 0.00003 | a | 0.3 | — | — | c | 0.00012 | 150 | 500 | 150 | 10 |
| Example 8 | ix | 0.00005 | a | 0.3 | — | — | c | 0.00020 | 150 | 0 | 150 | 10 |
| Example 24 | ix | 0.00005 | a | 0.3 | — | — | c | 0.00020 | 150 | 500 | 150 | 10 |
| Example 9 | x | 0.00005 | a | 0.3 | — | — | c | 0.00020 | 150 | 0 | 150 | 10 |
| Example 25 | x | 0.00020 | a | 0.3 | — | — | c | 0.00080 | 150 | 500 | 150 | 10 |
| Example 10 | xi | 0.00005 | a | 0.3 | — | — | c | 0.00020 | 150 | 0 | 150 | 10 |
| Example 26 | xi | 0.00003 | a | 0.3 | — | — | c | 0.00012 | 150 | 500 | 150 | 10 |
| Example 11 | xii | 0.00005 | a | 0.3 | — | — | c | 0.00020 | 150 | 0 | 150 | 10 |
| Example 27 | xii | 0.00005 | a | 0.3 | — | — | c | 0.00020 | 150 | 500 | 150 | 10 |
| Example 12 | xiii | 0.00050 | a | 0.3 | — | — | c | 0.00200 | 150 | 0 | 150 | 10 |
| Example 28 | xiii | 0.00040 | a | 0.3 | — | — | c | 0.00160 | 150 | 400 | 150 | 10 |
| Comp. Ex. 2 | xiv | 0.00005 | a | 0.3 | — | — | c | 0.00020 | 150 | 0 | 150 | 10 |
| Comp. Ex. 9 | xiv | 0.00005 | a | 0.3 | — | — | c | 0.00020 | 150 | 400 | 150 | 10 |
| Example 13 | xv | 0.00005 | a | 0.3 | — | — | c | 0.00020 | 150 | 0 | 150 | 10 |
| Example 29 | xv | 0.00030 | a | 0.3 | — | — | c | 0.00120 | 150 | 500 | 150 | 10 |
| Example 14 | xvi | 0.00005 | a | 0.3 | — | — | c | 0.00020 | 150 | 0 | 150 | 10 |

TABLE 1-continued

Polymerization result of ethylene/1-octene copolymerization

| | | | | | | | | | | | | |
|---|---|---|---|---|---|---|---|---|---|---|---|---|
| Example 30 | xvi | 0.00010 | a | 0.3 | — | — | c | 0.00040 | 150 | 400 | 150 | 10 |
| Comp. Ex. 3 | xvii | 0.00005 | a | 0.3 | — | — | c | 0.00020 | 150 | 0 | 150 | 10 |
| Comp. Ex. 10 | xvii | 0.00008 | a | 0.3 | — | — | c | 0.00032 | 150 | 400 | 150 | 10 |
| Example 15 | xviii | 0.00004 | a | 0.3 | — | — | c | 0.00016 | 150 | 0 | 150 | 10 |
| Example 31 | xviii | 0.00003 | a | 0.3 | — | — | c | 0.00012 | 150 | 400 | 150 | 10 |
| Comp. Ex. 4 | xix | 0.00005 | a | 0.3 | — | — | c | 0.00020 | 150 | 0 | 150 | 10 |
| Comp. Ex. 11 | xix | 0.00010 | a | 0.3 | — | — | c | 0.00040 | 150 | 400 | 150 | 10 |
| Comp. Ex. 5 | xx | 0.00010 | a | 0.3 | — | — | c | 0.00040 | 150 | 0 | 150 | 10 |
| Comp. Ex. 12 | xx | 0.00020 | a | 0.3 | — | — | c | 0.00080 | 150 | 400 | 150 | 10 |
| Comp. Ex. 6 | xxi | 0.00003 | a | 0.3 | — | — | c | 0.00012 | 150 | 0 | 150 | 10 |
| Comp. Ex. 13 | xxi | 0.00008 | a | 0.3 | — | — | c | 0.00032 | 150 | 400 | 150 | 10 |
| Example 16 | xxii | 0.00010 | a | 0.3 | b | 0.050 | — | — | 700 | 0 | 150 | 10 |
| Example 32 | xxii | 0.00010 | a | 0.3 | b | 0.050 | — | — | 700 | 400 | 150 | 10 |
| Comp. Ex. 7 | xxiii | 0.00010 | a | 0.3 | b | 0.050 | — | — | 700 | 0 | 150 | 10 |
| Comp. Ex. 14 | xxiii | 0.00010 | a | 0.3 | b | 0.050 | — | — | 700 | 400 | 150 | 10 |

| | | | | | | | | | Amount of molecular chain double bond | | | |
|---|---|---|---|---|---|---|---|---|---|---|---|---|
| | Yield of polymer g | mileage kg/mmol-M | Content of 1-octene mol % | $[\eta]$ dl/g | $[\eta]$ ratio Note 5) | $MFR_2$ g/10 min | $MFR_{10}$ g/10 min | Density kg/m³ | vinyl Number/ 1000 C | vinylidene Number/ 1000 C | di-substituted Number/ 1000 C | tri-substituted Number/ 1000 C |
| Example 1 | 3.1 | 62 | 12.5 | 6.92 | — | | | | | | | |
| Example 17 | 9.7 | 65 | 11.2 | 1.66 | 0.24 | 1.69 | 10.5 | 881 | 0.1 | 0.1 | 0.1 | 0.1 |
| Example 2 | 15.2 | 303 | 12.2 | 5.48 | — | | | | | | | |
| Example 18 | 27.0 | 541 | 11.8 | 1.76 | 0.32 | 1.40 | 8.7 | 877 | <0.1 | <0.1 | <0.1 | 0.1 |
| Example 3 | 14.4 | 72 | 13.2 | 5.30 | — | | | | | | | |
| Example 19 | 16.8 | 84 | 12.6 | 1.90 | 0.36 | 0.87 | 5.4 | 875 | | | | |
| Example 4 | 12.0 | 199 | 12.9 | 5.29 | — | | | | | | | |
| Example 20 | 18.7 | 311 | 12.6 | 1.83 | 0.35 | 1.10 | 6.8 | 875 | | | | |
| Example 5 | 10.2 | 171 | 13.4 | 5.15 | — | | | | | | | |
| Example 21 | 19.3 | 322 | 13.4 | 1.78 | 0.35 | 1.23 | 7.6 | 873 | | | | |
| Example 6 | 17.9 | 299 | 12.8 | 4.73 | — | | | | | | | |
| Example 22 | 25.5 | 425 | 12.7 | 1.71 | 0.36 | 1.45 | 9.3 | 874 | | | | |
| Comp. Ex. 1 | 7.2 | 72 | 14.9 | 4.17 | — | | | | | | | |
| Comp. Ex. 8 | 14.0 | 140 | 14.8 | 1.74 | 0.42 | 1.38 | 9.4 | 866 | | | | |
| Example 7 | 23.0 | 460 | 10.0 | 6.55 | — | | | | | | | |
| Example 23 | 11.0 | 367 | 10.0 | 1.90 | 0.29 | 0.93 | 5.6 | 884 | <0.1 | <0.1 | <0.1 | 0.1 |
| Example 8 | 10.0 | 201 | 11.0 | 6.27 | — | | | | | | | |
| Example 24 | 22.8 | 457 | 10.6 | 1.80 | 0.29 | 1.16 | 7.1 | 881 | | | | |
| Example 9 | 4.8 | 96 | 12.1 | 6.59 | — | | | | | | | |
| Example 25 | 17.2 | 86 | 12.4 | 1.88 | 0.29 | 0.80 | 4.8 | 876 | | | | |
| Example 10 | 10.2 | 204 | 11.4 | 5.37 | — | | | | | | | |
| Example 26 | 12.0 | 399 | 11.4 | 1.92 | 0.36 | 0.87 | 5.4 | 879 | | | | |
| Example 11 | 8.3 | 165 | 10.6 | 5.70 | — | | | | | | | |
| Example 27 | 17.3 | 345 | 10.5 | 1.79 | 0.31 | 1.20 | 7.2 | 881 | <0.1 | <0.1 | <0.1 | 0.1 |
| Example 12 | 15.6 | 31 | 13.0 | 4.83 | — | | | | | | | |
| Example 28 | 18.5 | 46 | 13.0 | 2.04 | 0.42 | 0.64 | 3.8 | 874 | | | | |
| Comp. Ex. 2 | 7.9 | 158 | 14.0 | 3.86 | — | | | | | | | |
| Comp. Ex. 9 | 14.4 | 287 | 13.5 | 1.84 | 0.48 | 1.24 | 8.9 | 870 | | | | |
| Example 13 | 2.6 | 52 | 12.6 | 5.59 | — | | | | | | | |
| Example 29 | 12.1 | 40 | 13.2 | 1.86 | 0.33 | 0.88 | 5.2 | 874 | | | | |
| Example 14 | 7.0 | 140 | 12.0 | 5.24 | — | | | | | | | |
| Example 30 | 24.0 | 240 | 11.4 | 1.85 | 0.35 | 1.24 | 7.4 | 879 | | | | |
| Comp. Ex. 3 | 4.0 | 80 | 11.8 | 4.32 | — | | | | | | | |
| Comp. Ex. 10 | 16.9 | 212 | 11.7 | 1.89 | 0.44 | 0.96 | 6.2 | 877 | | | | |
| Example 15 | 13.3 | 333 | 11.9 | 4.49 | — | | | | | | | |
| Example 31 | 16.3 | 545 | 12.0 | 1.86 | 0.41 | 0.98 | 6.1 | 876 | | | | |
| Comp. Ex. 4 | 3.6 | 71 | 13.2 | 3.92 | — | | | | | | | |
| Comp. Ex. 11 | 21.3 | 213 | 13.1 | 1.58 | 0.40 | 1.95 | 13.2 | 873 | | | | |
| Comp. Ex. 5 | 3.5 | 35 | 15.2 | 3.23 | — | | | | | | | |
| Comp. Ex. 12 | 14.8 | 74 | 15.2 | 1.81 | 0.56 | 1.13 | 8.1 | 866 | | | | |
| Comp. Ex. 6 | 2.2 | 75 | 13.8 | 3.74 | — | | | | | | | |
| Comp. Ex. 13 | 8.6 | 108 | 13.8 | 1.90 | 0.51 | 0.90 | 6.0 | 870 | | | | |
| Example 16 | 30.9 | 309 | 12.5 | 2.72 | — | | | | | | | |
| Example 32 | 38.5 | 385 | 12.4 | 1.71 | 0.63 | | | | | | | |
| Comp. Ex. 7 | 29.1 | 291 | 12.6 | 2.65 | — | | | | | | | |
| Comp. Ex. 14 | 21.5 | 215 | 13.0 | 1.74 | 0.66 | | | | | | | |

Note 1) As component (A), crosslinked metallocene compounds shown below were used.

i:
[bis(4-N-morpholinylphenyl)methylene($\eta^5$-cyclopentadienyl)($\eta^5$-octamethyloctahydrodibenzofluorenyl)]hafnium dichloride ii:
[bis[4-(dimethylamino)phenyl]methylene($\eta^5$-cyclopentadienyl)($\eta^5$-octamethyloctahydrodibenzofluorenyl)]hafnium dichloride iii:
[bis(3-N-morpholinylphenyl)methylene($\eta^5$-cyclopentadienyl)($\eta^5$-octamethyloctahydrodibenzofluorenyl)]hafnium dichloride iv:
[bis(4-methoxy-3-methylphenyl)methylene($\eta^5$-cyclopentadienyl)($\eta^5$-octamethyloctahydrodibenzofluorenyl)]hafnium dichloride v:
[bis(4-methoxy-3,5-dimethylphenyl)methylene($\eta^5$-cyclopentadienyl)($\eta^5$-octamethyloctahydrodibenzofluorenyl)]hafnium dichloride vi:
[bis(4-methoxyphenyl)methylene($\eta^5$-cyclopentadienyl)($\eta^5$-octamethyloctahydrodibenzofluorenyl)]hafnium dichloride vii:
[bis(3-chlorophenyl)methylene($\eta^5$-cyclopentadienyl)($\eta^5$-octamethyloctahydrodibenzofluorenyl)]hafnium dichloride viii:
[bis[4-(dimethylamino)phenyl]methylene($\eta^5$-cyclopentadienyl)($\eta^5$-tetramethyloctahydrodibenzofluorenyl)]hafnium dichloride ix:
[bis(4-methoxyphenyl)methylene($\eta^5$-cyclopentadienyl)($\eta^5$-tetramethyloctahydrodibenzofluorenyl)]hafnium dichloride x:
[bis(3,4-dimethoxyphenyl)methylene($\eta^5$-cyclopentadienyl)($\eta^5$-2,7-dimethyl-3,6-di-t-butylfluorenyl)]hafnium dichloride xi:
[bis(4-methoxyphenyl)methylene($\eta^5$-cyclopentadienyl)($\eta^5$-2,7-dimethyl-3,6-di-t-butylfluorenyl)]hafnium dichloride xii:
[bis(4-methoxyphenyl)methylene($\eta^5$-cyclopentadienyl)($\eta^5$-2,3,6,7-tetramethylfluorenyl)]hafnium dichloride xiii:
[bis(4-N-morpholinylphenyl)methylene($\eta^5$-cyclopentadienyl)($\eta^5$-2,7-di-t-butylfluorenyl)]hafnium dichloride xiv:
[bis(4-methylphenyl)methylene($\eta^5$-cyclopentadienyl)($\eta^5$-2,7-di-t-butylfluorenyl)]hafnium dichloride xv:
[bis(3,4-dimethoxyphenyl)methylene($\eta^5$-cyclopentadienyl)($\eta^5$-2,7-dimethylfluorenyl)]hafnium dichloride xvi:
[bis(4-methoxyphenyl)methylene($\eta^5$-cyclopentadienyl)($\eta^5$-2,7-dimethylfluorenyl)]hafnium dichloride xvii:
[bis(4-methylphenyl)methylene($\eta^5$-cyclopentadienyl)($\eta^5$-2,7-dimethylfluorenyl)]hafnium dichloride xviii:
[bis[4-(dimethylamino)phenyl]methylene($\eta^5$-cyclopentadienyl)($\eta^5$-3,6-di-t-butylfluorenyl)]hafnium dichloride xix:
[bis(4-methylphenyl)methylene($\eta^5$-cyclopentadienyl)($\eta^5$-3,6-di-t-butylfluorenyl)]hafnium dichloride xx:
[bis(4-chlorophenyl)methylene($\eta^5$-cyclopentadienyl)($\eta^5$-3,6-di-t-butylfluorenyl)]hafnium dichloride xxi:
[diphenylmethylene($\eta^5$-cyclopentadienyl)($\eta^5$-3,6-di-t-butylfluorenyl)]hafnium dichloride xxii:
[bis[4-(dimethylamino)phenyl]methylene($\eta^5$-cyclopentadienyl)($\eta^5$-octamethyloctahydrodibenzofluorenyl)]zirconium dichloride xxiii:
[bis(4-methylphenyl)methylene($\eta^5$-cyclopentadienyl)($\eta^5$-octamethyloctahydrodibenzofluorenyl)]zirconium dichloride Note 2) As component (B-1), an organometallic compound shown below was used.
a: triisobutylaluminum Note 3) As component (B-2), an organometallic compound shown below was used.
b: MMAO Note 4) As component (B-3), a compound which reacts with crosslinked metallocene compound (A) to form an ion pair, shown below, was used.
c: N,N-dimethylaniliniumtetrakis(pentafluorophenyl)borate Note 5) Ratio of [η] given at the time of polymerization with the addition of hydrogen to [η] given at the time of polymerization without the addition of hydrogen

TABLE 2

Polymerization result of ethylene/1-butene copolymerization

| | Component (A) | | Component (B) | | | | Amount added of 1-butene ml | Amount added of hydrogen ml | Polymerization temperature ° C. | Polymerization time min |
| | | | (B-1) | | (B-3) | | | | | |
| | Type Note 1) | mmol | Type Note2) | mmol | Type Note3) | mmol | | | | |
|---|---|---|---|---|---|---|---|---|---|---|
| Example 33 | ii | 0.00055 | a | 0.3 | c | 0.0055 | 45 | 0 | 150 | 10 |
| Example 37 | ii | 0.00055 | a | 0.3 | c | 0.0055 | 45 | 500 | 150 | 10 |
| Example 34 | vi | 0.00050 | a | 0.3 | c | 0.0050 | 45 | 0 | 150 | 10 |
| Example 38 | vi | 0.00050 | a | 0.3 | c | 0.0050 | 45 | 600 | 150 | 15 |
| Comp. Ex. 15 | xxiv | 0.00080 | a | 0.3 | c | 0.0080 | 45 | 0 | 150 | 5 |
| Comp. Ex. 16 | xxiv | 0.00080 | a | 0.3 | c | 0.0080 | 45 | 550 | 150 | 10 |
| Example 35 | viii | 0.00022 | a | 0.3 | c | 0.0022 | 50 | 0 | 150 | 6 |
| Example 39 | viii | 0.00022 | a | 0.3 | c | 0.0022 | 50 | 600 | 150 | 10 |
| Example 36 | ix | 0.00050 | a | 0.3 | c | 0.0050 | 50 | 0 | 150 | 10 |
| Example 40 | ix | 0.00050 | a | 0.3 | c | 0.0050 | 50 | 600 | 150 | 10 |

TABLE 2-continued

Polymerization result of ethylene/1-butene copolymerization

|  | Yield of polymer g | mileage kg/mmol-M | Content of 1-butene mol % | [η] dl/g | [η] ratio Note4) | MFR$_2$ g/10 min | MFR$_{10}$ g/10 min | Density kg/m$^3$ | Amount of molecular chain double bond | | | |
|---|---|---|---|---|---|---|---|---|---|---|---|---|
|  |  |  |  |  |  |  |  |  | vinyl Number/ 1000 C | vinylidene Number/ 1000 C | di-substituted Number/ 1000 C | tri-substituted Number/ 1000 C |
| Example 33 | 44.7 | 81 | 7.0 | 9.0 |  |  |  | 895 |  |  |  |  |
| Example 37 | 46.4 | 84 | 6.0 | 2.00 | 0.22 | 0.94 | 5.7 | 907 | <0.1 | <0.1 | <0.1 | 0.1 |
| Example 34 | 20.7 | 41 | 7.3 | 9.8 |  |  |  | 894 |  |  |  |  |
| Example 38 | 45.1 | 90 | 6.5 | 1.81 | 0.18 | 1.45 | 8.3 | 905 | <0.1 | <0.1 | <0.1 | 0.1 |
| Comp. Ex. 15 | 54.9 | 69 | 7.3 | 6.7 |  |  |  | 896 |  |  |  |  |
| Comp. Ex. 16 | 46.6 | 58 | 6.7 | 1.81 | 0.27 | 1.35 | 8.3 | 904 | <0.1 | <0.1 | 0.1 | 0.1 |
| Example 35 | 53.6 | 247 | 6.1 | 8.7 |  |  |  | 897 |  |  |  |  |
| Example 39 | 61.3 | 279 | 5.8 | 1.82 | 0.21 | 1.30 | 7.9 | 906 | <0.1 | <0.1 | 0.1 | 0.1 |
| Example 36 | 24.1 | 48 | 7.0 | 10.2 |  |  |  | 895 |  |  |  |  |
| Example 40 | 51.0 | 102 | 5.9 | 2.05 | 0.20 | 0.87 | 4.9 | 904 | <0.1 | <0.1 | 0.1 | 0.1 |

Note 1) As component (A), crosslinked metallocene compounds shown below were used.

ii:
[bis[4-(dimethylamino)phenyl]methylene($\eta^5$-cyclopentadienyl)($\eta^5$-octamethyloctahydrodibenzofluorenyl)]hafnium dichloride vi:
[bis(4-methoxyphenyl)methylene($\eta^5$-cyclopentadienyl)($\eta^5$-octamethyloctahydrodibenzofluorenyl)]hafnium dichloride viii:
[bis[4-(dimethylamino)phenyl]methylene($\eta^5$-cyclopentadienyl)($\eta^5$-tetramethyloctahydrodibenzofluorenyl)]hafnium dichloride ix:
[bis(4-methoxyphenyl)methylene($\eta^5$-cyclopentadienyl)($\eta^5$-tetramethyloctahydrodibenzofluorenyl)]hafnium dichloride xxiv:
[bis(4-methylphenyl)methylene($\eta^5$-cyclopentadienyl)($\eta^5$-octamethyloctahydrodibenzofluorenyl)]hafnium dichloride Note 2) As component (B-1), an organometallic compound shown below was used.
a: triisobutylaluminum Note 3) As component (B-3), a compound which reacts with crosslinked metallocene compound (A) to form an ion pair, shown below, was used.
c: N,N-dimethylaniliniumtetrakis(pentafluorophenyl)borate Note 4) Ratio of [η] given at the time of polymerization with the addition of hydrogen to [η] given at the time of polymerization without the addition of hydrogen

The invention claimed is:

1. A process for producing an ethylene/α-olefin copolymer, comprising copolymerizing ethylene and an α-olefin having 3 or more carbon atoms in the presence of an olefin polymerization catalyst comprising:
(A) a bridged metallocene compound represented by the following general formula [I], and
(B) at least one compound selected from (B-1) an organometallic compound, (B-2) an organoaluminum oxy-compound and (B-3) a compound which reacts with the bridged metallocene compound (A) to form an ion pair,

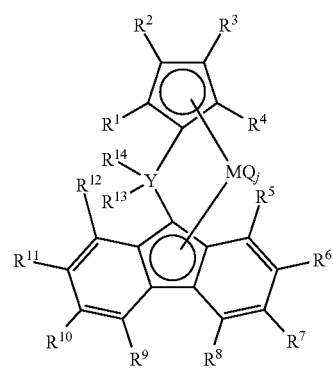

[I]

wherein Y is selected from a carbon atom, a silicon atom, a germanium atom and a tin atom,
M is a titanium atom, a zirconium atom or a hafnium atom,
$R^1$, $R^2$, $R^3$, $R^4$, $R^5$, $R^6$, $R^7$, $R^8$, $R^9$, $R^{10}$, $R^{11}$ and $R^{12}$ are each an atom or a substituent selected from a hydrogen atom, a hydrocarbon group having 1 to 20 carbon atoms, a silicon-containing group, a nitrogen-containing group, an oxygen-containing group, a halogen atom and a halogen-containing group, and are optionally the same as or different from each other,
adjacent substituents of $R^1$ to $R^{12}$ are optionally bonded to each other to form a ring,
$R^{13}$ and $R^{14}$ are each an aryl group or a substituted aryl group, and are optionally the same as or different from each other when being both substituted aryl groups,
at least one of $R^{13}$ and $R^{14}$ is a substituted aryl group, said substituted aryl group being a substituted aryl group in which one or more hydrogen atoms of an aryl group are each substituted with an electron-donating substituent having a Hammett substituent constant σ of not more than −0.2, wherein when the substituted aryl group has a plurality of the electron-donating substituents, these electron-donating substituents are the same as or different from each other, said substituted aryl group optionally having a substituent which is a substituent other than the electron-donating substituent and is selected from a hydrocarbon group having 1 to 20 carbon atoms, a silicon-containing group, a nitrogen-containing group, an oxygen-containing group, a halogen atom and a halogen-containing group, wherein when the substituted aryl group has a plurality of the substituents, these substituents are the same as or different from each other, Q is selected from a halogen atom, a hydrocarbon group having 1 to 20 carbon atoms, an anionic ligand and a neutral ligand capable of coordination with a lone pair of electrons, in a combination of the same or different kinds, and j is an integer of 1 to 4, and, wherein polymerization is carried out in such a manner as to obtain an ethylene-based polymer in which the proportion of constituent units derived from ethylene is not less than 50% by mol when the total of constituent units derived from monomers in the polymer is 100% by mol.

2. The process for producing an ethylene/α-olefin copolymer as claimed in claim 1, wherein $R^1$, $R^2$, $R^3$ and $R^4$ in the general formula [I] are all hydrogen atoms.

3. The process for producing an ethylene/α-olefin copolymer as claimed in claim 1, wherein Y in the general formula [I] is a carbon atom.

4. The process for producing an ethylene/α-olefin copolymer as claimed in claim 1, wherein the electron-donating substituent is a group selected from a nitrogen-containing group and an oxygen-containing group.

5. The process for producing an ethylene/α-olefin copolymer as claimed in claim 4, wherein $R^{13}$ and $R^{14}$ in the general formula [I] are the same substituted aryl group.

6. The process for producing an ethylene/α-olefin copolymer as claimed in claim 4, wherein $R^{13}$ and $R^{14}$ in the general formula [I] are each a substituted phenyl group containing, as the electron-donating substituent, a group selected from a nitrogen-containing group and an oxygen-containing group at the meta position and/or the para position with respect to bonding to Y.

7. The process for producing an ethylene/α-olefin copolymer as claimed in claim 4, wherein $R^{13}$ and $R^{14}$ in the general formula [I] are each a substituted phenyl group containing, as the electron-donating substituent, a nitrogen-containing group represented by the following general formula [II]:

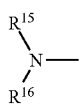

[II]

wherein $R^{15}$ and $R^{16}$ are each an atom or a substituent selected from a hydrogen atom, a hydrocarbon group having 1 to 20 carbon atoms, a silicon-containing group, an oxygen-containing group and a halogen-containing group, are optionally the same as or different from each other, and are optionally bonded to each other to form a ring, and a line drawn on the right-hand side of N represents bonding to the phenyl group.

8. The process for producing an ethylene/α-olefin copolymer as claimed in claim 4, wherein $R^{13}$ and $R^{14}$ in the general formula [I] are each a substituted phenyl group containing, as the electron-donating substituent, an oxygen-containing group represented by the following general formula [III]:

$R^{17}$—O—      [III]

wherein $R^{17}$ is an atom or a substituent selected from a hydrogen atom, a hydrocarbon group having 1 to 20 carbon atoms, a silicon-containing group, a nitrogen-containing group and a halogen-containing group, and a line drawn on the right-hand side of O represents bonding to the phenyl group.

9. The process for producing an ethylene/α-olefin copolymer as claimed in claim 1, wherein $R^5$, $R^8$, $R^9$ and $R^{12}$ in the general formula [I] are all hydrogen atoms.

10. The process for producing an ethylene/α-olefin copolymer as claimed in claim 1, wherein at least two of $R^6$, $R^7$, $R^{10}$ and $R^{11}$ in the general formula [I] are each a substituent selected from a hydrocarbon group, a silicon-containing group, a nitrogen-containing group, an oxygen-containing group, a halogen atom and a halogen-containing group.

11. The process for producing an ethylene/α-olefin copolymer as claimed in claim 10, wherein $R^6$ and $R^7$, and/or $R^{10}$ and $R^{11}$ in the general formula [I] are bonded to each other to form a ring.

12. The process for producing an ethylene/α-olefin copolymer as claimed in claim 11, wherein $R^6$ and $R^7$, and $R^{10}$ and $R^{11}$ in the general formula [I] are both bonded to each other to form a ring.

13. The process for producing an ethylene/α-olefin copolymer as claimed in claim 12, wherein the rings formed by bonding of $R^6$ and $R^7$, and $R^{10}$ and $R^{11}$ in the general formula [I] to each other are each a five-membered to seven-membered ring.

14. The process for producing an ethylene/α-olefin copolymer as claimed in claim 13, wherein the rings formed by bonding of $R^6$ and $R^7$, and $R^{10}$ and $R^{11}$ in the general formula [I] to each other are each a six-membered ring.

15. The process for producing an ethylene/α-olefin copolymer as claimed in claim 14, wherein ethylene and an α-olefin are copolymerized in the presence of an olefin polymerization catalyst comprising a bridged metallocene compound represented by the following general formula [IV]:

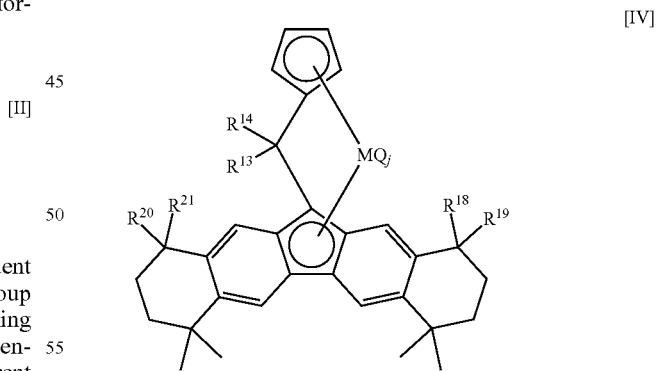

wherein M is a titanium atom, a zirconium atom or a hafnium atom, $R^{13}$ and $R^{14}$ are each a substituted phenyl group containing, as the electron-donating substituent, a nitrogen-containing group represented by the general formula [II], or are each a substituted phenyl group containing, as the electron-donating substituent, an oxygen-containing group represented by the general formula [III], $R^{18}$, $R^{19}$, $R^{20}$ and $R^{21}$ are each a hydrogen atom or a methyl group, Q is selected from a halogen atom, a hydrocarbon group having 1 to 20 carbon atoms, an anionic ligand and a neutral ligand capable of coordination with a lone pair of electrons, in a combination of the same or different kinds, and j is an integer of 1 to 4.

16. The process for producing an ethylene/α-olefin copolymer as claimed in claim 1, wherein M in the general formula [I] is hafnium.

17. The process for producing an ethylene/α-olefin copolymer as claimed in claim 1, wherein the polymerization temperature is 100 to 300° C.

18. The process for producing an ethylene/α-olefin copolymer as claimed in claim 1, wherein polymerization is carried out in such a manner as to obtain an ethylene-based polymer in which the proportion of constituent units derived from ethylene is not less than 65% by mol when the total of constituent units derived from monomers in the polymer is 100% by mol.

19. The process for producing an ethylene/α-olefin copolymer as claimed in claim 18, wherein polymerization is carried out in such a manner as to obtain an ethylene-based polymer in which the proportion of constituent units derived from ethylene is not less than 70% by mol when the total of constituent units derived from monomers in the polymer is 100% by mol.

* * * * *